United States Patent
Blyth et al.

(10) Patent No.: US 11,267,633 B2
(45) Date of Patent: Mar. 8, 2022

(54) MULTI-LAYER FILM AND RECLOSABLE FILM PACKAGE

(71) Applicant: Intercontinental Great Brands LLC, East Hanover, NJ (US)

(72) Inventors: Stuart Mackintosh Blyth, Birmingham (GB); Ronald H. Exner, Munich (DE); Louis Peter Fenech, III, East Hanover, NJ (US); Ying (Lora) Liang, East Hanover, NJ (US); Jeffrey T. Weber, Deerfield, IL (US); Paul A. Zerfas, East Hanover, NJ (US); Evan Michael Ziolkowski, Deerfield, IL (US)

(73) Assignee: Intercontinental Great Brands LLC, East Hanover, NJ (US)

( * ) Notice: Subject to any disclaimer, the term of this patent is extended or adjusted under 35 U.S.C. 154(b) by 197 days.

(21) Appl. No.: 16/324,095

(22) PCT Filed: Aug. 14, 2017

(86) PCT No.: PCT/US2017/046752
§ 371 (c)(1),
(2) Date: Feb. 7, 2019

(87) PCT Pub. No.: WO2018/035039
PCT Pub. Date: Feb. 22, 2018

(65) Prior Publication Data
US 2019/0329954 A1  Oct. 31, 2019

Related U.S. Application Data

(60) Provisional application No. 62/375,291, filed on Aug. 15, 2016.

(51) Int. Cl.
*B65D 77/20* (2006.01)
*B32B 7/06* (2019.01)
(Continued)

(52) U.S. Cl.
CPC ............ *B65D 77/2096* (2013.01); *B32B 7/06* (2013.01); *B32B 7/12* (2013.01); *B32B 27/34* (2013.01);
(Continued)

(58) Field of Classification Search
CPC ........ B65D 17/34; B65D 17/02; B65D 17/08; B65D 77/2096; B65D 17/30; B65D 53/08;
(Continued)

(56) References Cited

U.S. PATENT DOCUMENTS

| 3,977,160 A | 8/1976 | Klug |
| 4,143,858 A | 3/1979 | Schmidt, III |

(Continued)

FOREIGN PATENT DOCUMENTS

| AU | 2016220188 | 9/2017 |
| AU | 2017312553 | 3/2019 |

(Continued)

OTHER PUBLICATIONS

International Search Report and Written Opinion of the International Search Authority, dated Jan. 17, 2018, for International Application No. PCT/US2017/046752 (15 pgs.).

(Continued)

*Primary Examiner* — Kareen K Thomas
(74) *Attorney, Agent, or Firm* — Fitch, Even, Tabin & Flannery, LLP

(57) ABSTRACT

A multi-layer film and a film package made from the film are described herein that provide resealing capabilities by utilizing a tacky layer within the multi-layer film. The multi-layer film can include an outer film portion including the embedded tacky layer and an inner film portion. An opening feature formed in the multi-layer film includes a flap configured to be manipulated by a user to create an opening (Continued)

through the multi-layer film. The inner film portion can include a release layer configured specifically to interact with the tacky layer to provide a desired separation peel force and resealing functionalities. The outer film portion can include an outer film layer disposed on an opposite side of the tacky layer from the release layer that is configured to permanently adhere to the tacky layer.

23 Claims, 45 Drawing Sheets

(51) Int. Cl.
    *B32B 7/12*     (2006.01)
    *B32B 27/34*     (2006.01)
    *B32B 43/00*     (2006.01)
    *B65D 33/22*     (2006.01)
    *B65D 75/58*     (2006.01)

(52) U.S. Cl.
    CPC ............ *B32B 43/006* (2013.01); *B65D 33/22* (2013.01); *B65D 75/5838* (2013.01); *B65D 2577/2058* (2013.01)

(58) Field of Classification Search
    CPC ............... B65D 33/22; B65D 75/5838; B65D 2577/2058; B65D 17/32; B32B 7/06; B32B 7/12; B32B 27/34; B32B 43/006
    USPC ............... 220/359.1–359.4, 257.2, 270, 269; 383/203, 205, 66, 5
    See application file for complete search history.

(56) References Cited

U.S. PATENT DOCUMENTS

| | | | |
|---|---|---|---|
| 4,521,467 A | 6/1985 | Berger | |
| 4,549,063 A | 10/1985 | Ang | |
| 4,693,390 A | 9/1987 | Hekal | |
| 4,798,295 A * | 1/1989 | Pausing | B65D 5/065 229/229 |
| 5,089,320 A | 2/1992 | Straus | |
| 5,470,156 A | 11/1995 | May | |
| 5,582,342 A * | 12/1996 | Jud | B65D 75/5838 229/87.05 |
| 5,709,310 A * | 1/1998 | Kretz | B65D 77/2032 215/232 |
| 6,026,953 A * | 2/2000 | Nakamura | B65D 75/5838 206/233 |
| 6,056,141 A | 5/2000 | Navarini | |
| 6,228,450 B1 * | 5/2001 | Pedrini | B65D 75/5838 428/40.1 |
| 6,264,098 B1 | 7/2001 | Drummond | |
| 6,328,203 B1 * | 12/2001 | Tedford, Jr. | B65D 5/70 220/270 |
| 6,428,867 B1 | 8/2002 | Scott | |
| 6,511,723 B1 | 1/2003 | Engelaere | |
| 6,777,050 B1 | 8/2004 | Engelaere | |
| 6,918,532 B2 | 7/2005 | Sierra-Gomez | |
| 7,165,888 B2 | 1/2007 | Rodick | |
| 7,371,008 B2 | 5/2008 | Bonenfant | |
| 7,416,768 B2 | 8/2008 | Knoerzer | |
| 7,717,620 B2 | 5/2010 | Hebert | |
| 7,744,517 B2 | 6/2010 | Bonenfant | |
| 7,871,696 B2 | 1/2011 | Kinigakis | |
| 7,927,679 B2 | 4/2011 | Cruz | |
| 8,091,323 B2 | 1/2012 | Paterson | |
| 8,225,954 B1 | 7/2012 | Triquet | |
| 8,283,010 B2 | 10/2012 | Cruz | |
| 8,283,011 B2 | 10/2012 | Cruz | |
| 8,308,363 B2 * | 11/2012 | Vogt | B65D 77/2096 383/5 |
| 8,348,082 B2 | 1/2013 | Cain | |
| 8,440,293 B2 | 5/2013 | Yasuike | |
| 8,617,677 B2 | 12/2013 | Trouilhet | |
| 8,814,430 B2 | 8/2014 | Veternik | |
| 9,260,214 B2 * | 2/2016 | Owensby | B65D 33/20 |
| 9,394,085 B2 * | 7/2016 | Nakano | B65D 75/5838 |
| 9,650,194 B2 * | 5/2017 | Hetherton | B32B 27/06 |
| 9,663,282 B2 * | 5/2017 | Vogt | B65D 77/206 |
| 9,850,056 B2 * | 12/2017 | Shaw | B65D 81/3446 |
| 2003/0183637 A1 * | 10/2003 | Zappa | B65D 77/2052 220/359.2 |
| 2004/0118852 A1 | 6/2004 | Barmore | |
| 2005/0031233 A1 | 2/2005 | Varanese | |
| 2005/0247764 A1 * | 11/2005 | Sierra-Gomez | B65D 77/003 229/87.08 |
| 2005/0276525 A1 | 12/2005 | Robert | |
| 2006/0018569 A1 * | 1/2006 | Bonenfant | B65D 75/5838 383/5 |
| 2006/0066096 A1 | 3/2006 | Kan | |
| 2006/0144911 A1 * | 7/2006 | Sierra-Gomez | B65D 77/003 229/123.1 |
| 2007/0275133 A1 * | 11/2007 | Sierra-Gomez | B65D 75/44 426/122 |
| 2008/0037911 A1 * | 2/2008 | Cole | B65D 77/206 383/203 |
| 2008/0156861 A1 * | 7/2008 | Sierra-Gomez | B65D 75/5838 229/214 |
| 2008/0240627 A1 * | 10/2008 | Cole | B65D 77/206 383/204 |
| 2008/0260305 A1 | 10/2008 | Shah | |
| 2009/0028472 A1 * | 1/2009 | Andersson | B65D 75/44 383/205 |
| 2010/0018974 A1 | 1/2010 | Lyzenga | |
| 2010/0028588 A1 | 2/2010 | Kiuchi | |
| 2010/0113239 A1 | 5/2010 | Peterson | |
| 2010/0172604 A1 | 7/2010 | Andersson | |
| 2010/0278454 A1 | 11/2010 | Huffer | |
| 2012/0043330 A1 | 2/2012 | McLean | |
| 2012/0128835 A1 | 5/2012 | Lyzenga | |
| 2012/0177307 A1 | 7/2012 | Duan | |
| 2013/0056486 A1 * | 3/2013 | Latta | B65D 75/5838 220/833 |
| 2013/0114918 A1 | 5/2013 | Lyzenga | |
| 2013/0177263 A1 | 7/2013 | Duan | |
| 2014/0079343 A1 | 3/2014 | Lyzenga | |
| 2014/0231434 A1 | 8/2014 | Dietrich | |
| 2014/0263330 A1 * | 9/2014 | Thorstensen-Woll | B65D 17/501 220/270 |
| 2014/0314339 A1 * | 10/2014 | Docherty | B32B 9/00 383/5 |
| 2016/0013714 A1 | 1/2016 | Young | |
| 2016/0016714 A1 * | 1/2016 | Fenech, III | B32B 27/32 206/459.1 |
| 2016/0122109 A1 * | 5/2016 | Clark | B65D 75/5888 220/23.4 |
| 2016/0137377 A1 | 5/2016 | Tracy | |
| 2016/0229614 A1 * | 8/2016 | Huffer | B32B 3/266 |
| 2019/0047266 A1 * | 2/2019 | Blyth | B65D 75/5838 |
| 2019/0168491 A1 | 6/2019 | Blyth | |
| 2019/0329954 A1 | 10/2019 | Blyth | |

FOREIGN PATENT DOCUMENTS

| | | |
|---|---|---|
| AU | 2017312939 | 3/2019 |
| AU | 2019283781 | 1/2020 |
| BR | 1120170160293 | 7/2017 |
| CA | 2437857 | 8/2002 |
| CA | 2974136 | 8/2016 |
| CA | 3030994 | 2/2018 |
| CA | 3030998 | 2/2018 |
| CN | 105026285 | 11/2015 |
| CN | 107206738 | 9/2017 |
| CN | 109641428 | 4/2019 |
| CN | 109890723 | 6/2019 |
| DE | 202011050984 | 1/2012 |
| EP | 1582341 | 10/2005 |
| EP | 1775122 | 4/2007 |
| EP | 1939107 | 7/2008 |

(56) References Cited

FOREIGN PATENT DOCUMENTS

| | | |
|---|---|---|
| JP | 2004058568 | 2/2004 |
| JP | 2008502555 | 1/2008 |
| JP | 2009241477 | 10/2009 |
| JP | 2011184083 | 9/2011 |
| JP | 2012035896 | 2/2012 |
| JP | 2013151329 | 8/2013 |
| JP | 2014213910 | 11/2014 |
| JP | 2017537973 | 12/2017 |
| JP | 2019522600 | 8/2019 |
| JP | 2019522601 | 8/2019 |
| MX | 2017010055 | 10/2017 |
| MX | 2019001249 | 4/2019 |
| MX | 2019001518 | 5/2019 |
| RU | 2688856 | 3/2019 |
| WO | 02064694 | 8/2002 |
| WO | 2009014879 | 1/2009 |
| WO | 2011032064 | 3/2011 |
| WO | 2011146627 | 11/2011 |
| WO | 2011146658 | 11/2011 |
| WO | 2013023646 | 2/2013 |
| WO | 2014164416 | 10/2014 |
| WO | 2016133904 | 8/2016 |
| WO | 2018035039 | 2/2018 |
| WO | 2018035044 | 2/2018 |

OTHER PUBLICATIONS

Examination report No. 1, dated Jul. 31, 2019 for Australian Application No. 2017312939 (4 pgs.).
Examination report No. 1, dated May 30, 2018 for Australian Application No. 2016220188 (3 pgs.).
Examination report No. 2, dated Nov. 20, 2019 for Australian Application No. 2017312939 (3 pgs.).
Examination report No. 2, dated Sep. 8, 2018 for Australian Application No. 2016220188 (3 pgs.).
Examination Report, European Patent Application No. 04405192.8, dated Aug. 11, 2004 (2 pgs.).
Examination Report, European Patent Application No. 07115629.3, dated Mar. 13, 2008 (2 pgs.).
Examination Report, European Patent Application No. 17757647.7, dated Feb. 27, 2020 (5 pgs.).
Examination Report, European Patent Application No. 17761361.9, dated Mar. 12, 2020 (7 pgs.).
Extended European Search Report and the European Search Opinion dated Jun. 30, 2009 for European Appliction No. 06018936.2 (7 pgs.).
International Preliminary Report on Patentability, dated Feb. 28, 2019 for International Application No. PCT/US2017/046759 (10 pgs.).
International Preliminary Report on Patentability, dated Aug. 31, 2017 for International Application No. PCT/US2016/018072 (15 pgs.).
International Search Report and Written Opinion of the International Searching Authority, dated Jul. 2, 2014 for International Application No. PCT/US2014/022380 (8 pgs.).
International Search Report and Written Opinion of the International Searching Authority, dated Nov. 20, 2017 for International Application No. PCT/US2017/046759 (13 pgs.).
International Search Report, dated Jun. 29, 2016 for International Application No. PCT/US2016/018072 (6 pgs.).
Notice of Reasons for Rejection, dated Jan. 6, 2020 for Japanese Application No. 2019-502191, with English translation (11 pgs.).
Notice of Reasons for Rejection, dated Mar. 27, 2019 for Japanese Application No. 2017-537973, with English translation (19 pgs.).
Notification of First Office Action dated Dec. 16, 2019 for Chinese Application No. 201780045214.2, with English translation (18 pgs.).
Notification of Reasons for Refusal, dated Jan. 6, 2020 for Japaense Patent Application No. 2019502189, with English translation (14 pgs.).
Notification of Reasons for Refusal, dated Jul. 2, 2018 for Japanese Application No. 2017-537973, with English translation (14 pgs.).
Notification of the First Office Action, dated Oct. 12, 2018 for Chinese Application No. 201680006451.3, with English translation (21 pgs.).
Notification of the Second Office Action, dated Jun. 5, 2019 for Chinese Application No. 201680006451.3, with English translation (7 pgs.).
Notification of the Third Office Action, dated Nov. 29, 2019 for Chinese Application No. 201680006451.3, with English translation (6 pgs.).
Requisition by the Examiner dated Dec. 17, 2019 for Canadian Application No. 3030994 (3 pgs.).
Requisition by the Examiner dated Dec. 9, 2019 for Canadian Application No. 3030998 (5 pgs.).
Requisition, dated Jul. 18, 2018 for Canadian Application No. 2974136 (4 pgs.).
Russian Office Action dated Nov. 20, 2018 for Russian Application No. 2017126278, with English translation (9 pgs.).
Russian Search Report, dated Nov. 15, 2018 for Russian Application No. 2017126278 (2 pgs.).
Written Opinion of the International Searching Authority, dated Aug. 25, 2016 for International Application No. PCT/US2016/018072 (12 pgs.).

\* cited by examiner

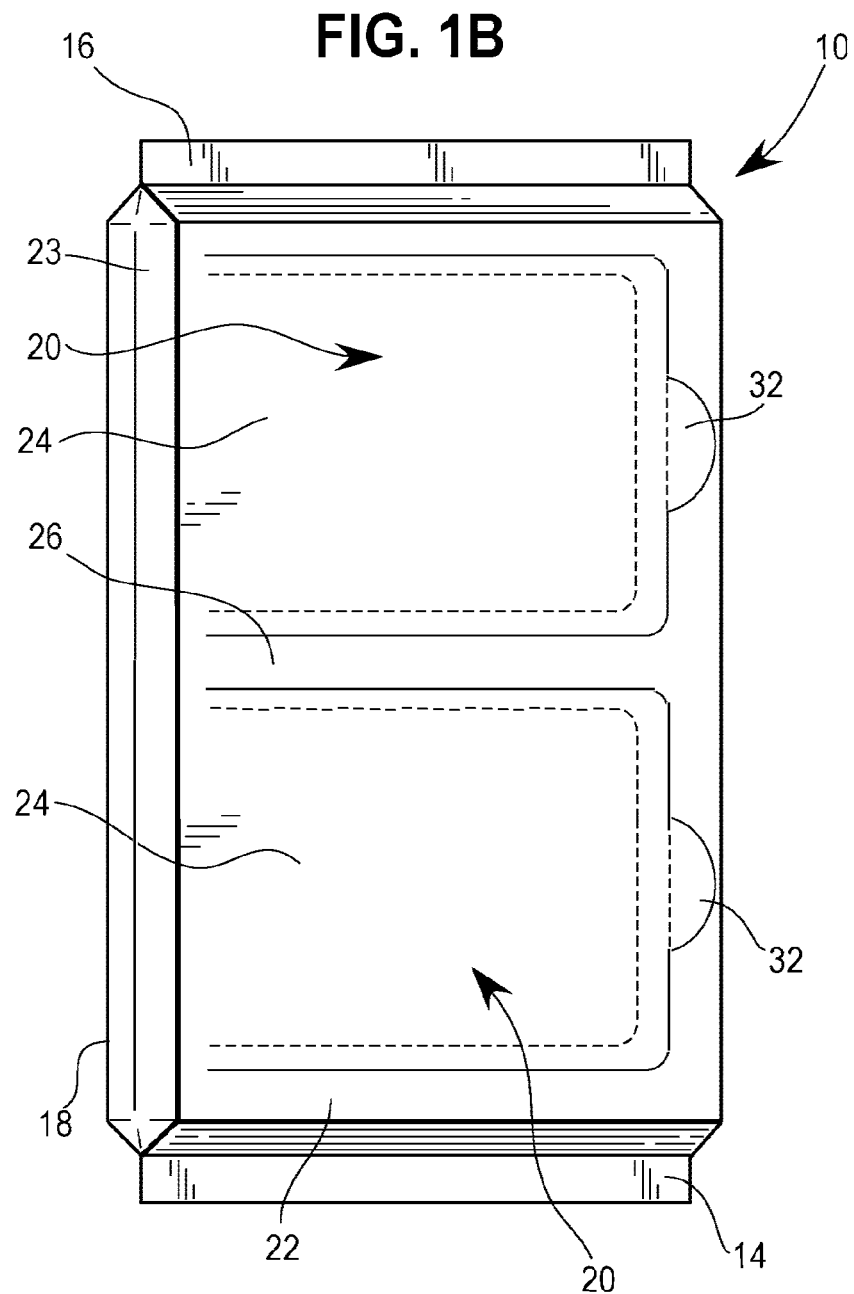

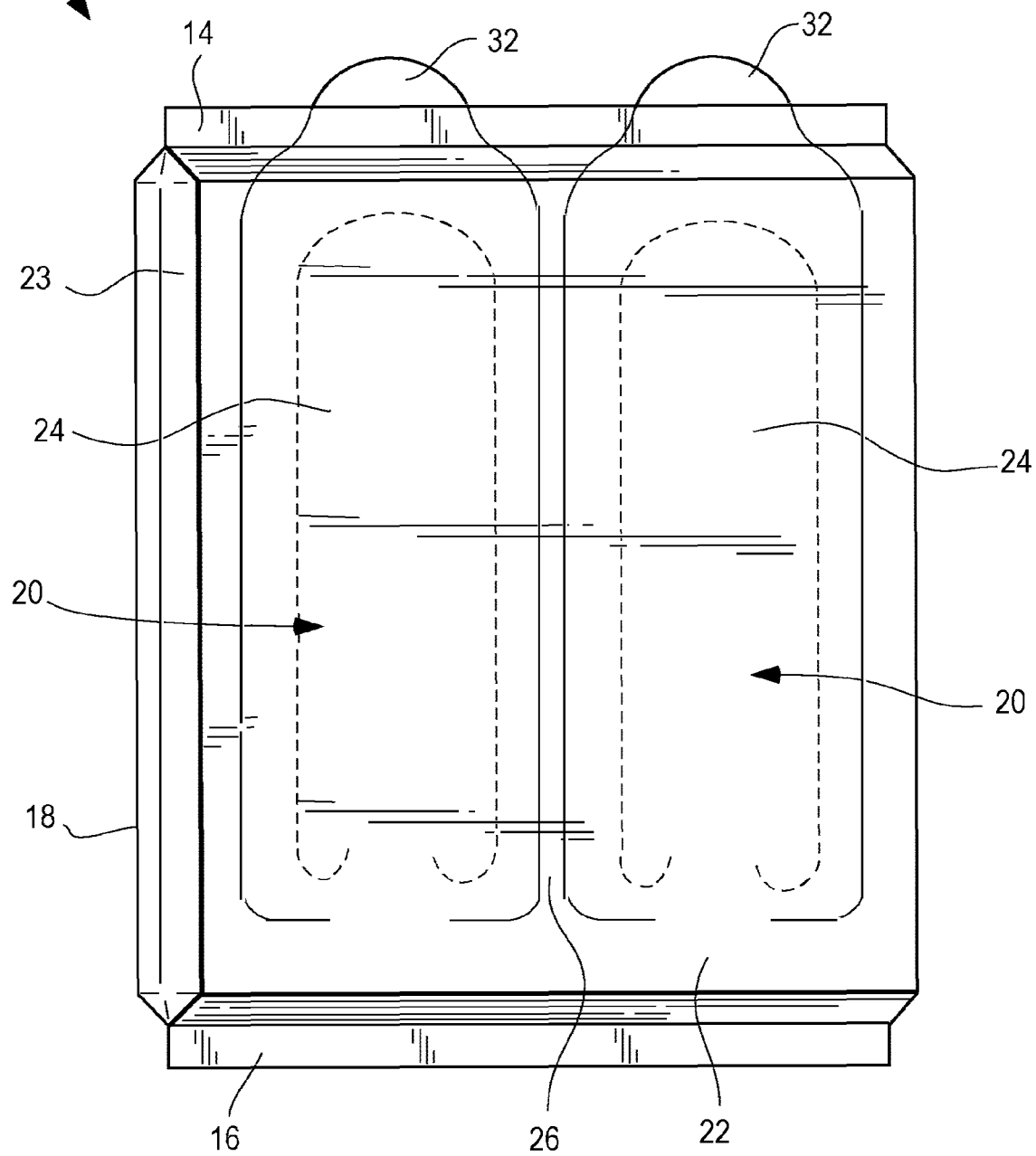

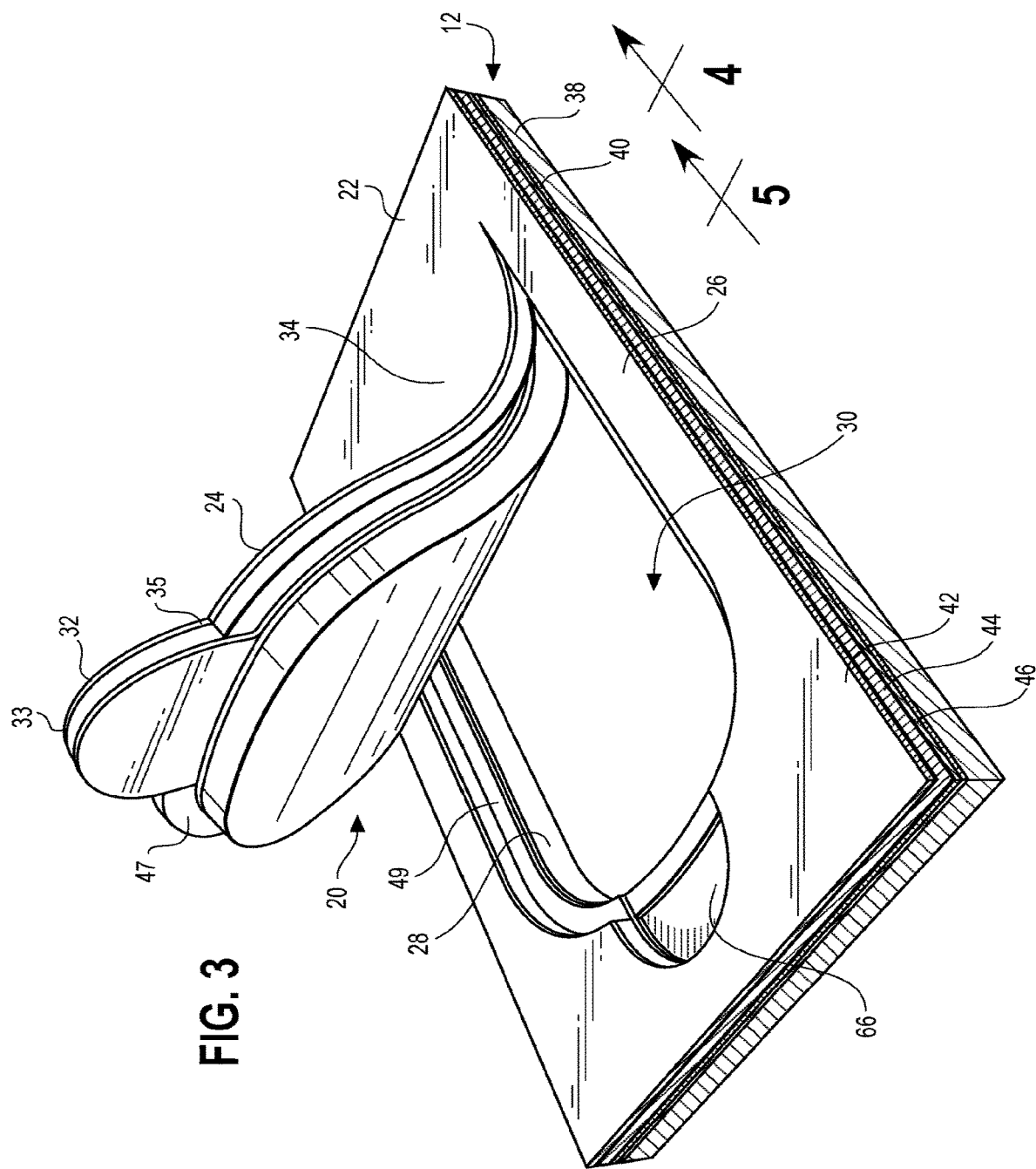

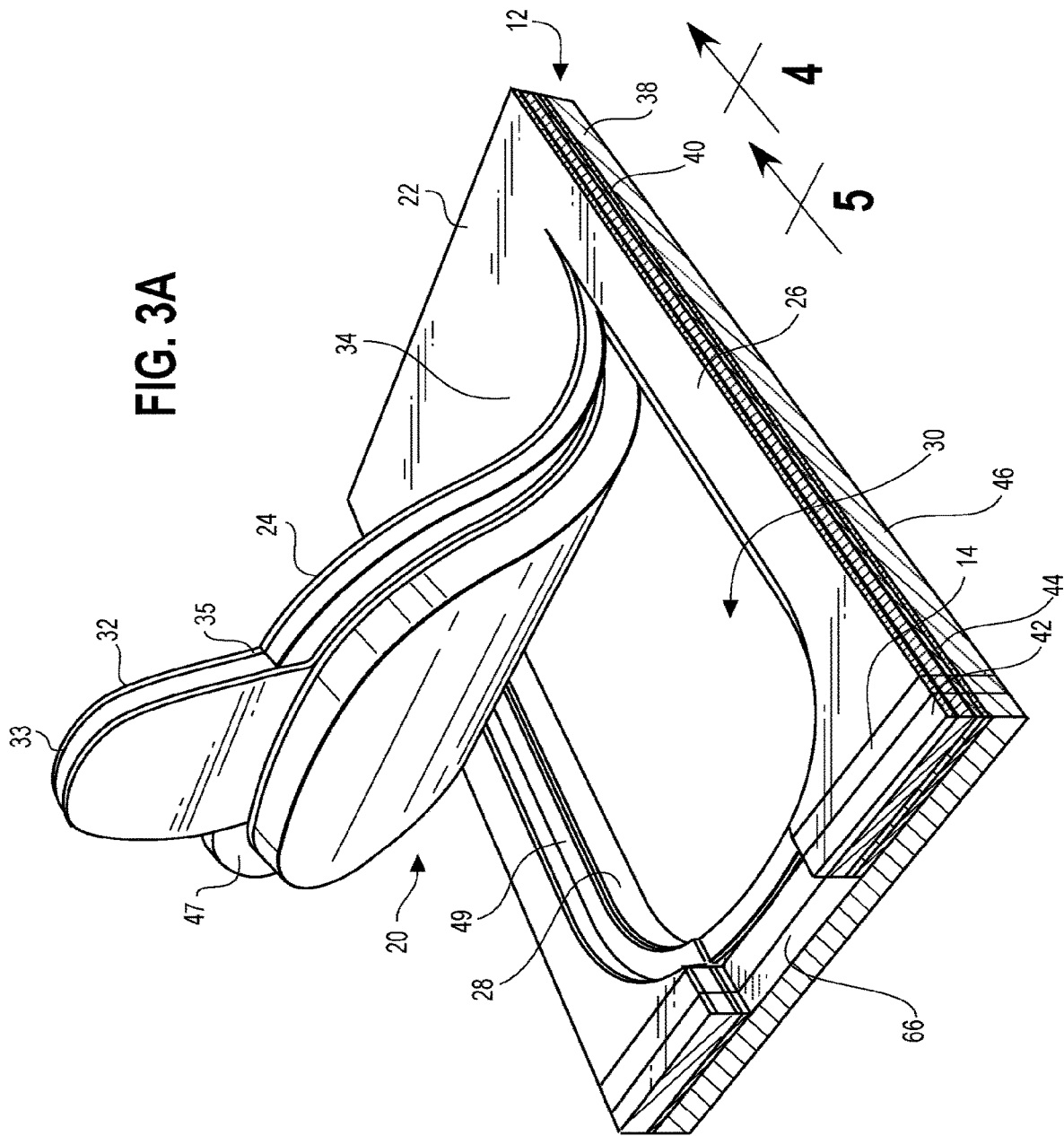

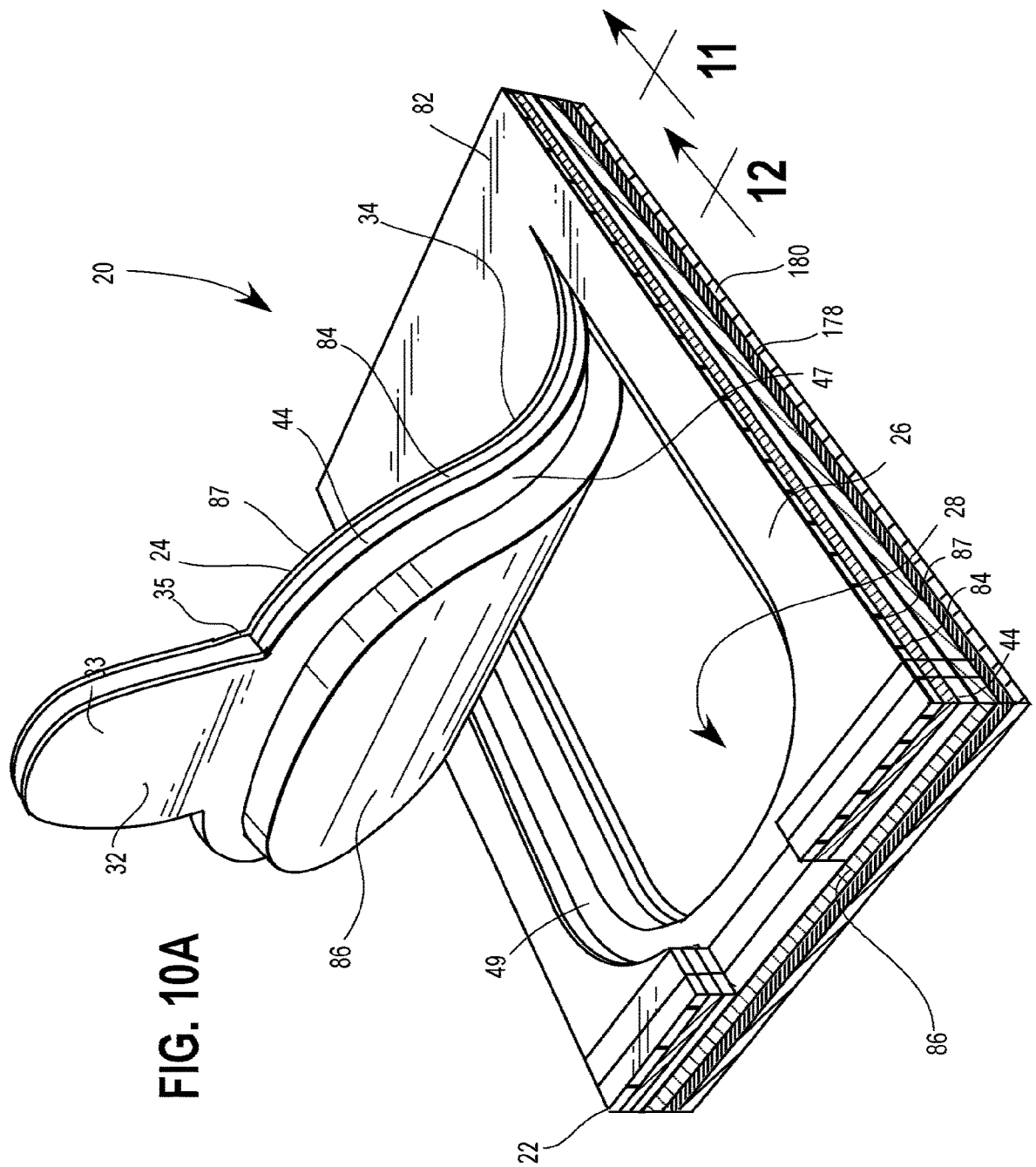

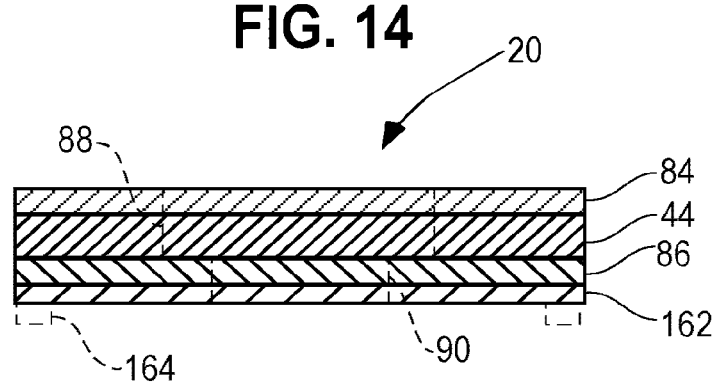
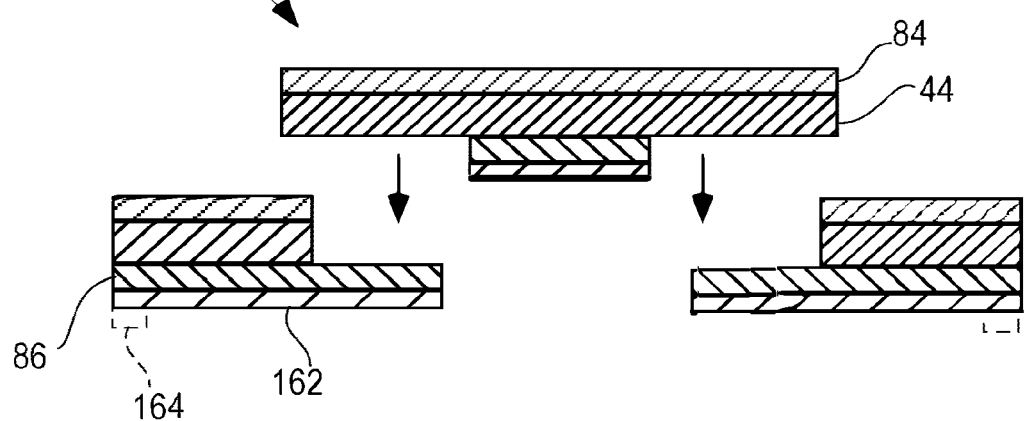

MULTI-LAYER FILM AND RECLOSABLE FILM PACKAGE

CROSS-REFERENCE TO RELATED APPLICATION

This application is a U.S. national phase application of International Application No. PCT/US2017/046752, filed Aug. 14, 2017, which claims priority to U.S. Provisional Application. No. 62/375,291, filed Aug. 15, 2016, which are hereby incorporated by reference herein.

FIELD

A multi-layer film, as well as a package made from such a multi-layer film, is described herein, and more particularly, a multi-layer film having a reclosable opening feature.

BACKGROUND

Reclosable film packages can include a dual layer laminate with inner and outer die cuts that define a reclosable flap and a reseal margin. In such packages, two layers are typically joined together using multiple adhesives or deadening agents during a printing, coating, or laminating step, or a pressure sensitive label is applied to a package. Subsequently these adhesives or labels are cut into a predesigned shape or fashion to facilitate creation of a reseal flap in the packaging. The use of multiple adhesives, deadening agents, or labels, as well as a step for lamination or label application, leads to specific requirements and constraints which can add cost and complexity to the manufacturing process.

Another type of package includes a layer of pressure sensitive adhesive and utilizes traditional heat seals to provide a package reclose feature. As such, a consumer can pull the heat seal apart, which can fracture the film forming the package to expose the pressure sensitive adhesive in the area of the heat seal. The consumer can then press the film back together to reclose the package. The initial fracturing of the film during opening, however, can require a large amount of force, which can be difficult for a consumer to apply and control.

SUMMARY

A multi-layer film for forming a package and a film package formed from the multi-layer film are described herein that have resealing materials on a different plane or layer of the film than between the webs making up the film. With this configuration, only one type of adhesive need be utilized between the webs of film rather than the dual patterns of a package using both permanent and resealing adhesive in the same layer between the webs of film. This advantageously can avoid the added costs and complexity associated therewith. Moreover, this approach avoids the use of separate reclosure labels.

A multi-layer film suitable as described herein includes: an outer film portion including an embedded tacky layer, and an inner film portion. At least a portion of the film can be formed via a single step, multi-layer coextrusion, which avoids the costs and extra steps of a lamination process. Additionally, the embedded tacky layer can be different from typical pressure sensitive adhesives. An opening feature formed in the multi-layer film includes a flap configured to be manipulated by a user to create an opening through the multi-layer film. The flap includes an upper portion at least partially defined by an outer cut extending at least partially through the outer film portion and a lower portion defined by an inner cut extending at least partially through the inner film portion. These cuts allow a consumer to easily open the package with less force as compared to fracturing a heat seal in prior packages.

In one form, the outer web of film includes a top film layer, the tacky layer, and a bottom film layer; the inner film portion is an inner web of film; and a permanent adhesive layer is disposed between and adheres the outer and inner webs of film together. For example, the tacky layer can be a tacky core encapsulated between the top film layer and the bottom film layer of the outer web of film (or inner web of film in alternative embodiments). In this form, the outer cut can extend through the top film layer into the middle tacky layer and the inner cut can extend through the inner web of film, the permanent adhesive layer, and at least portions of the bottom film layer.

The outer cut can include a tab portion, shoulder portions, and side portions extending longitudinally from ends of the shoulder portions. The permanent adhesive layer can then include an opening therein aligned with at least a portion of the tab portion of the outer cut so that the tab portion can be easily grasped by a consumer. Moreover, the outer web of film can be transparent or translucent and the permanent adhesive of the permanent adhesive layer can include ink visible through the outer web of film. The inner cut can include a forward edge, a rearward edge, and side edges extending therebetween to define the laminate opening.

The opening feature can further provide controlled easy opening and resealing via a combination of cuts extending partially through the laminate and application of permanent adhesive in the permanent adhesive layer.

By one approach, the inner cut further includes notches that extend rearward and outwardly from the forward edge thereof that are aligned with the tab portion of the outer cut. So configured, the notches direct an uncontrolled tear to the side edges of the inner cut so that the remaining tear propagates as desired.

By another approach, the opening feature can include a front cut extending through at least one of the inner web of film, the permanent adhesive layer, and the bottom film layer. The front cut can be disposed forwardly of the forward edge and aligned between the shoulder portions of the outer cut. As such, the permanent adhesive layer can include an opening therein aligned with a forward portion of the tab portion so that a permanent adhesive of the permanent adhesive layer surrounds the front cut.

By yet another approach, the opening feature can further include a middle tab cut extending through the bottom film layer aligned with the tab portion of the outer cut. The middle tab cut can further be spaced from the forward edge of the inner cut. Additionally, the forward edge of the inner cut in the bottom film layer can include a break aligned rearwardly of the tab portion of the outer cut. Next, the permanent adhesive layer can include an opening therein aligned with the tab portion of the outer cut and extending rearwardly to be spaced from the forward edge of the inner cut.

In another form, the package is formed from a coextruded film having an outer film portion, which can include one or more layers, an inner film portion, which can include one or more layers, and a tacky layer encapsulated or disposed therebetween. An opening feature formed in this multi-layer film includes a flap with an upper portion at least partially defined by an outer cut extending at least partially through the outer film layer and a lower portion at least partially defined by an inner cut extending at least partially through the inner film layer. The inner film portion can include a release layer configured specifically to interact with the tacky layer to provide a desired separation peel force and resealing functionalities. Moreover, the outer film portion can include an outer film layer disposed on an opposite side of the tacky layer from the release layer that is configured to permanently adhere to the tacky layer to ensure separation between the tacky and release layer during film opening.

Additionally, a package formed with the multi-layer film including any of the aboveis also described herein. The package can be formed using any suitable method to surround an interior of the package, which can optionally contain a food product, such as cookies or biscuits, which can optionally be in a tray to support the food products therein for access through the opening provided by the opening feature described above. Other suitable applications for the packages described herein can include personal care, pharmaceutical, agriculture, and electronic industry packages.

A single-step coextruded multilayer film is also described having two adjacent layers that can be peeled apart with a predetermined peel strength, both upon initial peeling and after opening and reclosing. The separation of these two adjacent layers for package reclose is advantageously not limited to heat sealed areas and can instead extend to any desired portion of the film. This allows an opening feature to have any desired design, pattern, or shape as directed by cut or scored lines. As described herein, the two adjacent layers can be a tacky layer of a thermoplastic material, an elastomer material, or blends thereof and an adjacent release layer of a polyamide material or blends thereof. The tacky layer and release layer advantageously have an affinity for one another such that separating the layers requires a peel force as can be provided by a typical consumer, but that also provides reclose and resealing. The coextruded multilayer film can further include a third layer disposed on an opposite side of the tacky layer such that the release layer and the third layer sandwich the tacky layer therebetween. The third layer can be permanently attached to the tacky layer such that the tacky layer separates from the release layer and remains attached to the third layer upon peeling by a consumer.

A flexible package is described that is created using a multilayer coextruded film structure having an encapsulated tacky layer, such as of a extrudable thermoplastic and/or elastomers, and a release layer adjacent to the encapsulated tacky layer. An opening feature in the film structure includes offset inner and outer score lines that form a flap configured to be pulled back by a user. The inner score line defines an opening to an interior of the package exposed when the flap is pulled back. The offset between the inner and outer score lines defines a sealing margin where the encapsulated tacky layer is configured to separate from the release layer along the sealing margin when the flap is pulled back.

By one approach, a multilayer flexible coextruded film is provided that contains a peelable and resealable tacky encapsulated thermoplastic and/or elastomeric layer and is capable of being oriented in a tenter frame process. By another approach, a multilayer flexible coextruded film having the embedded or encapsulated tacky layer can be produced by any suitable film converting method, including, for example, cast film, blown film (typical blown, double bubble, triple bubble, water quenching), machine direction orientation, biaxial orientation, extrusion coating. As such, the multilayer film can be used independently for food packaging applications or can be adhesive laminated for final food packaging applications. In one form, the multilayer film can be adhesive laminate to reverse printed biaxially oriented polypropylene or polyethylene terephthalate, including, for example, metalized, polyvinylidene chloride coated, aluminum oxide coated, silicon oxide coated.

In one illustrative embodiment, the film package includes a package opening feature usable to expose a resealable opening. To that end, a multilayer film with a first film layer and a second film layer disposed around an embedded coextruded bonding or tacky layer (wherein the second film includes at least a release and reclose layer for resealability) may have a top cut formed in one of the first or second film layer and a bottom cut formed in the other of the first or second film layers, the top and bottom cuts being offset from one another to form a reseal margin except at a leading portion of an access opening. By having the top and bottom cuts taper toward one another and coincide with one another at the leading portion of the access opening, the leading portion lacks the reseal margin. Furthermore, the package also may include a top reseal layer disposed over the leading portion of the access panel (where the top and bottom cuts coincide) and adhered to the first or second film layers. The top reseal layer may have an adhesive-free portion configured to be grasped for opening and an adhesive portion that adheres the top reseal layer to the remainder of the package. In this manner, the reseal opening feature may be disposed on top of the package in between the package seals.

In one exemplary embodiment, at the leading portion of the access panel the top cut and/or the bottom cut extends into or through the embedded coextruded bonding layer. In another exemplary embodiment, the top cut and/or the bottom cut extend completely through the multilayer film at the leading portion of the access panel. The top and bottom cuts may be mechanically formed die cuts, laser cuts, or the like.

In operation, a bond strength between the top reseal layer and the first or second film layer to which the top reseal layer is adhered is stronger than an integral bond strength between the first and second film layers. In this manner, opening of the package is facilitated by pulling on a pull or grasping tab of the top reseal layer to lift the access panel along the top and bottom die cuts. By one approach, the top reseal layer is a discrete label or sticker that permits a consumer to reseal the package in conjunction with the reseal margin in between the top and bottom die cuts. In one illustrative approach, the reseal margin tapers toward the leading portion of the access panel where there is no reseal margin.

In one illustrative approach, the leading edge of the access panel has at least one of the top and bottom die cuts extending into or through the embedded coextruded bonding layer. For example, the leading edge of the access panel may be (or may have a portion thereof) completely cut through to form a throughcut section of the multilayer film. By one approach, the throughcut section is disposed in the multilayer film at the point where the top die cut and the bottom die cut coincide or overlap with one another.

In another illustrative approach, the leading edge of the access panel is defined by a top and bottom die cut that do not extend therethrough such that the multilayer film is not throughcut at the leading edge of the access panel. For example, in one configuration, neither the top die cut, nor bottom die cut, extend completely through the multilayer film, though each of the top and bottom die cuts extend at least to the embedded coextruded bonding layer (for the configuration with a leading edge that does not include a throughcut section).

During formation of an illustrative package with overlapping top and bottom die cuts, the top die cut and the bottom die cut are generally formed before application of the top reseal layer. In this manner, it may be beneficial for the throughcut section of the leading edge to have at least a portion of the embedded coextruded bonding layer without a cut therein to help keep or retain the layers of the multilayer film in their respective planes after forming of the top and bottom die cuts and before application of the top reseal layer. For example, if the top and bottom die cuts extend through the first and second film layers but not completely through the embedded coextruded bonding layer, the bonding layer retains the layers of the multilayer film laminate in their respective planes.

In another approach, the throughcut may be quite small, (e.g., one or more perforations) such that the small throughcuts can provide the functionality of the throughcut while nonetheless avoiding the problems attendant film layers that don't retain their proper positioning or alignment in the film web.

In one configuration, the package includes a plurality of seals forming an interior cavity (for holding package contents) and wherein the adhesive-free portion of the top reseal layer is proximate one of the plurality of end seals. In another configuration, the package includes a plurality of seals forming an interior cavity and wherein the adhesive-free portion is disposed on the multilayer film inward from the plurality of seals, such as on the top of the package.

As explained below, a number of different materials and material combinations may be incorporated into the multilayer film. In one illustrative approach, the first film layer is a top film layer that includes at least one of polypropylene, polyethylene, a copolymer, or a polyester film layer and the second film layer includes a release and reclose layer and a heat seal layer (and possibly an optional oxygen barrier layer) with at least one of polypropylene, polyethylene, a copolymer, an ethylene vinyl alcohol (EVOH), a polyamide or a polyester film layer. Such a multilayer film may be made by adhesively laminating the films together in several steps, and it also may be formed in a single step. In one configuration, the top die cut is an outer die cut formed in a top film layer and the bottom die cut (which is dimensionally smaller than the top die cut) is an inner die cut formed in the reclose layer and the heat seal layer.

While some of the embodiments described herein include an opening feature on the top wall of a package, in yet another illustrative embodiment, a package opening feature usable to expose a resealable opening may being proximate a package seal or may be disposed beyond a package seal. To that end, a multilayer film with a first film layer and a second film layer disposed around an embedded coextruded bonding or tacky layer (wherein the second film includes at least a release and reclose layer for resealability) may have one or more package seals forming a contents cavity. The multilayer film may have a top die cut formed in one of the first or second film layers and a bottom die cut formed in the other of the first or second film layers. The top and bottom die cuts have portions offset from one another to form a reseal margin. The bottom die cut having a tab portion that subsequently forms a trailing edge of a pull tab and an opening portion. The top die cut and the opening portion of the bottom die cut form an access opening. By one approach, the top die cut forms, in part, an access panel and the bottom die cut forms a film flap, both of which are lifted to expose the access opening. In one configuration, the top die cut and the opening portion of the bottom die cuts are offset from one another to form a reseal margin. In addition, the access panel formed by the top die cut may have a leading edge defined, in part, by a throughcut in the multilayer film formed from one or both of the top die cut or the tab portion of the bottom die cut. By one approach, the tab portion of the bottom die cut has a bottom segment that coincides with a top segment of the top die cut at the leading edge of the access panel to form the throughcut. Further, the tab portion of the bottom die cut forming the rear or trailing edge of the pull tab may be disposed in the multilayer film outside of the package seal from the contents cavity and the opening portion of the bottom die cut may be disposed within the package seal.

In one illustrative approach, the tab portion and the opening portion of the bottom die cut are disposed a distance from one another such that the reseal margin is disposed therebetween. In another approach, the tab portion and the opening portion of the bottom die cut are disposed a distance apart from one another and the package seal may be disposed therebetween.

The pull tab, which may be grasped by a consumer to facilitate opening of the package, may be disposed at the leading potion of the access panel. The pull tab also may include a gripping edge disposed at a distance from the free edge of the package. For example, the gripping edge of the pull tab and a leading package edge may be offset from one another such that a user can grasp both at the same time and pull the edges away from one another to open the package.

BRIEF DESCRIPTION OF THE DRAWINGS

FIG. 1B is a top perspective view of an alternative film package having two opening features both including flaps adapted to be pulled back;

FIG. 1C is a top perspective view of an alternative film package having two opening features both including flaps adapted to be pulled back;

FIG. 3 is a perspective sectional view of a segment of a first embodiment of the top of package of FIG. 1A showing the flap of the opening feature in an open configuration;

FIG. 3A is a perspective sectional view of a first embodiment of a segment of film having an opening feature with a flap extending to a heat seal and a tab of the opening feature extending past the end seal showing the flap of the opening feature in an open configuration;

FIG. 10A is a perspective sectional view of a second embodiment of a segment of film having an opening feature with a flap extending to a heat seal and a tab of the opening feature extending past the end seal showing the flap of the opening feature in an open configuration;

FIG. 14 is a cross-sectional view of an alternative film;

FIG. 15 is a cross-sectional view of the alternative film of FIG. 14 showing an opening feature in the film in an open configuration;

DETAILED DESCRIPTION

Figure 1A:
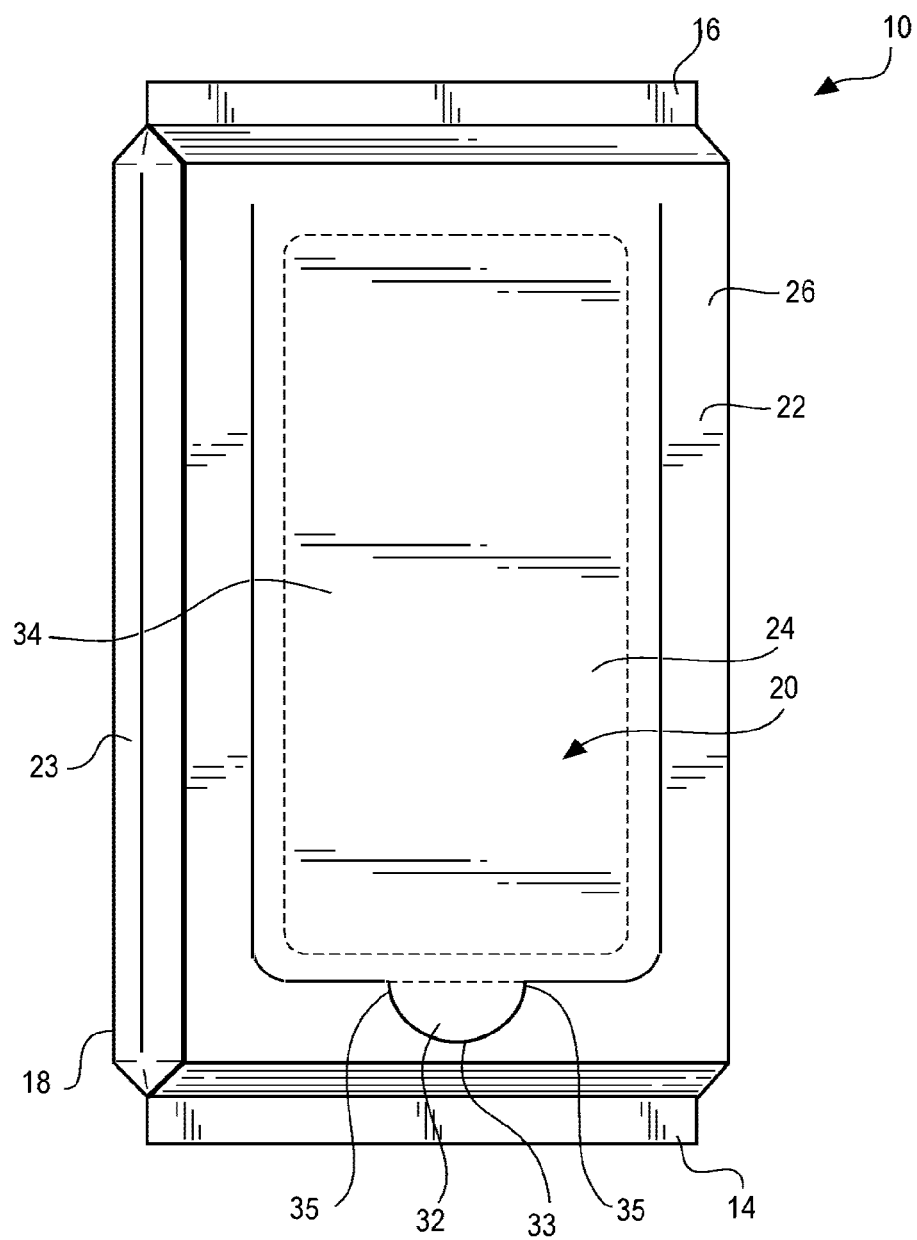
FIG. 1A is a top perspective view of a film package having an opening feature including a flap adapted to be pulled back.

A film package is described herein that utilizes a film having a tacky or bonding layer or core, which can include a material having a sticky or slightly sticky feel, disposed between film layers and a select release layer. As used herein, the tacky or bonding layer has selective room temperature tack to the adjacent release layer meaning the tacky or bonding layer exhibits a selective tack or bond to the adjacent release layer and permitting a repeated room temperature peel and reseal of the tacky or bonding layer to the selected release layer as discussed more herein. As also used herein, the tacky or bonding layer is a layer sandwiched or interposed between two other layers and that adheres to bond of the other layer. The release layer is a layer adjacent the tacking or bonding layer which can be delaminated from the bonding layer, but retains sufficient adhesive bonding characteristics such that it will reseal to the bonding layer when the bonding layer and release layer re-contact each other. Via various opening features, such as those described herein, the tacky layer is configured to delaminate from one or both of the adjacent film layers to maintain its tackiness to provide resealing capabilities for opening and closing film packages. The tacky layer can be continuous throughout the film and preferably covers 100% of the film layer, thereby removing the need for resealable adhesive to be deposited, coated, or laminated in a specific pattern. Additionally, with such a construction, the film provides a reclosure mechanism without the need for a separate adhesive label or a pressure sensitive adhesive.

A package is also provided of a coextruded multi-layer film wherein two coextruded layers of the multi-layer film are separated by a coextruded center layer. The multi-layer film includes a peelable and resealable flap therein such that the multi-layer film can be peeled apart between the two coextruded layers with the coextruded center layer sticking to one or both of the two coextruded layers and resealed by reapplying the flap so that the coextruded center layer holds the two coextruded layers together. By one approach, the peeling apart and resealing can be done at least 10 times. By a further approach, the peeling apart and resealing can be done at least 20 times. In various forms, the coextruded center layer can be a extrudable thermoplastic and/or elastomers, such as the tacky layer materials described herein, and one of the two coextruded layers can be a polyamide material. In one approach or embodiment, the package contains a coextruded portion, wherein layers of the portion can be delaminated without damaging the layers. The portion contains score lines such that when the portion is separated along the score lines, an opening to the package is provided permitting access to the contents, the delaminated layers have sufficient residual adhesion to each other so that when the separated portions are returned to their original position, the package is resealed. In another approach, all layers of the film, laminate, or package herein may be coextensive. Layers of the film, laminate or package may be coextruded in a single operation or may co-extruded in separate extrusions and then laminated or assembled together.

The tacky layer can be can be encapsulated or embedded between adjacent film layers such that the tacky layer is coextensive with the adjacent film layers and exposed during the first opening of the package to thereby reseal the package. In one exemplary form, the tacky layer is a polybutene-based resin. Of course, other tacky resins or natural cling materials, such as a copolymer of polypropylene and polyethylene plastomers and elastomers, or blends thereof, can also be utilized. In some approaches, the tacky layer may be blends of polybutene resins and olefinic elastomers and the release layer may be polyamide-based resins. As such, the tacky layer can stick or cling to the adjacent film layers so that the package can be easily and repeatedly resealed and reopened. More particularly, to open the package, the web of film can internally separate between the tacky layer and release layer utilizing cuts or other lines of weakness, such as scribed lines, perforated lines, or the like, exposing the tacky layer in desired areas for resealing. Additionally, alternative precision cut configurations are described herein that ensure hermetic sealing of the package, but also provide easy opening and desired tear propagation.

The films and packages described herein can further include a release layer next to the tacky layer in the coextruded multilayer structure. The release layer advantageously has enough affinity to the tacky layer to be coextruded as one single multilayer film, but the affinity is weak enough to be pulled apart or easily separated from the tacky layer at desired locations without undue peel strength, e.g., typical forces exerted by human hands opening a package in conjunction with a pull tab designed for the package. This delicate balance of desired affinity between the release layer and the tacky layer while still providing satisfactory separation force as described herein involves a polar polymer resin, such as a polyamide or a blend of polyamide, or other polar polymers including, but not limiting to, polystyrene, polyester, poly methyl methacrylate, polycarbonate, polycaprolactone, polylactic acid, polyhydroxy alkanoate and their copolymers or blends.

The films and packages described herein can also include an outer layer on an opposite side of the tacky layer from the release layer, such that the outer layer and the release layer have the tacky layer disposed therebetween. The outer layer can be permanently adhered to the tacky layer, such that the outer layer and tacky layer cannot be separated without damaging the film structure. As such, separation of the film is directed to a separation between the release layer and the tacky layer as desired.

The tacky layer and inner release layer disclosed herein can, in one form, be separated by a precut pull tab or portion, such that the tacky layer and release layer can be opened and resealed for more than 10 times, and, in another form, more than 20 times.

In a first form, the multi-layer film can be a laminated film. In this form, the tacky layer provides resealing capabilities on a different plane or layer of a multi-layer film laminate than between the webs of film that are laminated together. During lamination, a permanent adhesive can be utilized to join two or more webs of film together to form the multi-layer film and one of the webs of film in the laminate can include the tacky layer. In a second form, the multi-layer film can be a coextruded film, which can advantageously be produced using a single-step coextrusion process. Coextrusion creates a multi-layer film with the built-in tacky layer embedded therein in one step rather than the multi-step process of creating laminates, which includes coating adhesive on the webs of film. A coextruded multi-layer film can be utilized to form a package by itself, or can be laminated to one or more additional webs or layers of film, both of which are described herein.

A package formed from such a multi-layer film can include lines of weakness that extend through portions of the film to create an opening feature therein. By one approach, the opening feature may be a flap or other grasping feature in the film or package. The lines of weakness can extend through a top of the film, through a bottom of the film, or combinations thereof and can be configured to direct tears and/or break portions of the film during opening to thereby delaminate the tacky layer during opening. In the form using a laminate, lines of weakness can also extend through the permanent adhesive layer. By one approach, the lines of weakness can utilize the permanent adhesive during opening, such that initial opening of the package requires breaking or delaminating a portion of the permanent adhesive to thereby provide a tactile indication of initial opening, or provide a tamper indicator feature, and/or start delamination of the tacky layer. Additionally, the permanent adhesive layer can have a deadened or patterned portion so that a gripping portion can be easily grasped by a consumer.

Figure 1D:
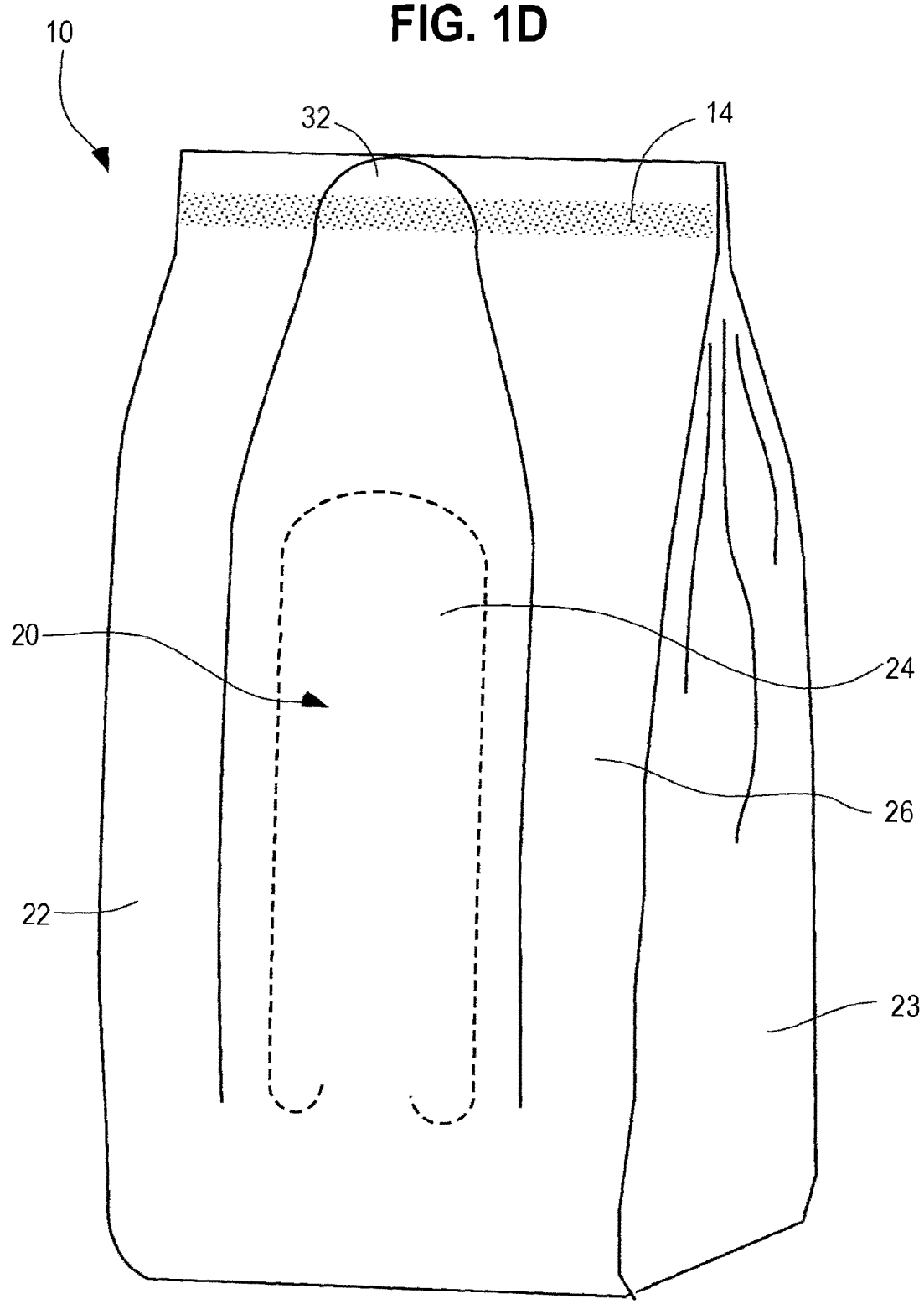
FIG. 1D is a perspective view of an alternative upstanding film package configured having an opening feature on a front wall portion thereof.

A film package 10 constructed from a multi-layer film 12 having these properties is shown in FIGS. 1A, 1B, 1C, and 1D. The film package 10 can be constructed using a standard flow pack process that includes creating forward and rearward transverse end seals 14, 16 and a longitudinal fin seal (not shown) extending therebetween and on an opposite side of the package as compared to the opening feature. In the illustrated form, the package 10 is generally box-shaped with a top wall portion 22, side wall portions 23, and a bottom wall portion 18. An optional tray 25 or the contents of the package 10 themselves can provide internal structure to the package 10, as desired. An opening feature 20 is disposed in the top wall portion 22 of the package 10 that allows a consumer to open and repeatedly reseal the package 10 during sequential use. Of course, as shown in FIGS. 1B and 1C, the package 10 can include two, or more, opening features 20, disposed as desired around the top, sides, or bottom of the package 10, or bridging therebetween, including extending transversely as shown in FIG. 1B or longitudinally as shown in FIG. 1C. Additionally, as shown in FIG. 1D, the package 10 can be configured to rest on one of the ends thereof in an upright orientation. As such, rather than a top wall portion 22, the opening feature 20 is disposed in a front wall portion.

Figure 10:
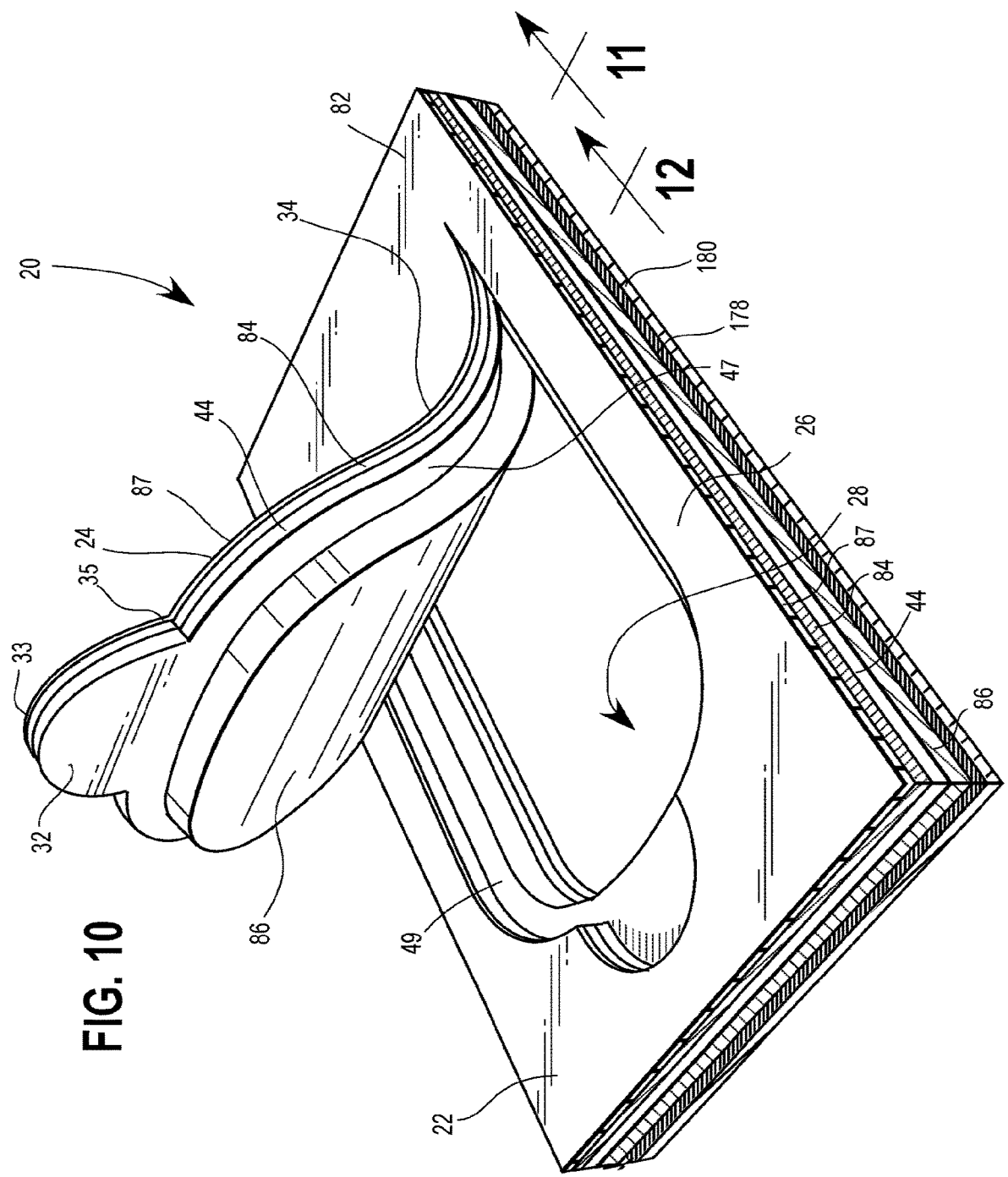
FIG. 10 is a perspective sectional view of a segment of a second embodiment of the top of the package of FIG. 1A showing the flap of the opening feature in an open configuration.

The opening feature 20 includes a flap 24 of the top wall 22 that can be separated and partially pulled away from a remaining portion 26 of the top wall 22 to reveal an opening 28 into an interior 30 of the package 10. The flap 24 can include a gripping tab 32 that projects away from a main portion 34 of the flap towards the forward end seal 14. The tab 32 is configured to provide a consumer a convenient gripping surface for opening the package 10. As shown, the tab 32 includes a forward curved portion 33 and generally parallel longitudinal sides 35. Further, as shown in FIG. 1C, the opening feature 20 can extend from the top wall portion 22 to the end seal 14 with the tab 32 projecting past the end seal 14. In this configuration, a user would grip the tab 32 and pull the flap 24 generally away from the top wall 22, breaking through the end seal 14 and opening the package as described above. Additional, embodiments of opening features extending past an end seal are shown in FIGS. 3A and 10A.

In the illustrated form, the package is generally box-shaped with a generally rectangular cross-section. Of course other package shapes can also be utilized, such as other polygonal shapes, such as triangular, rectangular, square, pentagonal, etc., curved shapes, such as round, oval, etc., curvilinear shapes, such as track shaped, etc., or combinations thereof. Additionally, the shape of the package can be generally defined by the tray 25 and/or the contents disposed therein.

Figure 2:
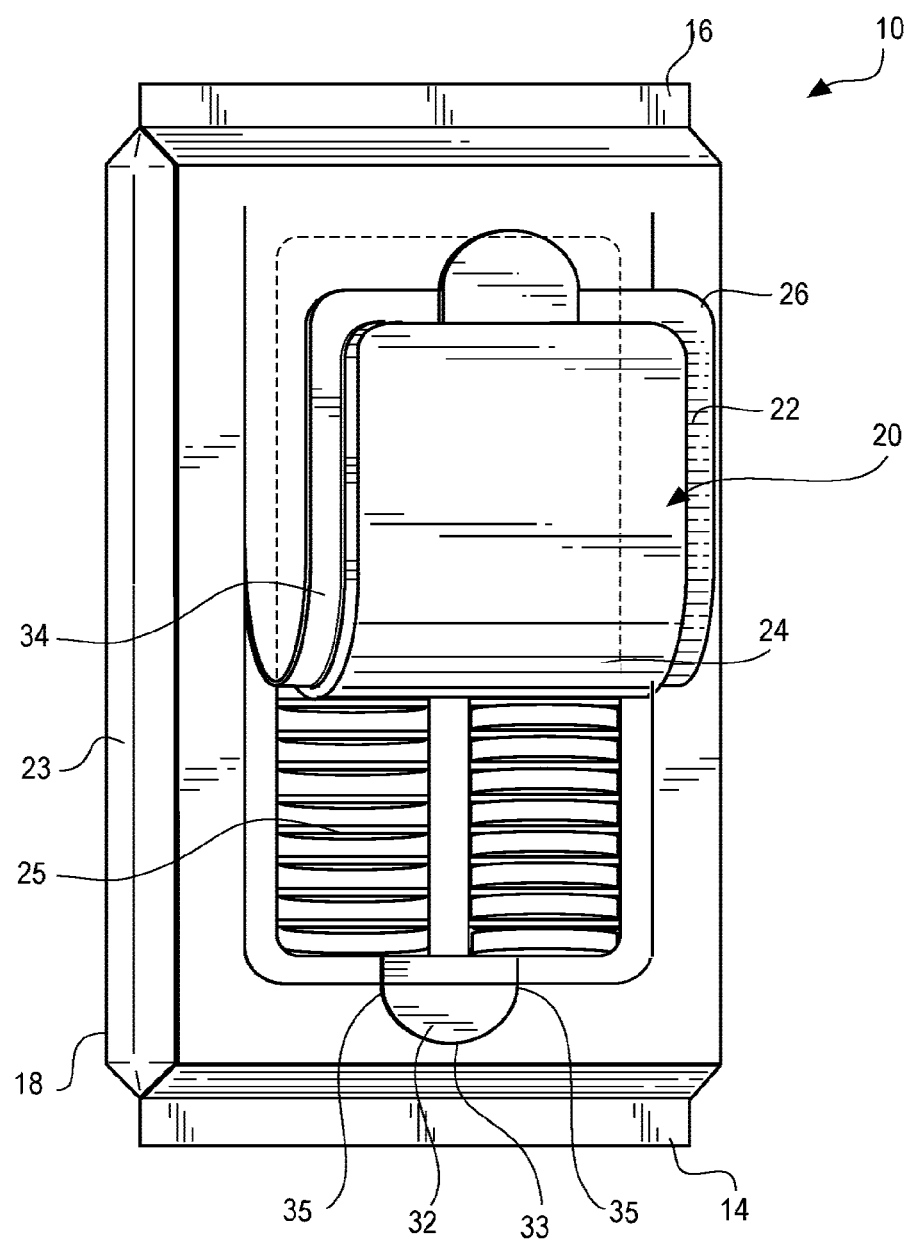
FIG. 2 is a top perspective view of the film package of FIG. 1A showing the flap of the opening feature pulled back to reveal a tray and food products within a package interior.
Figure 2A:
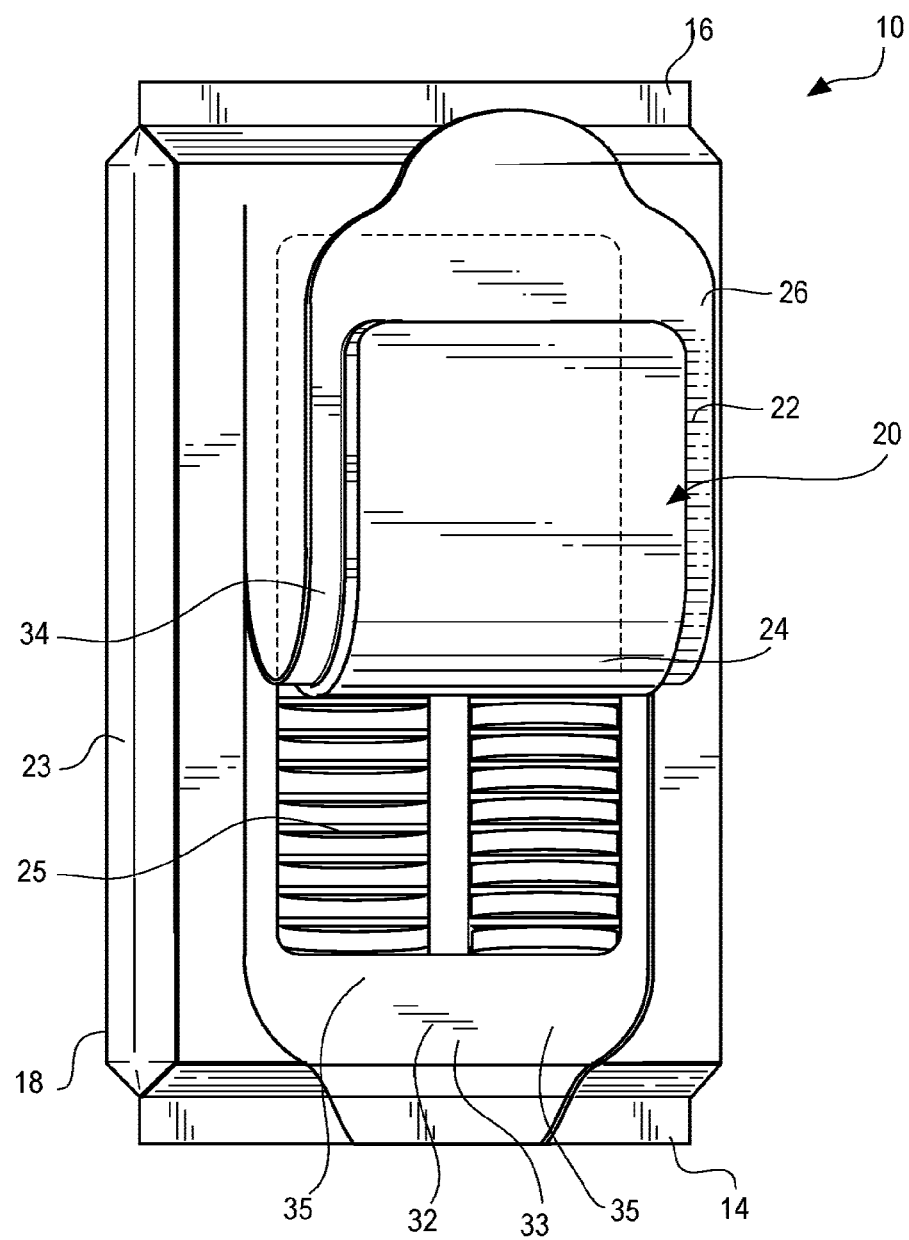
FIG. 2A is a top perspective view of an alternative film package having an opening feature including a flap adapted to be pulled back extending past an end seal of the package, showing the flap pulled back to reveal a tray and food products within a package interior.
Figure 4:
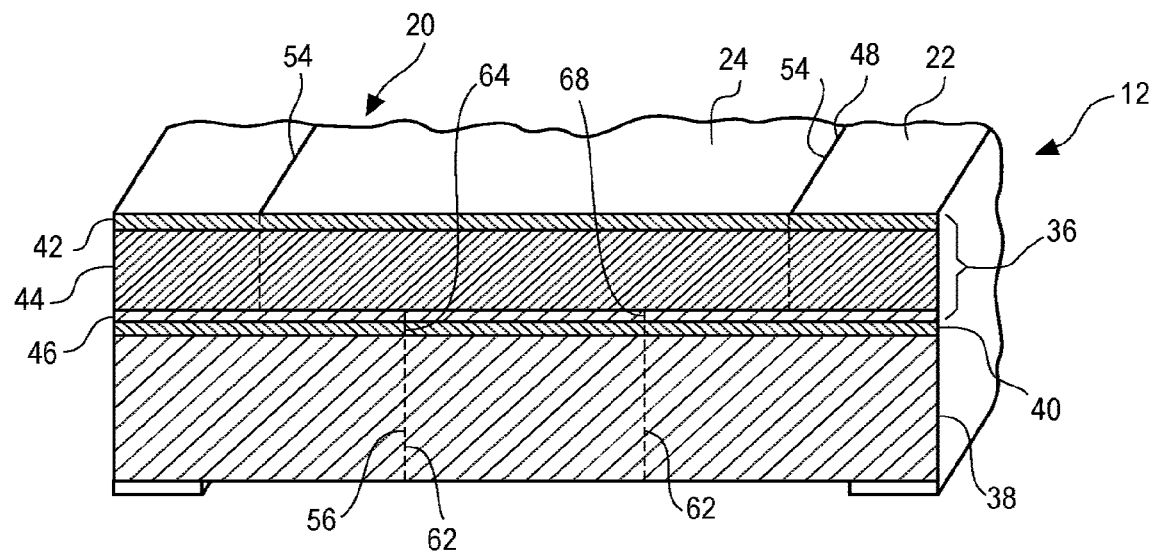
FIG. 4 is a cross-sectional view of the segment of the top of the package of FIG. 3 taken along the line 3-3 showing inner and outer cuts of the opening feature in a closed configuration.

In one form, the film 12 can be a laminate 13. A cross-section of an example laminate 13 is shown in FIGS. 2-4. As shown, the laminate 12 includes outer and inner webs of film 36, 38 joined together with a permanent adhesive layer 40 disposed therebetween. The outer web 36 has a multi-layer construction that includes a tacky or bonding layer or core 44 for resealing purposes, which can be created by a suitable film extrusion process as described. This film producing process can be blown film (single double or triple bubble process), cast film, mono-axially stretched film, or biaxially stretched film (either simultaneous or sequentially stretched) and the final material may also be metalized, coated or otherwise treated to impart additional functionality. In the illustrated form, the outer web 36 includes a top film layer 42, the tacky layer 44, and a bottom film layer 46. Of course, additional layers can also be utilized as desired or required for a particular application. The inner web 38 can be biaxially oriented polypropylene, polyethylene terephthalate, polyethylene, polylactic acid, polyhydroxy alkanoate, and blends of these polymers, metalized or coated variants of such films or indeed any other extruded multilayer or monolayer films. To create the laminate 12, the inner web 38 can be printed and adhesive laminated to the outer web 36 in a standard lamination process or other suitable process. Each layer of the film or the combined layers may have a thickness of at least 5 μm, 10 μm, 15 μm, 20 μm, 25 μm, 30 μm, 50 μm or 100 μm. Each layer of the film or the combined layers may have a thickness of no more than 750 μm, 500 μm, 400 μm, 300 μm or 250 μm. A preferred range of thickness of the combined layers is 10 μm-250 μm or 20 μm-200 μm.

As shown, the tacky layer 44 is encapsulated or embedded between the top and bottom film layers 42, 46. As such, the tacky layer can bond to the top and bottom film layers 42, 46 so that the package 10 can be easily and repeatedly resealed and reopened. To this end, the tacky layer 44 has a stronger bond to the top film layer 42 than to the bottom layer 46. The outer and inner webs of film 36, 38 are shown with 3 layers and 1 layer respectively, but it will be understood that any of the layers can itself be a laminate with a multi-layer construction. More specifically, the multi-layer film with the embedded tacky layer can be laminated through adhesive, extrusion, or tandem lamination or extrusion coated other films to form a complex film. Additionally, although the cut is shown as perpendicular in the figures, angled tears or fractures through the tacky resin also result in a viable reseal. Moreover, the package can be resealed whether the tacky resin is entirely disposed on the flap 24, entirely on the bottom film layer 46, or portions on both such as when opening the package 10 fractures through the tacky resin 44 itself.

Described generally and shown in FIGS. 2-4, the opening feature 20 utilizes the tacky layer 44 for package reclose. Pulling the flap 24 generally away from the top wall 22 breaks or separates cuts in the outer web 36 and inner web 38 to expose the opening 28, as well as a reseal margin 47 of the middle tacky layer 44 and a reseal margin 49 of the bottom film layer 46. The reseal margins 47, 49 are created by cuts in the upper web top film layer 42 and middle tacky layer 44 being dimensionally larger than cuts in the inner web 38, permanent adhesive layer 40, and bottom film layer 46, as described in greater detail below. By non-limiting example, the reseal margins 47, 49 can be between about 5 mm and about 40 mm wide, and more specifically between about 10 mm and about 15 mm, and more specifically between about 12 and about 13 mm wide to provide satisfactory resealing during use. Of course, other measurements and sizes can also be utilized for particular applications as needed or desired. For example, a relatively small package can utilize an approximately 5 mm reseal margin, while a larger package can utilize an approximately 10-15 mm reseal margin. So configured, a consumer is provided the convenience of a resealable package without the need for multiple adhesives being disposed in patterns on the same plane or layer within the laminate.

The opening feature 20 is defined by cuts or other lines of weakness formed by dies, lasers, or the like. In the illustrated embodiments, an outer cut 48 extends through the top film layer 42 and the middle tacky layer 44 to create a top portion of the flap 24. The outer cut 48 includes a top tab portion 50, outwardly extending shoulder portions 52, and opposite side portions 54 that run longitudinally down the package top wall 22 toward the rearward end seal 16. If desired, distal ends 55 of the side portions 54 can have tear stopping features, such as hooks or the like. In other embodiments, such as that shown in FIGS. 1C and 3A, the flap 24 can extend to the end seal 14 and the tab 32 can extend there past.

Other embodiments do not require an outer cut such as those shown. For example, a tab portion 50 can be cut into the top film layer 42 and pulling on the tab can interact with cuts made in interior and/or bottom layers, such as those described below. With this configuration, the top film layer 42 tears during opening. In one form, this tearing can be controlled by utilizing a film with tear-directing properties.

Various embodiments for cuts made in the bottom film layer 46, the permanent adhesive layer 40, and the inner web 38 are shown in FIGS. 6-9. In a first form, the inner web 38 includes an inner cut 56 having a forward edge 58, a rearward edge 60, and side edges 62 that define the opening 28 into the package 10 and creating a bottom portion of the flap 24. In this form, the inner cut 56 has a rectangular shape with slightly rounded corners that help with controlled propagation during opening. Of course, other shapes can also be utilized, whether depending on the shape of the package, for specific package contents, or other desired aesthetic. For example, the bottom cut can include curvilinear portions creating rounded ends and/or sides, a waisted portion, or the like.

The permanent adhesive layer 40 includes an adhesive cut 64 that is substantially identical to the inner cut 56. Permanent layer 40 forms a bond between layers 46 and 38 that does not separate upon pulling and package opening. Although shown as a separate layer for illustrated purposes, it will be understood that the adhesive layer 40 is applied to one or both of the webs of film 36, 38. In the illustrated form, the adhesive cut 64 includes the forward, rearward, and side edges 58, 60, 62. In one approach, the bottom and adhesive cuts 56, 64 are made simultaneously into the laminate 12 with any suitable method, such as with a laser or die. As shown, the permanent adhesive layer 40 can be applied in a pattern leaving an open portion 66 aligned with some or the entire tab 32 which leaves the tab unadhered for easy gripping by a consumer. Alternatively, a registered adhesive kill can be applied in the open portion 66.

The bottom film layer 46 includes a middle cut 68 that is largely identical to the bottom and adhesive cuts 56, 64. As used herein, the bottom film layer 46 may also be referred to as a release layer. More specifically, the rearward and side edges 60, 62 are identical, while the forward edge 58 has a different configuration in an area aligned with the tab 32. In this first form, the middle cut 68 includes a middle tab portion 70 that extends away from the forward edge 58 to align with the top tab portion 50, albeit with longer sides 72 than the top tab portion 50 that extend to connect to the smaller-dimensioned middle cut 68. So configured, when a consumer grips the tab portion 32 and pulls outwardly and rearwardly, the customer must pull to overcome the portion of permanent adhesive adhering the bottom film layer 46 to the between the open tab portion 66 and the forward edge 58. After that portion of permanent adhesive breaks, the consumer can then continue to pull the flap 24 backward thereby continuing to breaks the outer and inner cuts 48, 56 to reveal the opening 28. Bottom film layer 46 may be a polyamide. In some approaches, the layer 46 may be about 0.5 to about 50 microns thick, and preferably about 0.5 to about 30 microns thick, and more preferably about 0.5 to about 20 microns thick.

Figure 5:
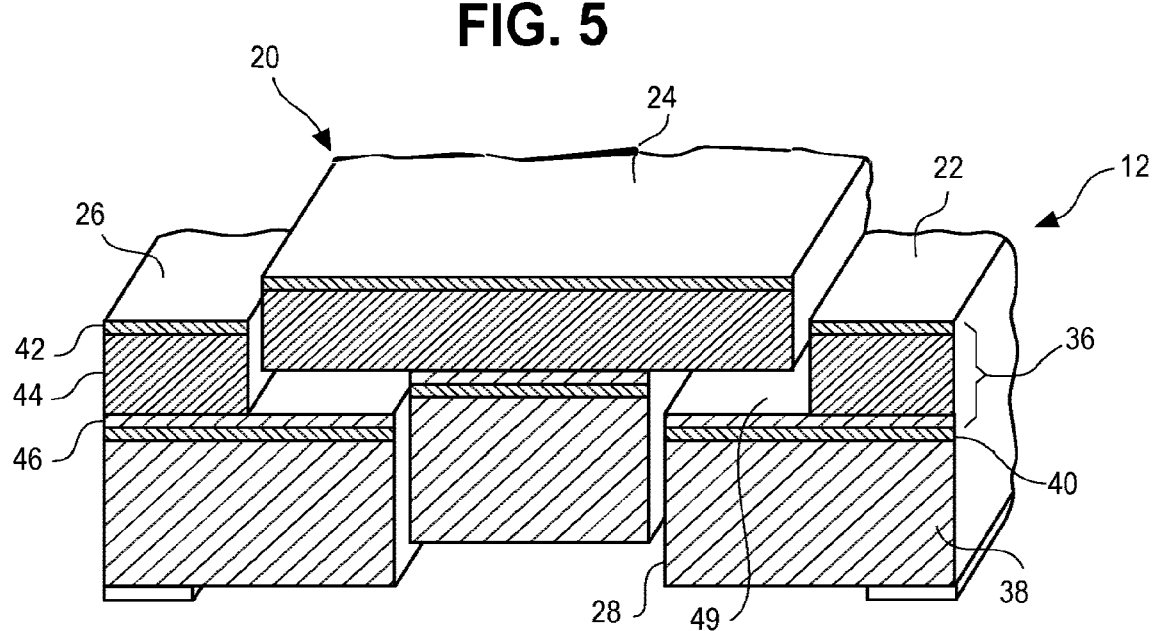
FIG. 5 is a cross-sectional view of the segment of the top of FIG. 3 showing the inner and outer cuts separated in an open configuration.
Figure 6:
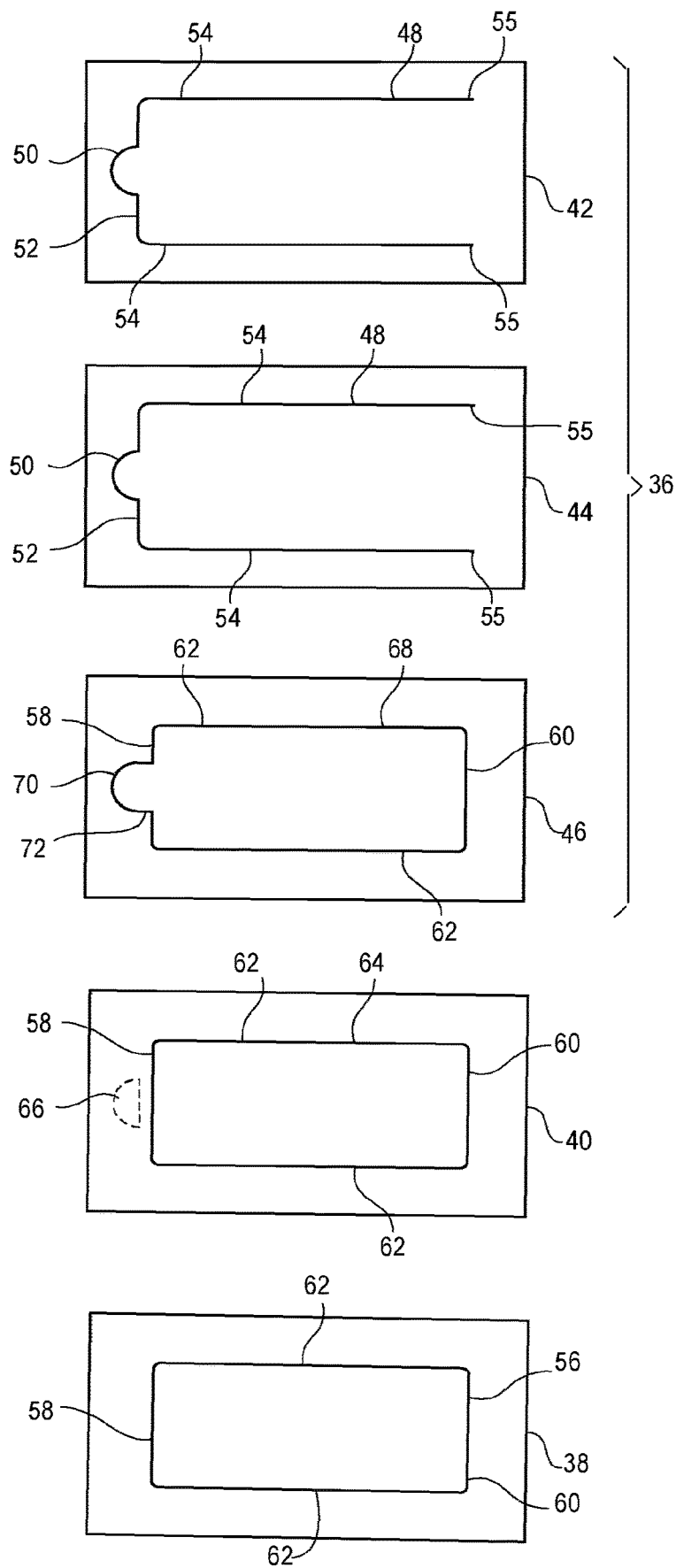
FIG. 6 is a top plan cut-out view of an upper web of film having three layers, a permanent adhesive, and a lower web of film showing details of an example opening feature.

By one approach, the bottom film layer or release layer 46 directly contacts the tacky or bonding layer 44 as shown in FIGS. 5 and 6. The bottom film layer or release layer 46 includes a select polymer or blend including at least one of a polyamide polymer and blend thereof of the following structures:

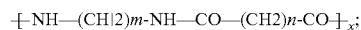

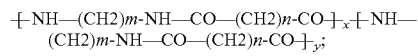

wherein, in the first structure, m and n are independently (can either be the same or different numbers) an integer from 4 to 64; in the second structure, m is 6 and n is either 6 or 36, depending on if they are in a hard or soft region of the polymers, and/or includes an aromatic polyamide including one or more of the following structures

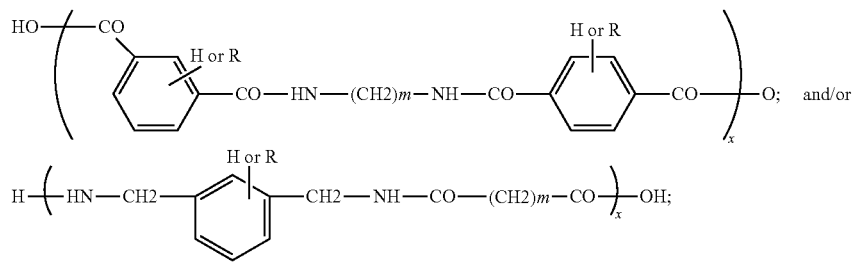

wherein m is an integer from 4 to 64 and R is an alkyl group on the aromatic ring. By one approach, the release layer 46 may be a thermoplastic polyamide elastomer, which is high-performance thermoplastic elastomer block copolymer, based on polyamide and polyethers, polyesters, or polyolefins. They may contain alternating hard and soft segments joined by amide linkage functional bonds. In the formulas above x and y are preferably each greater than 1000, and in other approaches greater than 2000.

The tacky layer 44 may be a layer formed out of poly-butene-1-based resins and, in some approaches, may be a layer formed out of olefinic specialty elastomers, and in further approaches, blends of polybutene-1 resins and olefinic elastomers. Although these resins may not be recognized for their tacky properties, we have discovered that the surface energy of these resins and/or blends display tacky behavior that can adhere to release layers as described herein with minimal pressure, such as the weight of the separated film, finger, or hand pressure, depending the tacky layer formulation. The design and formulation of both the tacky layer and the design and formulation of the release layer can be optimized as described herein to ensure reliable and satisfactory performance during opening, reseal, and reopening. Moreover, the resins and blends discussed herein have European and U.S. Food and Drug Administration compliance for use in direct food contact applications.

The polybutene-1 resin maybe a high molecular weight resin with a density of about 0.9 g/cm3 and melt flow index (MFI) of 3.0 g/10 min at 190° C., 2.16 kg. In some approaches, the layer 44 may be about 5 to about 50 microns thick and preferably about 5 to about 30 microns thick, and more preferably about 5 to about 20 microns thick. In some approaches, the polybutene-1 resin can be high molecular weight isotactic, semi-crystalline thermoplastic polyolefins produced through the polymerization of butene-1 and ethylene, and/or propylene comonomers.

The tacky or bonding layer 44 may also be blends of polybutene-1-based resins and other olefinic specialty elastomer resins. Preferred blends include about 5 to about 95% of the polybutene-1 resins and about 95% to about 5% of the olefin resins. In some approaches, preferred ratios of the polybutene-1 to olefinic elastomer may be about 5% to about 20% polybutene-1 to about 95% to about 80% olefinic elastomers. Samples of the olefinic specialty elastomers may be Vistamaxx by ExxonMobil, Versify by Dow Chemical, Catalloy by LyondelBasell. In some approaches, the tacking or bonding layer may have a melt flow index from about 1 to about 3.5 g/10 mins at 190 C/2.16 kg, and in other approaches, about 1.4 to about 3 g/10 mins at 190 C/2.16 kg. In another approach, the tacky or bonding layer including a at least one of polybutylene, polyethylene, and polypropylene, and blends and copolymers thereof;

By one approach, the tacky layer 44 can include propylene-based copolymers, either alone or blended with other resins. These copolymers can be produced using metallocene catalyst technology. The propylene-based copolymer includes semicrystalline copolymers of propylene and ethylene. The copolymers can have high propylene levels, for example greater than 80 wt %, with isotactic stereochemistry. The copolymers can further have uniform inter- and intramolecular composition and crystallinity distribution. The crystallinity can be modulated with ethylene to produce a very soft end product with an elasticity unlike other polyolefin polymers, blends, or alloys. For example, about 5 to about 25% crystallinity has a large amorphous fraction. Different grades of these copolymers can be created by varying the amount of polyethylene copolymers. Various grades, including 7010FL, 6102FL, 3980FL, 3020FL, were all found to provide suitable peel strength and resealing, albeit at varying levels.

Figure 7:
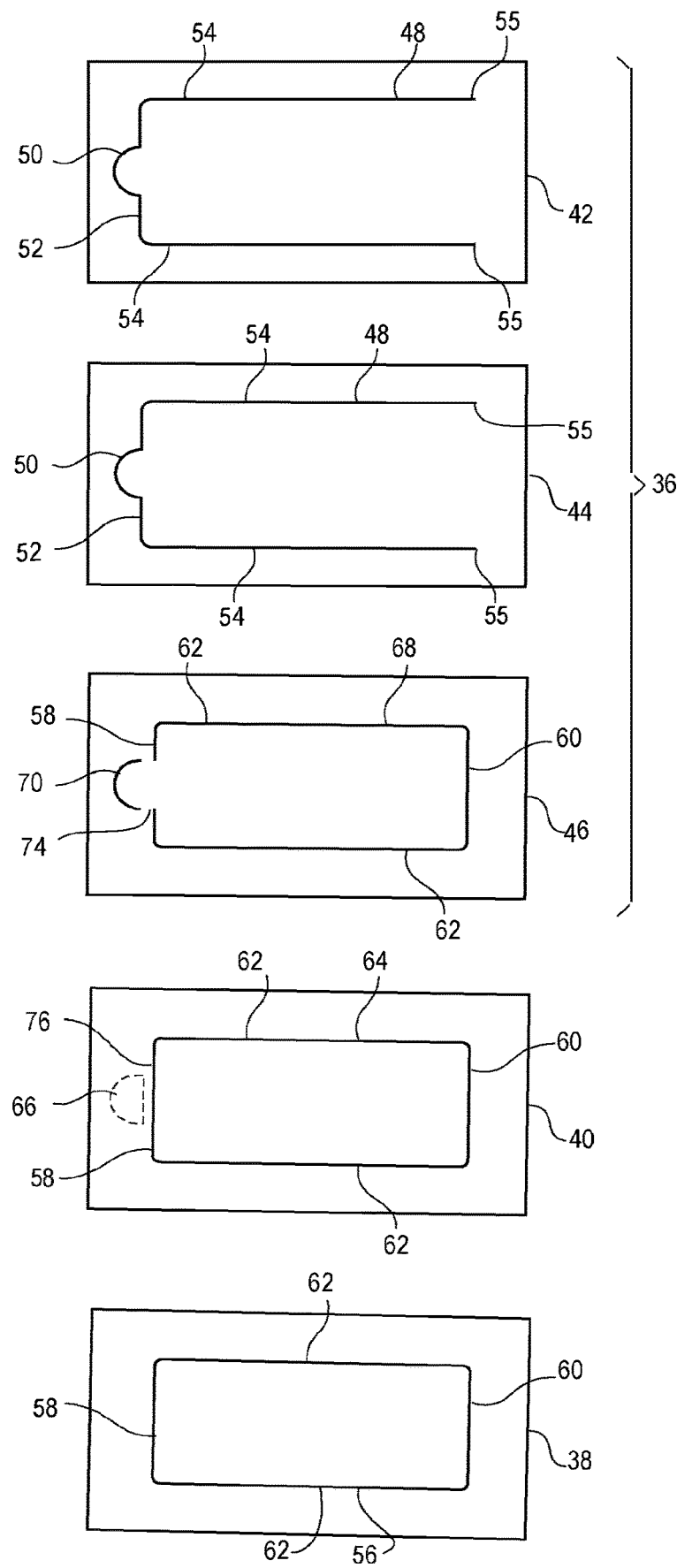
FIG. 7 is an top plan cut-out view of an upper web of film having three layers, a permanent adhesive, and a lower web of film showing details of a second example opening feature.
Figure 8:
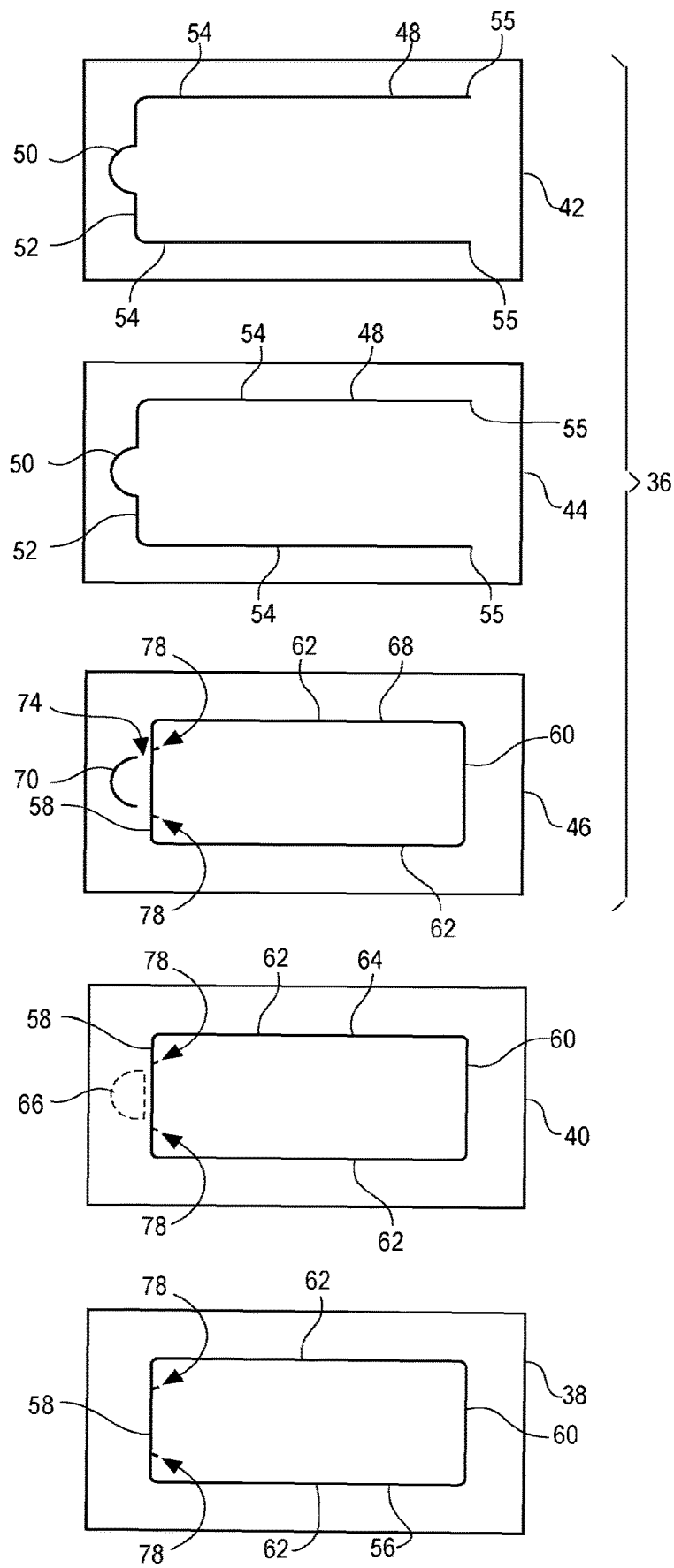
FIG. 8 is a top plan cut-out view of an upper web of film having three layers, a permanent adhesive, and a lower web of film showing details of a third example opening feature.
Figure 9:
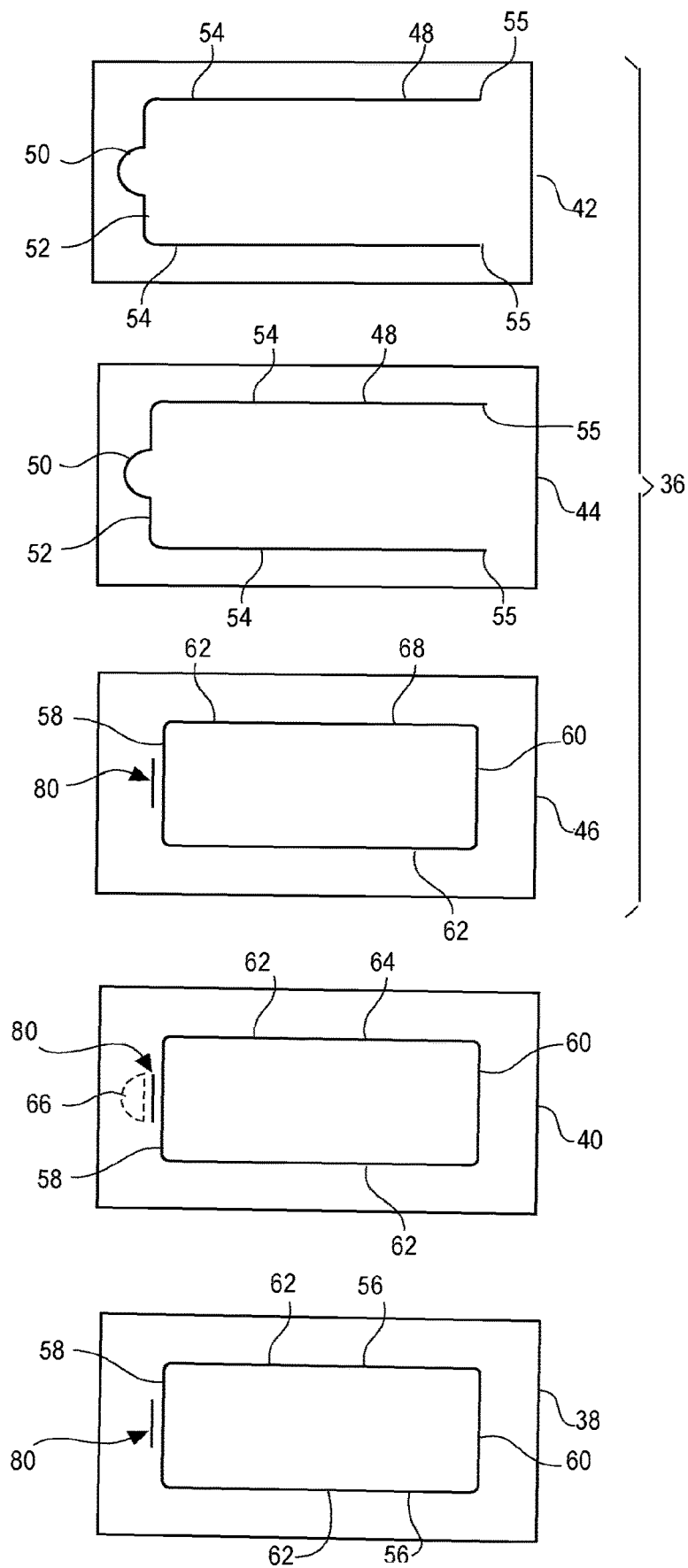
FIG. 9 is a top plan cut-out view of an upper web of film having three layers, a permanent adhesive, and a lower web of film showing details of a fourth example opening feature

While the above laminate described with respect to FIG. 6 can provide satisfactory results, alternative laminates shown in FIGS. 7-9 omit 74 the added length of the sides 72 of the middle tab portion 68 so that there are no cuts that align through the entire thickness of the laminate 12. This ensures that a hermetic seal is maintained throughout storage, transportation, and display of the film package 10. As such, each form includes alternative structural detail in order to provide easy opening and desired propagation of the tear when opening the package 10 given the omitted side portions 74.

In a second form, shown in FIG. 7, in addition to the omitted portions 74 of the sides of the middle tab portion 70, the open portion 66 of the permanent adhesive layer 40 is larger and extends an additional distance toward the forward edge 58 of the adhesive cut 64 leaving a relatively small strip of permanent adhesive 76 disposed next to the forward edge 58. The width of the strip is reduced to encourage a tear during opening that will skip or bypass this area and propagate correctly along the forward, side and rearward edges, 58, 62, 60 exposing the reseal margins 47, 49. In one non-limiting example, the width of the strip can be between about 5 mm and about 40 mm wide, and more specifically between about 10 mm and about 15 mm, and more specifically between about 12 and about 13 mm wide to provide satisfactory resealing during use. Of course, it will be understood that particular applications, contents, and package sizes may require other sizes. Accordingly, the strip width can be optimized for each specific application.

Additionally, the forward edge 58 in the bottom film layer 46 is broken in an intermediate portion thereof, which as illustrated is aligned with the tab portion 70. Without the sides 72 of the middle tab portion 68, a tear created by a consumer while opening may propagate uncontrollably creating an undesirable opening. In order to avoid this, the opening feature 20 as described in this second form breaks the forward edge 58 in the bottom film layer to avoid the tear undesirably propagating inwardly rather than outwardly towards the side portions 62. Moreover, the portion of permanent adhesive between the open tab portion 66 and the forward edge 58 is minimized while ensuring an initial hermetic seal which minimizes the force that a consumer has to apply during opening, which provides the consumer with more control over the tear after breaking this portion of permanent adhesive.

In a third form, shown in FIG. 8, in addition to the omitted portions 74 of the sides 70, the middle forward edge 58 is unbroken so that it is substantially identical to the bottom and adhesive cuts 56, 64. Moreover, each of the bottom, adhesive, and middle cuts 56, 64, 68 include notches or small cuts 78 that project inwardly from the forward edge 58 thereof. More specifically, the notches 78 extend at an angle with respect to the forward edge 58 and are directed towards their respective side edges 62. As shown, the notches 78 are generally longitudinally aligned with the sides 35 of the tab 32. So configured, if during opening, the tear does not propagate outwardly along the forward edge 58 correctly, the notches 78 direct the tear outwardly to intersect with the side edges 62 so that the remaining portion of the tear propagates correctly. Although the notches 78 are shown on the bottom film layer 46, the permanent adhesive layer 40, and the inner web 38, individual ones or combinations of two of each can alternatively be used.

In a fourth form, shown in FIG. 9, the middle tab portion 70 is entirely omitted. Instead, each of the bottom film layer 46, the permanent adhesive layer 40, and the inner web 38 includes a front cut 80 that is spaced forwardly of the forward edge 58 and runs generally parallel thereto. In the illustrated form, the front cut 80 is generally aligned between the shoulder portions 52 of the outer cut 48, and preferably is sized to extend substantially the entire length therebetween. Additionally, the open portion 66 of the permanent adhesive layer 40 is smaller so that the permanent adhesive surrounds the front cut 80. This maintains the hermetic seal of the film package 10 and creates a hard stop during opening against which a consumer must pull. The front cut 80 creates a break point that exposes the middle tacky layer 44 and therefore the reseal margins 47, 49 during opening and directs an opening tear to the inner cut 56. Although the front cut 80 is shown on the bottom film layer 46, the permanent adhesive layer 40, and the inner web 38, individual ones or combinations of two of each can alternatively be used. So configured, a consumer can grip the tab portion 32 and pull outwardly and rearwardly to open the package 10. The consumer must first break the permanent adhesive disposed forwardly of the front cut 80 while opening. After breaking this portion of permanent adhesive, the front cut 80 provides a break point so that the opening then tears along the bottom film layer 46 to expose the tacky layer 44. This tear continues rearwardly to intersect with the forward edge 58 continue to propagate therealong as desired.

In a further approach, the outer web 36 can be transparent or translucent and the permanent adhesive layer 40 can include ink or other printing/indicia thereon. As such, a consumer would see through the outer web 36 to the permanent adhesive layer 40. This would clearly identify the gripping tab 32 due to the open portion 66 of the permanent adhesive layer 40. Moreover, the inner web 38 can be opaque in order to prevent light from entering the package interior 30. Alternatively, the printing can be done on the outer web 36 in surface or by reverse printing.

Additionally, the opening feature 20 as described herein provides tamper evident features due to the permanent adhesive breaking during initial opening of the flap as well as the alignment of the flap 24 during reseal. Further, the transparent or translucent approach discussed above can clearly display to a consumer when a package has been previously opened due to damage to the permanent adhesive during opening.

Figure 11:
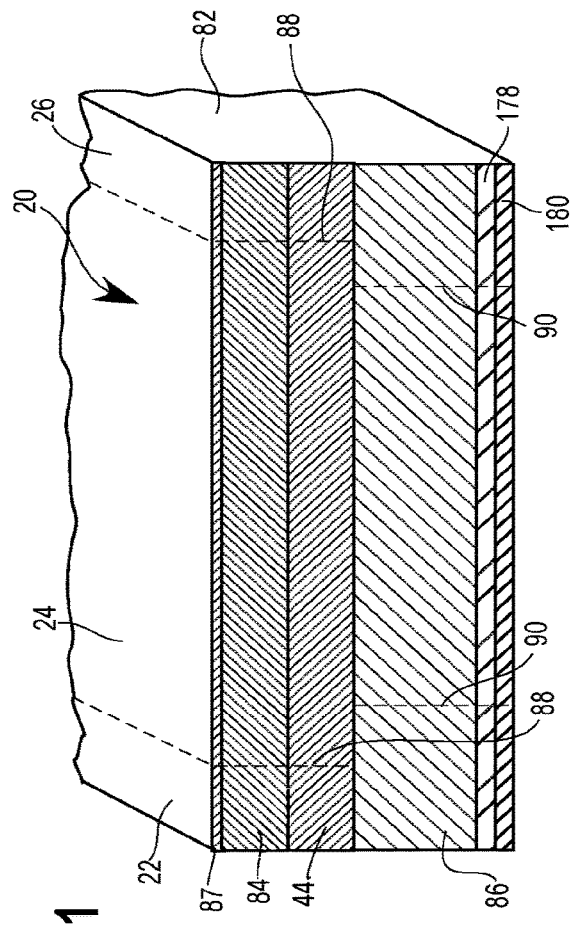
FIG. 11 is a cross-sectional view of the segment of the top of the package of FIG. 10 taken along the line 11-11 showing inner and outer cuts of the opening feature in a closed configuration.
Figure 12:
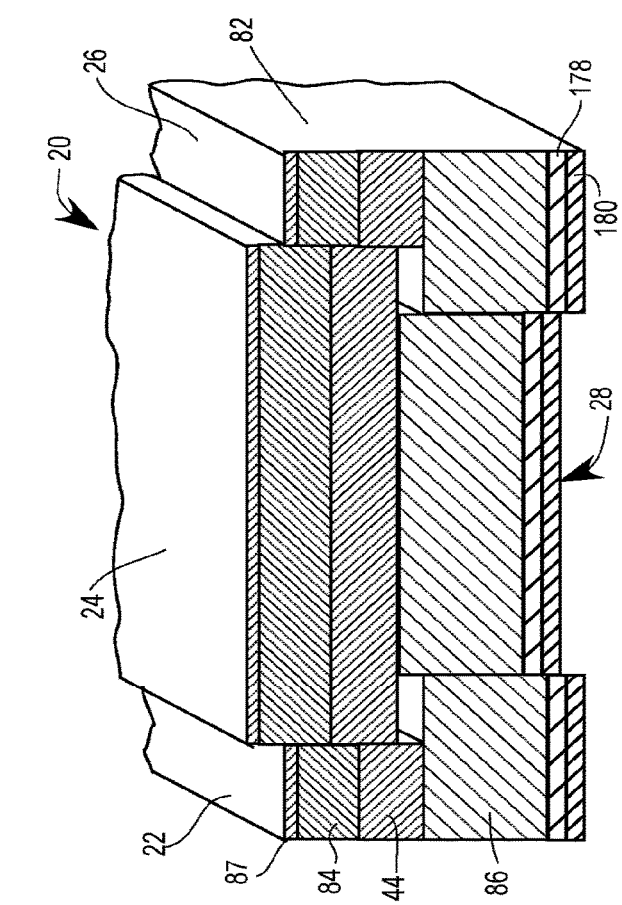
FIG. 12 is a cross-sectional view of the segment of the top of the package of FIG. 10 taken along the line 12-12 showing inner and outer cuts separated in an open configuration.

In another form, the film 12 can be a coextruded film. As shown in FIGS. 1A, 1B, 1C, and 10-13, the package 10 of this form utilizes a coextruded film 82. As discussed above, a single step coextrusion produces a film with at least an outer film layer 84 and an inner film layer 86 with the tacky layer 44 encapsulated or disposed therebetween. As such, the tacky layer can stick or cling to the outer and/or inner film layers 84, 86 so that the package 10 can be easily and repeatedly resealed and reopened. By one approach, the outer film layer 84 is permanently adhered or attached to the tacky layer 44 and the inner film layer 86 is a release layer configured to provide separation from and reseal to the tacky layer 44. The film layers can be produced in any of the ways described above. Example coextruded film cross-sections are shown in FIGS. 11-13. In another embodiment, such as that shown in FIG. 10A, the flap 24 can extend to the end seal 14 and the tab 32 can extend therepast.

"Traditional" pressure sensitive adhesives are usually based on acrylics, bio-based acrylate, butyl rubber, natural rubber, silicone rubber with special tackifiers, styrene block copolymers (SBC), styrene-butadiene-styrene (SBS), styrene-ethylene/butylene-styrene (SEBS), styrene-ethylene/propylene (SEP), styrene-isoprene-styrene (SIS), vinyl ethers, ethylene-vinyl acetate (EVA) with high vinyl acetate content, and nitriles. These traditional pressure-sensitive adhesives can be manufactured with either a liquid carrier or in 100% solid form. Articles such as tapes and labels are made from liquid pressure sensitive adhesives (PSAs) by coating the adhesive on a support material and evaporating the organic solvent or water carrier, usually in a hot air dryer. The dry adhesive may be further heated to initiate a cross-linking reaction and increase molecular weight. 100% solid pressure sensitive adhesive may be low viscosity polymers that are coated and then reacted with radiation to increase molecular weight and form the adhesive (radiation cured pressure sensitive adhesive); or they may be high-viscosity materials that are heated to reduce viscosity enough to allow coating, and then cooled to their final form (hot melt pressure sensitive adhesive (HMPSA)). In some cases, the traditional pressure sensitive adhesive has odor due to lower molecular weight components or uncured components, i.e., unreacted monomers remaining in cured products.

The benefits of a coextruded film as described herein include no odor in the resulting film, as compared to "traditional" pressure sensitive adhesives as described above. The benefits of a using polybutene and olefinic specialty elastomers and their blends as coextruded film layers as described herein include no odor in the resulting film because these are polyolefins that do not need to cure and do not need time for setting.

The benefits of a coextruded film as described herein further include a single step converting process, a contact sensitive reclose where the weight of the flap of the opening feature effectively recloses the opening feature without the need for additional pressure. Repeated reclose is realized at least in part by the engineering design of the chemistry of the tacky layer and the adjacent release layer, which has an affinity for one another, but less attraction to contamination. Moreover, the tacky layer as described herein is less tacky than "traditional" pressure sensitive adhesives and, as such, is less prone to contamination than traditional pressure sensitive adhesives to thereby provide more opening and reclosing cycles than traditional pressure sensitive adhesives. Additionally, the tacky layer as described herein provides a better compliance with the U.S. Food and Drug Administration and the European Food Safety Authority for use in direct food contact applications.

Moreover, as illustrated in FIG. 1B, a film package 10 made from a coextruded film includes a coextensive encapsulated tacky or bonding layer and, as such, opening features as described herein can be disposed anywhere on the package including on the top, sides, and bottom of the package, and extending therebetween. Although two opening features 20 are shown in FIG. 1B, the package could be adapted to specific uses, including for portion control, multiple serving, multi-compartment packages, specialty uses, and/or to create distinctive packaging to create consumer goodwill.

The coextruded film with the tacky layer as described herein can be challenging to make. For example, it is challenging to engineer the release layer to have the right polarity with regard to the tacky layer to achieve the desired balance between affinity between the release layer and the tacky layer and subsequent peel force. In addition, due to the single step process, printing is done on the outer surface of the film and, as such, may require additional protection over traditional laminated films that can have clear outer layers laminated after printing or a clear coating over the outer layer after printing. Moreover, an opening feature like those described herein is formed by cutting on both sides of a single coextruded web, rather than on separate films that can be laminated together at a later step.

An opening feature 20 is shown in FIGS. 1 and 10-13. As with the previous form, the opening feature 20 is at least partially defined by cuts or other lines of weakness formed by dies, lasers, or the like. Additionally, although the lines of weakness are shown as perpendicular in the figures, angled tears or fractures through the tacky resin also result in a viable reseal. Moreover, the package 10 can be resealed whether the tacky resin is entirely disposed on the outer film layer 84, entirely on the inner film layer 86, or portions on both such as when opening the package 10 fractures through the tacky resin 44 itself. The opening feature 20 includes the flap 24 of the top wall 22 that can be separated and partially pulled away from the remaining portion 26 of the top wall 22 to reveal the opening 28 into the interior 30 of the package 10. The flap 24 can include the gripping tab 32 that projects away from the main portion 34 of the flap towards the forward end seal 14. The tab 32 is configured to provide a consumer a convenient gripping surface for opening the package 10. As shown, the tab 32 includes the forward curved portion 33 and the generally parallel longitudinal sides 35.

Unlike the earlier form, the tab 32 of this form is adhered to the tacky layer 44. As such, a consumer can peel the tab 32 to delaminate the tacky layer 44 from the outer and/or innerfilm layers 84, 86. Accordingly, after peeling the tab 32 away from the top wall 22, the consumer can continue to pull the flap 24 away from the top wall to open the package 10. Pulling the flap 24 generally away from the top wall 22 breaks or separates cuts in the outer film layer 84 and the inner film layer 86 to expose the opening 28, as well as the reseal margin 47 of the middle tacky layer 44 and the reseal margin 49 of the inner film layer 86. Alternatively, the tab 32 can extend past the end seal 14, such as in the embodiment shown in FIG. 10A, and the consumer can grip and pull the tab 32 so that the film breaks at the end seal 14 to break or separate cuts in the outer film layer and the inner film layer 86 to expose the opening 28, as well as the reseal margin 47. The reseal margins 47, 49 are created by lines of weakness in the outer film layer 84 being dimensionally larger than cuts in the inner film layer 86, as described in greater detail below. By non-limiting example, the reseal margins 47, 49 can be between about 5 mm and about 40 mm wide, and more specifically between about 10 mm and about 15 mm, and more specifically between about 12 and about 13 mm wide to provide satisfactory resealing during use. Of course, other measurements and sizes can also be utilized for particular applications as needed or desired. For example, a relatively small package can utilize an approximately 5 mm reseal margin, while a larger package can utilize an approximately 10-15 mm reseal margin. So configured, a consumer is provided the convenience of a resealable package without the need for multiple adhesives being disposed in patterns on the same plane or layer within the laminate.

The opening feature 20 of this form includes an outer cut 88 that extends at least partially through the outer film layer 84 and an inner cut 90 that extends at least partially through the inner film layer 86. In another form shown in FIGS. 11 and 12, the inner cut 90 can also extend through a tie layer 178 and a polyethylene layer 180 disposed adjacent to the inner film layer 86. In yet another form shown in FIGS. 14 and 15, the film includes the outer film layer 84, the tacky layer 44, the inner film or release layer 86, the sealant layer 162, and optional cold seal areas 164. Moreover, portions or all of the outer and/or inner cuts 88, 90 can extend into or through the tacky layer 44. The outer cut 88 includes a top tab portion 91, outwardly extending shoulder portions 92, and opposite side portions 93 that run longitudinally down the package top wall 22 toward the rearward end seal 16. If desired, distal ends 94 of the side portions 93 can have tear stopping features, such as hooks or the like. The inner cut 90 can include a forward edge 95, a rearward edge 96, and side edges 97 that define the opening 28 into the package 10 and creating a bottom portion of the flap 24. In this form, the inner cut 90 has a rectangular shape with slightly rounded corners that help with controlled propagation during opening. Of course, other shapes can also be utilized, whether depending on the shape of the package, for specific package contents, or other desired aesthetic. For example, the bottom cut can include curvilinear portions creating rounded ends and/or sides, a waisted portion, or the like.

Other embodiments do not require an outer cut such as those shown. For example, the tab portion 91 can be cut into the outer film layer 84 and pulling on the tab can interact with cuts made in the inner film layer 86. With this configuration, the outer film layer 84 tears during opening. In one form, this tearing can be controlled by utilizing a film with tear-directing properties.

The films as described herein can be formed into a package, such as a food package, via heat seals utilizing a sealant layer or via cold seals utilizing a pattern coated cold seal.

Two issues can arise when creating an opening feature in a coextruded film with an intermediate tacky layer, such as those described above. One issue is that the opening force required to initially separate the layers of film to delaminate the film layer from the tacky layer and expose the tacky layer for subsequent reclose may be too strong such that controlled opening may not occur. For example, if the opening force is too strong, the film may not open along designated cuts or scribed lines and instead tear uncontrollably. Likewise, if the opening force is too weak, the package may be opened unintentionally or may not provide a satisfactory seal. Another issue that can occur is that, once exposed, the tacky layer and adjacent film layer may not read here together sufficiently to reclose the package after opening.

Accordingly, the object of the present disclosure is to provide a coextruded film for packaging that includes an embedded or encapsulated tacky layer of thermoplastic and/or elastomeric material with an adjacent release layer that can be utilized to produce an opening feature with smooth and consistent peel strength during opening and during multiple reclose operations. To achieve this, the tacky layer delaminates or separates from an adjacent "release" film layer between die cuts. In one form, the tacky layer is a contact sensitive adhesive such that simply bringing the tacky layer and adjacent film layer into contact with one another is sufficient to reseal the opening feature. In another form, the coextruded film described herein is capable of being oriented in a tenter frame process. Moreover, the coextruded film described herein can be produced using most common film processing equipment and converting methods including, but not limited to, multilayer blown film processes (typical blown, or double bubble or triple bubble), multilayer cast film, machine direction orientation (MDO), biaxial orientation, extrusion coating, and the like. Optionally, the coextruded films described herein with encapsulated, coextensive tacky layers can be combined with typical biaxially-oriented polyethylene terephthalate (BOPET), biaxially-oriented polypropylene (BOPP), blown film, or cast film, with or without ink, with or without metallization or high barrier coating through lamination to form a further film. In addition, the coextruded films described herein can be metalized or treated with higher barrier coating for final application.

While not wishing to limited by theory, it is believed that the polarities of the material of the tacky layer and the adjacent release layer affect both the initial bond between the layers, and therefore the required opening force, and subsequent resealing adherence or tackiness. Additionally, it is believed that polarity is a larger factor than crystallinity in this regard. The tacky layer materials described herein are non-polar. Suitable materials for the tacky layer 44 include a polybutene resin, olefinic elastomers, and blends thereof. The following examples are included to illustrate the disclosure herein and not to limit it. Unless noted otherwise, all parts, percentages, and ratios in the disclosure and examples are by weight.

Table 1 below includes the known or estimated polar component of surface free energy (shown in mJ/m2 (equivalent to dynes/cm)). Materials having similar, i.e., a difference of about 1-5, in these polar component values will exhibit satisfactory peeling and resealing.

TABLE 1

| Material | $\gamma_s^P$ | |
|---|---|---|
| paraffin | 0 | |
| Polyethylene | 1.4 | |
| vistamaxx | 2.1 | estimated value |
| PP | 2.4 | |
| PB-1 | 2.6 | estimated value |
| EMA | 3.2 | |
| nylon 636 | 4.4 | estimated value |
| nylon 6,12 | 4.7 | |
| nylon 12 | 5.2 | |
| EPDM | 5.8 | |

TABLE 1-continued

| Material | $\gamma_s^P$ |
|---|---|
| PET | 7.2 |
| nylon 6 | 9.6 |
| nylon 6,6 | 9.8 |

Example coextruded film structures are shown in FIG. 13. In each example, a polypropylene material can be an outer film layer 84 and a polyamide material can be the release layer. Moreover, in each example, the tacky layer 44 can be a polybutene-1 resin, a copolymer of polypropylene and polyethylene plastomers and elastomers, or blends thereof.

Figure 13A:
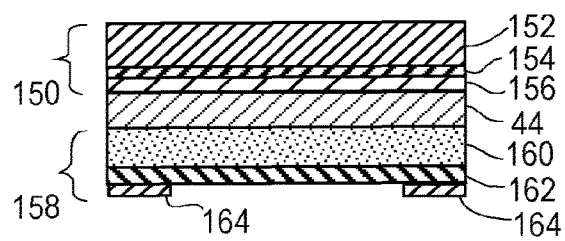
FIG. 13 is a cross-sectional view of several example coextruded and coextruded and laminated film structures
Figure 13B:
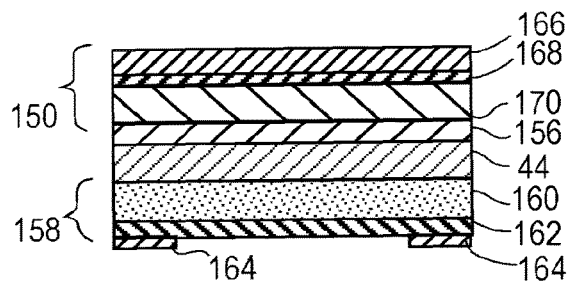
Figure 13C:
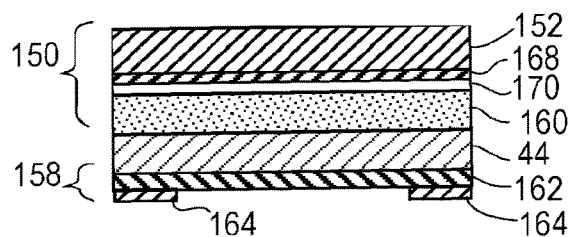
Figure 13D:
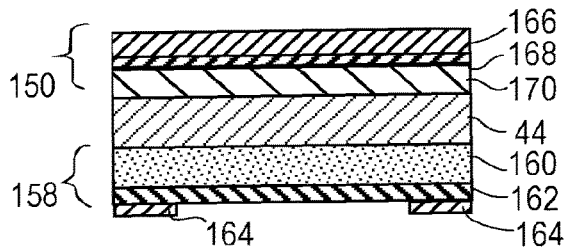
Figure 13E:
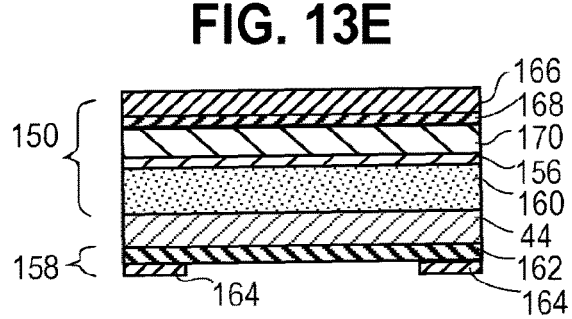
Figure 13F:
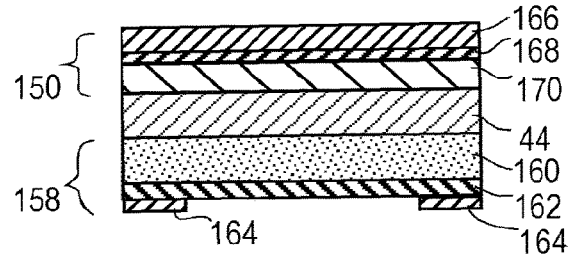

Additional example layers are shown in the various cross-sections of FIGS. 13A-13F. As shown, each film cross-section includes the tacky or bonding layer 44 with one or more layers above and below the tacky layer 44. Beginning with FIG. 13A, an outer film portion 150 can include a top film layer 152, an ink and/or lamination layer 154, and an outer layer 156. An inner film portion 158 can include a release layer 160, a barrier sealant or inner layer 162, and optional cold seal areas 164. As shown in FIG. 13B, in another form, the outer film portion 150 can include a protective coating layer 166, an ink layer 168, an optional metallization layer 170, and the outer layer 156. In this form, the inner film portion 158 can include the release layer 160, the barrier sealant or inner layer 162, and the optional cold seal areas 164. As shown in FIG. 13C, in another form, the outer film portion 150 can include the top film layer 152, the ink layer 168, the optional metallization layer 170, and the release layer 160. In this form, the inner film portion 158 can include the barrier sealant or inner layer 162 and the optional cold seal areas 164. As shown in FIG. 13D, in another form, the outer film portion 150 can include the protective coating layer 166, the ink layer 168, the optional metallization layer 170, the outer layer 156, and the release layer 160. In this form, the inner film portion 158 can include the barrier sealant or inner layer 162 and the optional cold seal areas 164. As shown in FIG. 13E, in another form, the outer film portion 150 can include the protective coating layer 166, the ink layer 168, and the optional metallization layer 170. In this form, the inner film portion 158 can include the release layer 160, the barrier sealant or support layer 162, and the optional cold seal areas 164. As shown in FIG. 13F, in another form, the outer film portion 150 can include the protective coating layer 166, the ink layer 168, the optional metallization layer 170, and the release layer 160. In this form, the inner film portion 158 can include the barrier sealant or inner layer 162 and the optional cold seal areas 164.

Figure 16:
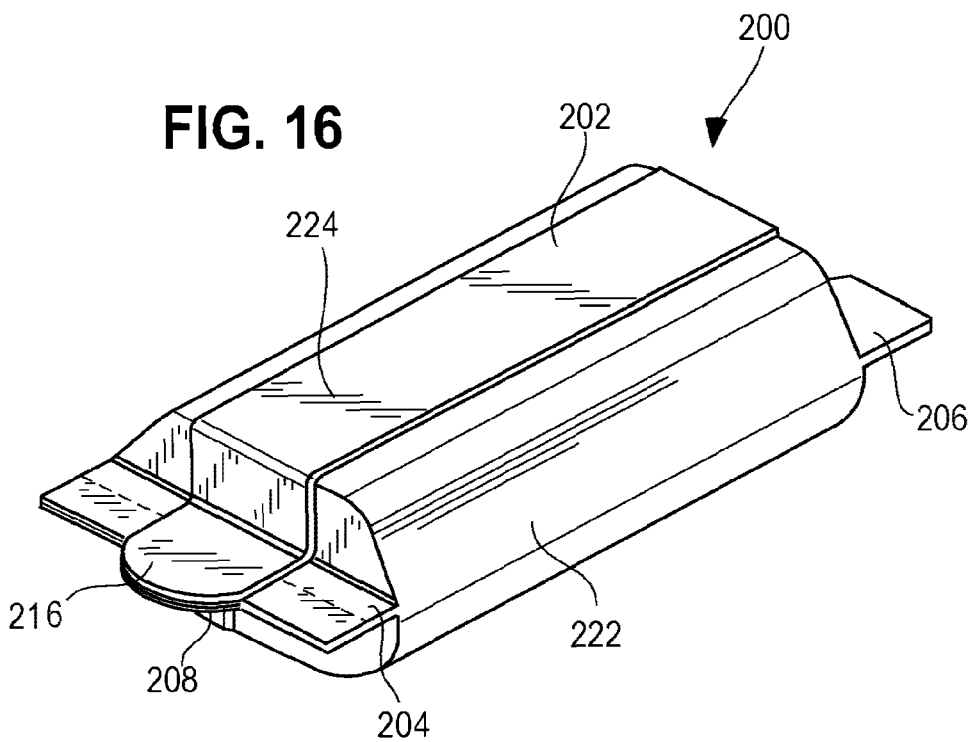
FIG. 16 is a perspective view of a flexible film package having an opening feature.
Figure 17:
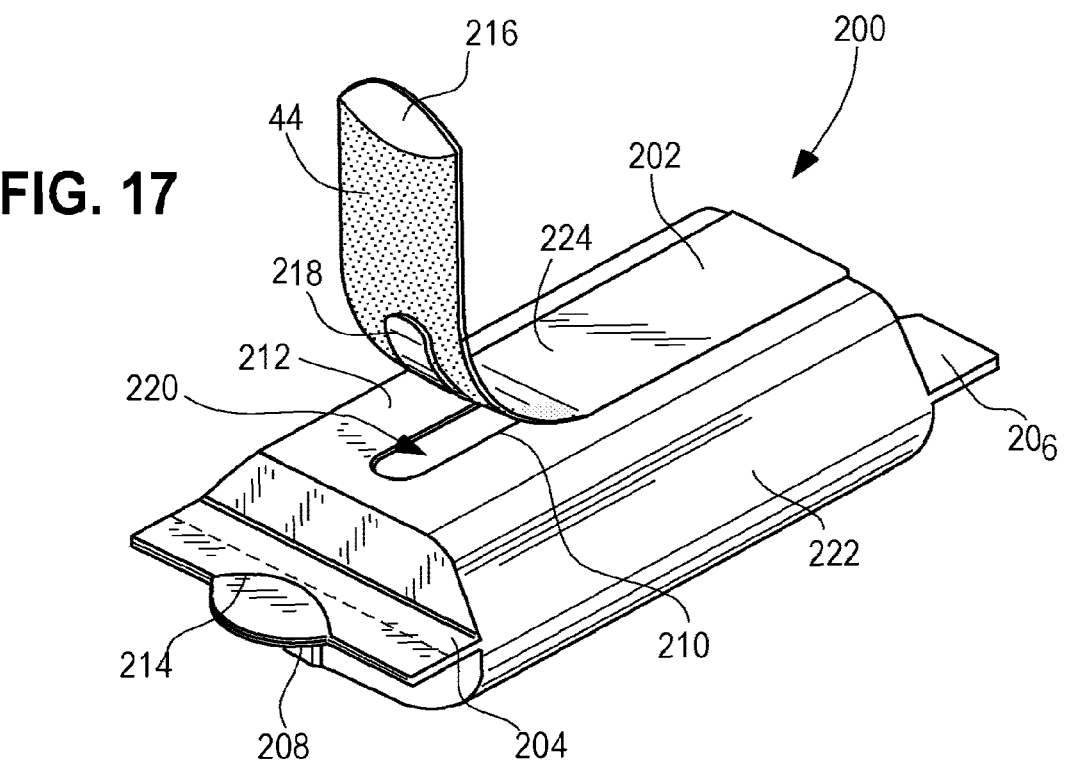
FIG. 17 is a perspective view of the flexible film package of FIG. 16 showing the opening feature in a partially open configuration.
Figure 18:
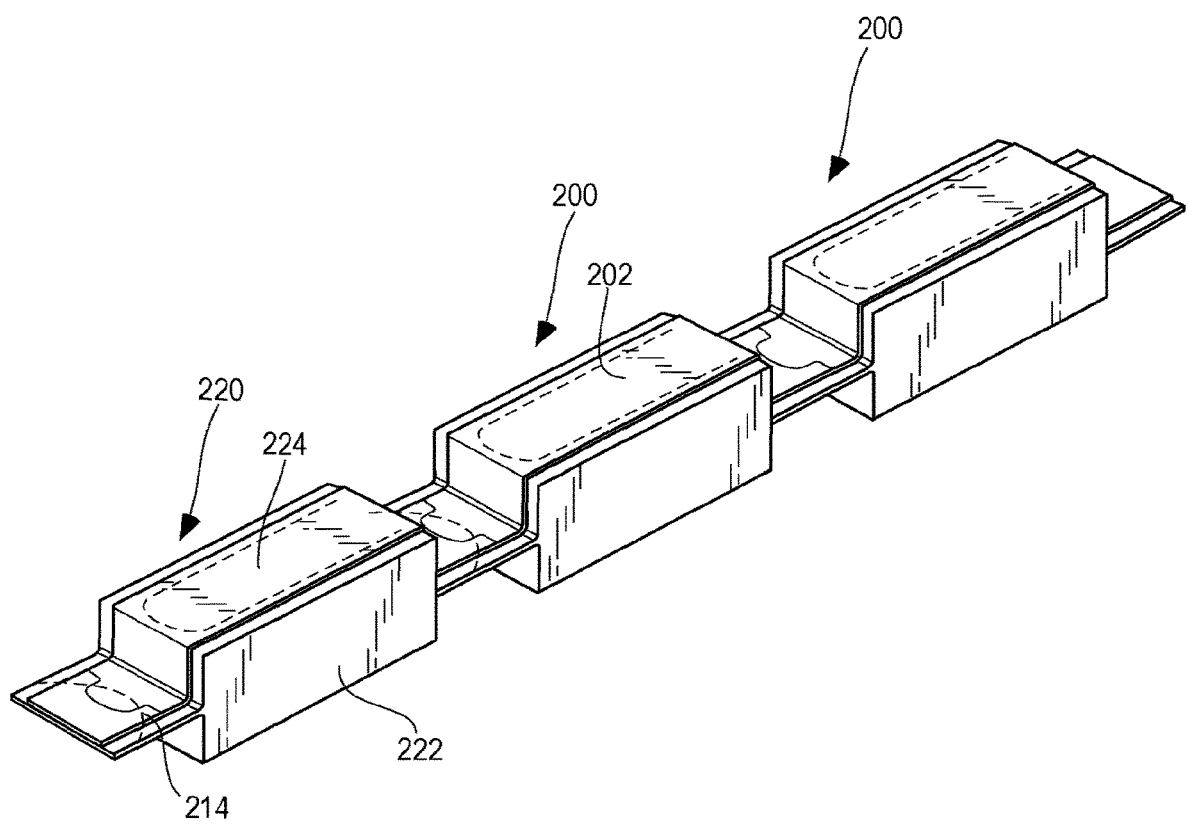
FIG. 18 is a perspective view of the flexible film package of FIG. 16 in a continuous flow-wrap configuration after formation of end seals.
Figure 19:
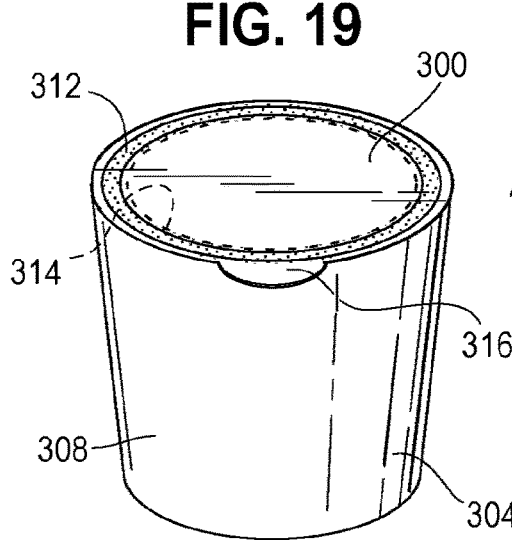
FIG. 19 is a perspective view of a package having a film sealed to a base.
Figure 20:
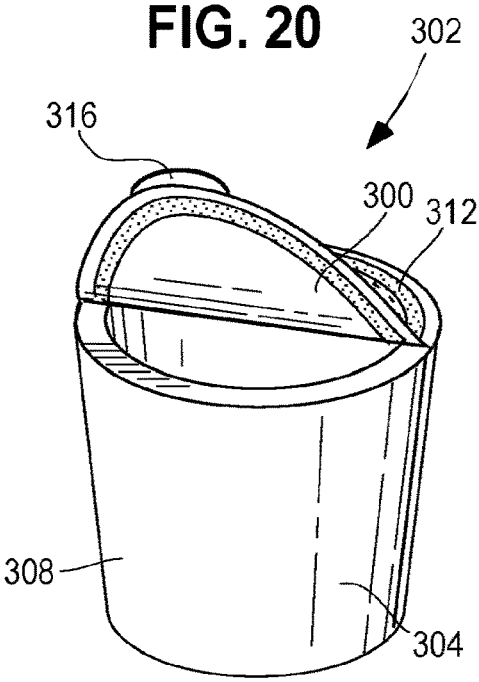
FIG. 20 is a perspective view of the package of FIG. 19 showing the film partially peeled back to provide an opening to the base.
Figure 21:
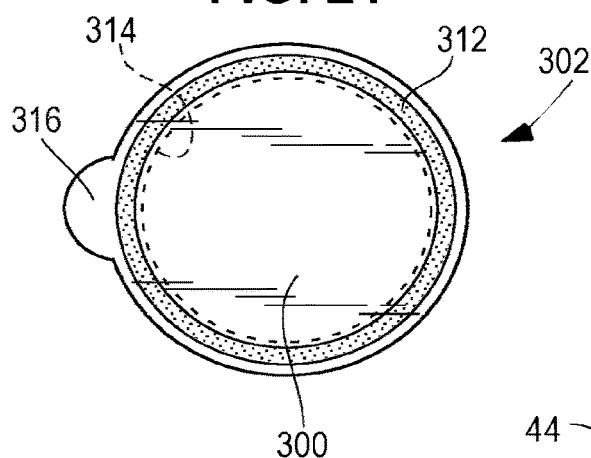
FIG. 21 is a top plan view of the package of FIG. 19.

Another embodiment of a package is 200 shown in FIGS. 16-18. In this form, a continuous strip of film or closure layer 202 extends from a first end seal 204 to a second end seal 206. The package 200 can further include a fin or longitudinal seal 208 extending between the first and second end seals 204, 206. The package 200 includes an opening cut or score 210 in a top 212 thereof and a tab cut or score 214 in or adjacent to the first end seal 204. The closure layer 202 is applied to the film to cover both the opening cut or score 210 and the tab cut or score 214. As such, a consumer can grip a tab 216 of the closure layer 202, which includes a portion of the film of the package by virtue of the tab cut or score 214, and pull the closure layer 202 away from the top 212 and rearwardly along the package 200 to expose the opening cut or score 210. The closure layer 202 can adhere to a portion 218 of the top 212 to expose an opening 220 to the package interior. The films 222, 224 of the package 200 and closure layer 202 can take any of the forms described herein, except that the top 212 of the package is the release layer described herein and that the bottom layer of the closure layer 202 is the tacky or bonding layer described herein. As such, the closure layer 202 can be applied to the package top 212 and release easily therefrom.

As shown, the closure layer 202 extends only partially over the width of the flexible film that forms the film package 200. It is also contemplated, however, that the closure layer 202 may extend the entire width of the package but only be partially disposed over the length of the film. More particularly, the closure layer 202 preferably does not extend both the entire width and the entire length of the package. The closure layer 202 is partially disposed in either direction (i.e., the length or width) and continuously disposed in the other of the directions. In one approach, the closure layer 202 is continuously applied along one axis of the film and is only partially applied along the axis normal to the continuously applied axis. Thus, the flexible film packages 200 may have a closure 202 that runs the entire length of the package and over only a portion of the width or a closure 202 that runs the entire width of the package and over only a portion of the length of the package.

Advantageously, packages 200 configured as discussed above with respect to FIGS. 16 and 17 can be produced using a continuous flow wrap process. As noted, the closure layer 202 can be applied continuously along the longitudinal length of the flow or web of the package film 222. Once products are at least partially enveloped and sealed within the web of film 222, the film 222 and closure film 224 may be cut into individual packages 200. FIG. 18 illustrates a series of formed packages that have not been separated from one another. As shown, the tabs 216 may be formed, in part, by the arcuate tab score or cut 214 formed, in part, on a roll of film, and disposed at least partially at leading end seal 204. When the individual packages 200 are cut from the film 222, 224, a leading edge or profile of the tab 216 may be formed. For example, the leading seal on a first package has a profile matching a trailing seal on a second package. Thus, the tab 216 may have a front edge that is arcuate and defined, in part, by the leading edge of the package and may have a rear, trailing edge that is arcuate and defined, in part, by the arcuate score line 214.

As discussed herein, the method of manufacturing and assembling the packages can employ heat seal mechanisms, cold seal mechanisms, extension and adhesive lamination mechanisms, and co-extrusion mechanisms. The equipment employed may depend on the desired package configuration. For example, if a tab includes a cut-out portion of film adhered to the closure layer, the tab may be created by adhering or applying the closure layer to the film and scoring and/or cutting the tab. In addition, various score configurations may be employed, and the equipment for forming the score line may depend on the score configuration thereof.

Figure 22:
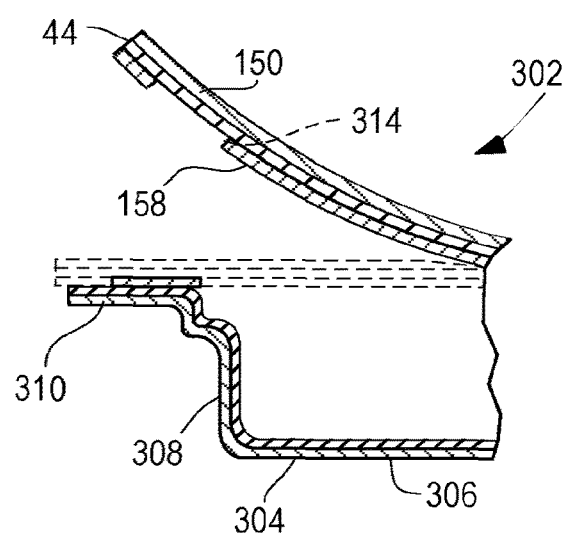
FIG. 22 is a side cross-sectional view showing the film structure and base of the package of FIG. 19 as the film is peeled back to open the package.

A film 300, having any of the configurations described herein, can also be utilized in a package 302 having a rigid or semi-rigid base 304. The base 304 can include a bottom wall portion 306, a sidewall portion 308 upstanding from the bottom wall portion 306, and a flange 310 projecting outwardly from a top of the sidewall portion 308. As shown, the film 300 is sealed to the base 304 along the flange 310 thereof creating a heat seal region 312 of the film 300 corresponding to the flange 310. For simplicity, the film 300 is shown in FIG. 22 as including three layers, the outer film portion 150, the tacky or bonding layer 44, and the inner film portion 158. It will be understood, however, that the outer and inner film portions 150, 158 can take any form as described herein.

To provide an opening feature, the film 300 can include a die cut or score 314 extending completely or partially around the flange 310 inwardly adjacent thereto. Additionally, the film 300 can include a tab 316 to provide a consumer with an easy gripping portion. So configured, a user can grip the tab 316 and pull the film 300 generally away from the base 304. The film 300 breaks at the heat seal region 312 such that the inner film portion 158 remains sealed to the flange 310 and the tacky or bonding layer 44 is exposed. Thereafter, opening reaches the die cut or score 314 and the inner film portion 158 inwardly of the die cut or score 314 remains adhered to the tacky or bonding layer 44. Accordingly, the tacky or bonding layer 44 is only exposed in the region coinciding to the flange 310 and can be repeatedly reapplied and removed therefrom as desired.

Figure 23:
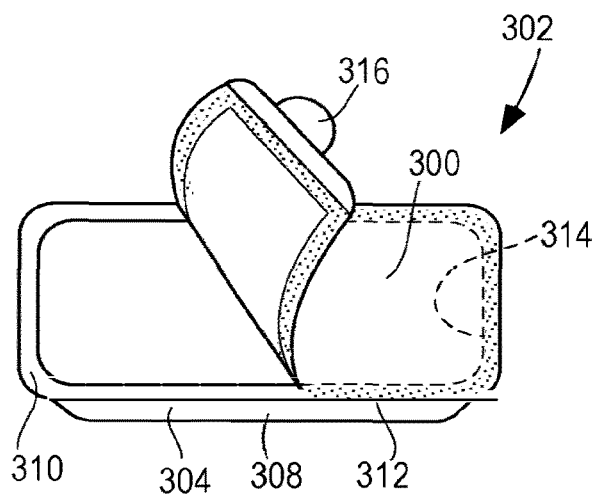
FIG. 23 is a perspective view of another package having a film sealed to a base.
Figure 24:
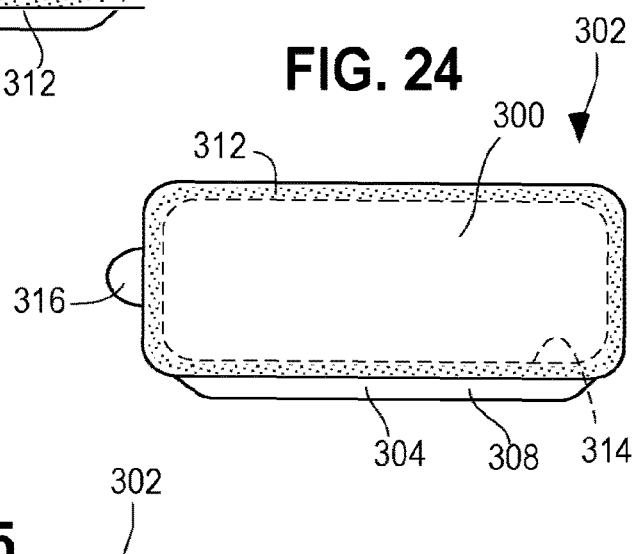
FIG. 24 is a perspective view of the package of FIG. 23 showing the film partially peeled back to provide an opening to the base.
Figure 25:
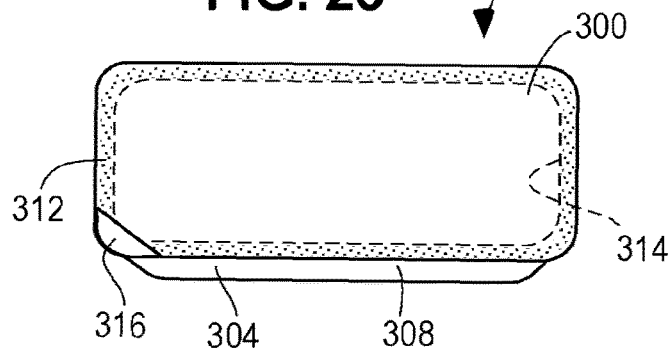
FIG. 25 is a top plan view of an alternative configuration of the package of FIG. 23 showing a pull tab of the film in a corner thereof.

The package 302 can take any desired form. In the form of FIGS. 19-22, the base 304 includes a circular bottom wall portion 306 and an annular sidewall portion 308. In the form of FIGS. 23-25, the base is generally box-shaped with a rectangular bottom wall portion 306 with four sidewall portions 308. With a configuration having multiple sidewall portions 308, the tab 316 can be configured to project along an edge, as shown in FIG. 23, or a corner, as shown in FIG. 25, thereof.

Figure 26:
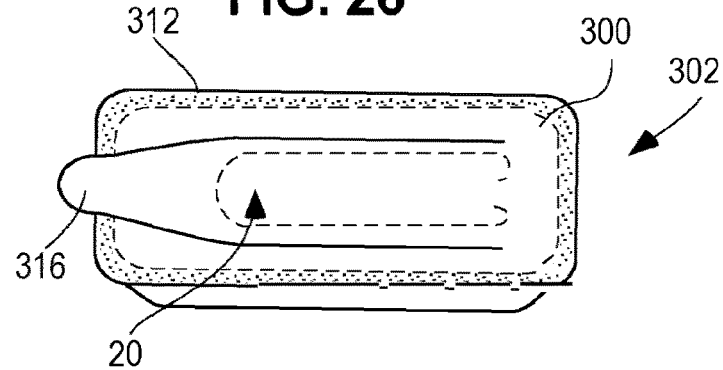
FIG. 26 is a perspective view of an alternative configuration of the package of FIG. 23 showing an opening feature in the film with a pull tab extending past a heat seal of the film to the base.

In another form, the film 300 can include an opening feature 20, as described herein. For example, the package 302 can include an opening feature such as that shown in FIG. 1A with the opening feature spaced inwardly from the flange 310 and the heat seal region 312 of the film 300. Alternatively, as shown in FIG. 26, the film 300 can include an opening feature 20 such as that shown in FIG. 1C with the flap 24 extending to the heat sealed region 312 and the tab 316 extending past the heat sealed region 312.

A rolling ball tack test was also performed on samples of the bonding or tacky material, which was a modified version of ASTM D3121 and followed the test method parameters of ASTM D3121, unless otherwise specified. Tack is generally determined by the rolling ball method, where a steel ball is released from the top of an incline, allowed to accelerate down the incline and roll across the horizontal surface of the pressure-sensitive adhesive. The relative tack is determined by measuring the distance the ball travels across the adhesive before stopping. Relative degree of tack is compared among formulation variations according to the distance the ball travels from the end of the ramp. The longer the distance, the less tacky the surface. So, the shorter the travel distance, the higher the tack. In this modified version, a glass ball was used instead of a steel ball and the release point on the incline was shortened due to the low tack nature of our surfaces. The modified test measured how strong the surface of the coating adhered to non-like materials, such as the polar surface of a rolling glass ball. In the modified rolling back tack test herein, the smallest steel ball (5/32 inch) was used and the release point was 2.25 to 2.5 inches up the ramp. Make sure the tester is well leveled before testing. Also make sure the testing table is leveled as well for film to stay flat. Use tapes at both ends to secure the flatness of the film before testing. The bonding or tacky layer herein is preferably about 4 to about 100 mm of rolling ball tack.

The rolling ball method included: releasing a glass ball or steel ball which was placed two inches to 2.5 inches up the standard incline specified in the ASTM method and allowing the ball to accelerate down the incline and roll across a horizontal surface of the pressure sensitive adhesive sample. The modified test version included using a glass ball instead of a metal ball, the glass ball having a diameter of about ¼ inch, and using a shortened release point off of the incline (i.e., as indicated above, two inches up the incline). As used herein, a steel ball 5/32 inch was used placed approximately 2.25 to 2.5 inches up the ramp (preferably 2.25 inches). The relative tack was determined by measuring the distance the ball traveled across the adhesive before stopping, beginning from the end of the ramp. A longer rolling ball travel distance indicated lower tack to the polar surface of the glass ball, and indicated that the coating has a lower tendency to stick to rollers and metal surfaces on packaging machines, compared to coatings with a shorter rolling ball travel distance which indicated a higher tack level. A longer rolling ball travel distance may also correlate to a lower tendency to adhere to food crumbs. In this measurement, the measurement was limited to a maximum of 4 inches because the maximum sample size available for testing was 4.0 inches× 4.0 inches. Results from the rolling ball tack test are shown in the Table below.

The surface energy of a substrate was measured by contact angle. The equipment used for this test included a G 10 contact angle measuring goniometer, diiodomethane, double distilled water, two syringes, a timer, and a micrometer. The procedure of the test is as follows:

(1) Place the substrate on the sample stage and draw a vacuum to flatten the surface. Turn on a light behind the stage, using the knurled knob on the back of the apparatus, to illuminate the stage. Remove the lens cap directly in front of the stage.

(2) Apply a 1-2 mm max. diameter sessile drop of either DI water or diiodomethane via the syringe to the surface. Do this by squeezing a small drop from the syringe, then raising the stage until close enough for the drop to transfer to the surface, while not touching the needle itself to the surface. Use a micrometer to gauge drop size. Then lower the stage until the drop is visible through the eyepiece.

(3) Position the cross hairs on the contact point of the liquid drop and the surface being measure. Move the stage using (e) and (f) to line up the origin of the cross hairs with the right end of the drop, at the contact pint (i.e., the point at which the bottom of the drop meets the drop reflection. Focus the drop using (a), or more preferably, (h).

(4) Rotate the cross hair to the position of the tangent point to the drop surface from the contact point of the drop and the surface, using (d).

(5) From the angular scale, record the tangent angle in degrees (0 to 180). Note the time it takes from placing the drop to recording the angle because surface energy is a time-dependent phenomenon. With practice, repeat measurements can be comfortably made in 1.5 minutes.

(6) Repeat five times to obtain five values keeping the same time interval as in (5).

(7) Change to the other liquid and repeat steps (2) through (6).

(8) Average the values obtained and calculate the surface energy of the substrate using the Fowkes Equation to calculate the polar and dispersive surface energies, as well as overall surface energy.

The surface energy was also measured using another test. The surface energy of a substrate is an indication of how easily the substrate wets out with an adhesive or coating. In polyolefins, it measures the degree of treatment and suitability for use with a given adhesive or coating. The equipment needed for this test includes cotton swabs and commercial treatment check solutions (such as AccuDyne test marker pens from Diversified Enterprises or equivalents). The procedure of the test is as follows:

(1) Choose a treatment check solution either from an educated guess of what the surface energy will be or start with a 38 dyne/cm² solution.

(2) Dip a clean cotton swab (never use a swab twice, not even in the same solution) in the solution and squeeze out excess solution on the side of the bottle below the rim.

(3) Wipe the side edge of the swab on the surface to be checked to cover approximately one square inch (not necessarily a one inch square) and immediately start timing or counting by thousands to approximate seconds.

(4a) If the solution breaks up in less than two seconds, the surface energy is less than the dyne number on the bottle used. Discard the swab, choose a lower numbered dyne/cm² solution bottle, a clean swab, and a fresh area on the surface of the substrate, and repeat steps (2) and (3).

(4b) If the solution has not broken up in three seconds, the surface energy is higher than the dyne/cm² solution bottle, a clean swab, and a fresh area on the surface of the substrate, and repeat steps (2) and (3).

(4c) If the solution breaks up between two and three seconds, record the dyne/cm² number of the solution used as the surface energy of the substrate.

ball traveled much further on the surface of the blend of PB with Olefinic elastomer than on the surface of the Oreo PSA or shipping tape. As to samples V30, which has no recloseability, the ball traveled across a much longer distance on the surface (it was recorded as >17 mm). While for PA side of the release layer, the ball can travel all the way across the film surface and then continue off the surface. (>12 inch). On the other side, the surface energy recorded by the Dynes pen also showed lower surface energy of the bonding layers that were formed by blending PB with olefinic elastomers. Also, the PA surface (release layer) has much higher surface energy. Such as the PA636 from Nycoa 2012 is 50 dynes and blend of PA2012 with PA666 is 54 dynes.

EXAMPLES

The Examples herein are included to illustrate the disclosure herein and not to limit it. Unless otherwise noted, all percentages, ratios, and parts used throughout this disclosure are by weight.

Example 1

Exemplary outer films 36 were prepared with different blends for the tacky layer 44. Although, polybutene-1 (PB-1)

TABLE 2

Rolling Ball and Surface Energy Measurement Results

| Sample ID | Polybutene-1 (%) | Olefinic Elastomer (%) | Additive (%) | Inner Layer (Formula) | Rolling Ball on bonding layer (mm) | Dynes Pen on bonding layer (Dynes) |
|---|---|---|---|---|---|---|
| 1 (Comparative) | — | — | — | PP/PET | 2.38 | 36 |
| 2 (Comparative) | — | — | — | PP/PET | 3.46 | 36 |
| 3 (Inventive) | 75 | 25 | — | PA | 4.46 | 32 |
| 4 (Inventive) | 50 | 50 | — | PA | 5.13 | 32 |
| 5 (Inventive) | 25 | 75 | — | PA | 5.65 | <32 |
| 6 (Inventive) | 0 | 100 | — | PA | 7.28 | |
| 7 (Comparative) | 10 | 85 | 5% A/B | PA + 10% OCMB + 10% CaCO3 MB | >17 | <32 |

*A/B = Antiblock Master Batch

The rolling ball tests following the methods described above as shown in Table 2 above. Comparative sample 1 is commercially available shipping tape under the trade name Tarten. Comparative sample 2 is a commercially available Oreo cookie package. The rolling ball tack tests show that the tacky or bonding layer by blending PB with olefinic elastomer blends has much lower energy than the surface energy of the adhesive used on a commercially available package of OREO cookies. The steel ball stuck to the OREO packaging adhesive or the sipping tape PSA very quickly when in contact with the surface, indicating a higher tacky surface. Where for PB blends with Olefinic elastomers, the ball traveled too far if release from the very top of the ramp. When lower the ball's release point to much lower position, (2.25 inch rampdistance from the release point to the top of the table), the distance traveled by the ball became measurable. Still, when measured at the same release height, the and olefinic elastomers alone can provide peel and reseal at certain peel strengths, and PB-1 generally provide higher strength than the olefinic elastomer, it was determined that a blend of polybutene-1 and olefinic elastomers can help tailor the properties to produce a more desirable peel force than the materials alone. In addition, a bonding surface made from PB provides a zippery experience and blending with an olefinic elastomer usually helps to smooth the peel open experience. In order to determine an ideal blend, example blends of materials for the tacky layer 44 were tested for their peel force properties, which are shown in the examples of Table 2 below. The tested polybutene-1 is manufactured by LyondellBasell with a grade name of Toppyl RC3000. The tested olefinic specialty elastomer is manufactured by ExxonMobil with a trade name of Vistamaxx 6102FL. As shown, olefinic resins were blended with a polybutene-1 resin in the ratios identified in the second column. The outer layer 156 of polypropylene, the inner layer 162 of polyamide manufactured by Nycoa, with the grade name Nycoa 2012, and the thicknesses of each layer were kept constant for all tests. Polybutene-1 (PB-1) resins are high molecular weight isotactic, semi-crystalline thermoplastic polyolefins produced through the polymerization of butane-1 and ethylene, and/or propylene comonomers. A typical structure for polybutene-1 is as follows:

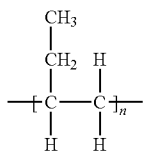

As shown in Table 3, a blend of 75% olefinic resin and 25% polybutene-1 resin had initial peel force of 5.38 lbf/in and a reopen peel force of 1.05 lbf/in after reclose. A blend of 50% olefinic resin and 50% polybutene-1 resin had an initial peel force of 5.58 lbf/in and a reopen peel force of 1.63 lbf/in. A blend of 25% olefinic resin and 75% polybutene-1 resin had, an initial peel force of 6.38 lbf/in, and a reopen peel force of 1.71 lbf/in. A blend of 90% olefinic resin and 10% polybutene-1 resin had an initial peel force of 4.5 lbf/in, and a reopen peel force of 1.22 lbf/in. Accordingly, the tested blends provided a range of 4.5-6.38 lbf/in for an initial peel force, and a range of 1.05-1.71 lbf/in for a reopen peel force. Based on these results, it was determined that about a 75% to about 90% olefinic resin and about a 25% to about 10% polybutene-1 resin blend produced the most desirable initial and reopen peel force, and, in one specific example, about 90% olefinic resin and about 10% polybutene-1 resin. The initial peel force was also defined by many factors and they can be tailored to be much lower than current initial peel force. Another observation was that the initial delamination force varied depending on the samples prepared, such that the data reported in Table 3 can be different when the samples are prepared at a different film width, in a package format instead of a 1 inch wide film strip, etc.

Example 2

Another variable that can be optimized is the tacky layer 44 thickness. It was determined that varying the thickness of the tacky layer produced different resulting peel forces and peel operations. As shown in Table 3 below, thicknesses varying between 10 um and 30 um were tested for a polybutene-1 resin layer and for an olefinic resin layer. The tested polybutene-1 is manufactured by LyondellBasell with a grade name of Toppyl RC3000. The tested olefinic specialty elastomer is manufactured by ExxonMobil with a trade name of Vistamaxx 6102FL.

The polybutene-1 resin layers provided the following values: a 30 um thickness produced an initial peel force of 6.25 lbf/in and a reopen peel force of 1.2 lbf/in; a 25 um thickness produced an initial peel force of 7.06 lbf/in, and a reopen peel force of 1.28 lbf/in; a 20 um thickness produced, an initial peel force of 5.32 lbf/in, and a reopen peel force of 1.33 lbf/in; a 15 um thickness produced an initial peel force of 4.35 lbf/in, and a reopen peel force of 1.16 lbf/in; and a 10 um thickness produced an initial peel force of 6.02 lbf/in, and a reopen peel force of 1.26 lbf/in. The olefinic resin layers provided the following values: a 30 um thickness produced an initial peel force of 2.34 lbf/in and a reopen peel force of 0.32 lbf/in; a 25 um thickness produced, an initial peel force of 3.63 lbf/in, and a reopen peel force of 0.39 lbf/in; a 20 um thickness produced, an initial peel force of 4.10 lbf/in, and a reopen peel force of 0.48 lbf/in; a 15 um thickness produced an initial peel force of 4.50 lbf/in and a reopen peel force of 0.28 lbf/in with a tape backing and 0.8425 lbf/in without a tape backing; and a 10 um thickness produced an initial peel force of 5.39 lbf/in and a reopen peel force of 0.661 bf/in. An opening feature that includes a polybutene-1 tacky layer 44 and a polyamide layer 46 or 86 produced a "zippering" opening functionality. More specifically, as the layers are pulled away from one another, the layers sequentially released in small portions along the length of the opening feature. An opening feature that includes an olefinic tacky layer 44 and a polyamide layer 46 or 86 produced a silent smooth opening, albeit with a relatively smaller opening force. Finally, a blend of polybutene-1 and olefinic specialty thermoplastic elastomer (such as about 75% to about 95% olefinic resin and about 5% to about 25% polybutene-1 resin) produced an improved

TABLE 3

Peel force for initial delamination and peel strength after reclose

| Sample ID | Outer Layer (20 um) | Tacky Layer (25 um) | | Inner Layer (20 um) | Total Thickness (um) | Initial open Force to trigger delamination (lbf/in) | Reclose peel strength (lbf/in) |
| | | PB-1 (%) | Olefinic Elastomer (%) | | | | |
|---|---|---|---|---|---|---|---|
| 3 (Inventive) | Lyondell Basell SR257M | 75 | 25 | Nycoa 2012 | 65 | 5.38 | 1.05 |
| 4 (Inventive) | Lyondell Basell SR257M | 50 | 50 | Nycoa 2012 | 65 | 5.58 | 1.63 |
| 5 (Inventive) | Lyondell Basell SR257M | 25 | 75 | Nycoa 2012 | 65 | 6.38 | 1.71 |
| 7 (Inventive) | Lyondell Basell SR257M | 10 | 90 | Nycoa 2012 | 65 | 4.5 | 1.22 | opening feature with smooth sequential opening and a satisfactory opening force, and this peel force is more reliable and repeatable.

TABLE 4

Peel force from different tacky layer thicknesses

| Sample ID | Tacky Layer thickness | Initial open Force to trigger delamination (lbf/in) | Reclose peel strength (lbf/in) |
|---|---|---|---|
| | PB-1 (um) | | |
| 8 (Inventive) | 30 | 6.25 | 1.2 |
| 9 (Inventive) | 25 | 7.06 | 1.28 |
| 10 (Inventive) | 20 | 5.32 | 1.33 |
| 11 (Inventive) | 15 | 4.35 | 1.16 |
| 12 (Inventive) | 10 | 6.02 | 1.26 |
| | Vistamaxx (um) | | |
| 13 (Inventive) | 30 | 2.34 | 0.32 |
| 14 (Inventive) | 25 | 3.63 | 0.39 |
| 15 (Inventive) | 20 | 4.1 | 0.48 |
| 16 (Inventive) | 15 | 4.5 | 0.84 (or 0.28 w tape backing) |
| 17 (Inventive) | 10 | 5.39 | 0.66 |

Example 3

In a first example, a coextruded film 82 was tested where the inner film layer 86 was also non-polar and was one of: low-density polyethylene (LDPE), high-density polyethylene (HDPE), leaner low density polyethylene (LLDPE), or their blends. Examples of LDPE resins tested were NOVAPOL LF-0222-F by Nova Chemicals. Examples of HDPE tested were Marflex 9656 by Chevron Philips. Examples of LLDPE tested were Dowlex 2045G from Dow Chemical. The tacky layer was either 100% Polybutene-1, or 100% Vistamaxx or their blend at different ratio. It was found that the bond strength between the tacky layers with the polyethylene based inner layer bonds together so strongly that the force required for separation is too strong and the layers cannot be satisfactorily separated. It was found that only in a sealed area, where the film is sealed together or to another structure, the film and tacky layers delaminate from one another, exposing the tacky layer, and allowing resealing capabilities. The force for delamination, however, is undesirably strong, could not be 100% delaminated even at the heat seal area, and the delamination was not clean or smooth, so that the configuration does not provide satisfactory separation and reseal beyond the heat-sealed area.

In a second example, the tacky layer was tested adjacent to a blend of polylactic acid and polyhydroxyalkanoates. It was found that the coextruded multilayer film can be easily separated between the tacky layer and the polylactic acid and Polyhydroxyalkanoates blend, but that there was no reseal ability or reclosability of the tacky layer to the polylactic acid and Polyhydroxyalkanoates blend.

Accordingly, it has been determined that a material having a polarity intermediate of polyethylene and polyester would provide a relatively easy package opening and satisfactory package reclose. By one approach, a polyamide material for the release layer as described herein provides a polarity that is sufficiently different from the tacky layer for the creation of a satisfactory package opening feature while still providing suitable package reclose. Example polyamide materials that can be used in such an opening feature include various types of Nylon, such as PA6, PA666, PA66, PA69, PA610, PA612, PA636, PA6I6T, PA11, PA12, PAMXD6, and blends thereof.

As with the tacky layer material, the release layer as described herein can be a blend of materials to provide more consistent and smoother opening operation. Accordingly, example blends were for the release layer were tested for their peel force properties, which are shown in Table 3 below. As shown, PA636 (Nycoa 2012) was blended with organoclay additives (from PolyOne master batch, a proprietary formulation containing about 60% organoclay, under trade name of MB231-615) and PA6I6T (manufactured by DuPont under trade name Selar 3426). Additionally, PA636 or PA666 (from BASF) was blended with Selar 3426. The ratios of materials are shown in the second column. The outer layer of polypropylene, the tacky layer of 90% olefinic resin 10% polybutene-1 resin, and the thicknesses of each layer were kept constant for all tests.

Nycoa 2012 is a copolyamide thermoplastic elastomer. It has medium viscosity and it is particularly suitable for extrusion and excellent processability to create resilient packages. The expressions of Nycoa 2012 is as follows:

$$\{-NH-(CH_2)_m-NH-CO-(CH_2)_n-CO-\}_x\{-NH-(CH_2)_m-NH-CO-(CH_2)_n-CO-\}_y$$

wherein m is 6 and n is either 6 or 36, depending on if they are in the hard or soft region of the polymers.

In order to further tailor the peel force of initial and reopen strength, blends of polyamide or polyamide additives were experimented with to observe the resulting peel force, the results of which are shown in Table 4 below. A blend of 90% Nycoa 2012/10% organoclay master batch (manufactured by PolyOne under the trade name OCMB231-615) produced an initial peel force of 4.42 lbf/in and a reopen peel force of 0.43; a blend of 50% Nycoa 2012/50% Selar 3426 produced an initial peel force of 4.45 lbf/in and a reopen peel force of 0.42 lbf/in; and a blend of 70% PA 666/30% Selar 3426 produced an initial peel force of 4.89 lbf/in and a reopen peel force of 1.18 lbf/in. Accordingly, the tested blends produced a range of 4.42-4.89 lbf/in for an initial peel force and a range of 0.42-1.18 lbf/in for a reopen peel force. Based on these results, while most of the blend formulations can provide satisfactory peel and reseal performance, it was determined that the blend of 50% Nycoa 2012/50% Selar 3426 produced the most consistent reclose and reopen peel force.

TABLE 5

| Sample ID | Outer Layer (20 um) | Tacky Layer thickness (25 um) | Inner Layer (20 um) | Total Thickness (um) | Initial open Force to trigger delamination (lbf/in) | Reclose peel strength (lbf/in) |
|---|---|---|---|---|---|---|
| 18 (Inventive) | Lyondell Basell SR257M | 90% Vistamaxx 6102FL/10% RC3000 | 90% PA2012 + 10% OCMB | 65 um | 4.42 | 0.43 |

TABLE 5-continued

| Sample ID | Outer Layer (20 um) | Tacky Layer thickness (25 um) | Inner Layer (20 um) | Total Thickness (um) | Initial open Force to trigger delamination (lbf/in) | Reclose peel strength (lbf/in) |
|---|---|---|---|---|---|---|
| 19 (Inventive) | Lyondell Basell SR257M | 90% Vistamaxx 6102FL/10% RC3000 | 50% PA2012 + 50% Selar 3426 | 65 um | 4.45 | 0.42 |
| 20 (Inventive) | Lyondell Basell SR257M | 90% Vistamaxx 6102FL/10% RC3000 | 70% PA666 + 30% Selar 3426 | 65 um | 4.89 | 1.18 |

A similar peel and reseal film was also produced with a cast sheet line, then through biaxial orientation. A five layer structure was made with Davis Standard extruders, with a multilayer structure design of PA2012/EVOH/PA2012 w10% OCMB/Toppyl RC3000/Adsyl 5C 30 at layer distribution of 25%/5%/5%/40%/25%. The total sheet thickness was 1000 um. The produced sheet was then stretched at a lab Karo stretcher manufactured by Bruckner. During the stretch, variable conditions were tested including: stretching oven temperature (start with 100° C., with 10° steps till 180° C.); preheat time (60, 80, 100 sec); speed MD/TD (various from 2% up to 400%); Stretching Ratio (3×3, 5×5, 7×7); and the cast sheet was stretched to 5×5 at the following conditions: oven preheat for 60 second at 170° C., and stretch at 400%/s MD/TD simultaneously with clip temp at 70° C. The resulted film was able to have a peel and reseal functionality as observed before.

Another coextruded multilayer film was produced on simultaneous biaxial orientation line. An example of a typical film structure is shown as the following: 50% PA2012 and 50% sealr3426 blend/90% Vistamaxx6102FL with 10% RC3000 blend/Homo PP LyondellBasell HP525J can be produced at layer thickness of 5/20/10 microns. In another test, this coextruded multilayer film is produced based on the similar film design of Vistamaxx 3588 as sealant/tie/PA2012+Selar 3426 (50:50)/Vistamaxx6102FL+ RC3000(90:10)/HomoPP HP525J. The film was then adhesive laminated to reverse printed polyethylene terephthaltae at the polypropylene side and the final film was die cut and to realize the peel and reseal functionality. In yet another approach, a similar film structure can be produced from a sequential biaxial orientation process by a 5 layer or 7 layer coextrusion process. Other film structures are also made with the similar peel and reseal core in the structure and varies skin layers and sealant layer formations and thickness. A careful design is also taken into consideration of producing flat films without much curling.

Another coextruded multilayer film was produced on an 11 layer triple bubble line. For examples, a film is designed as PET/tie layer/homoPPNistamaxx+PB1 (90:10)/PA2012+ Selar3426(50:50)/tie/Surlyn or LLDPE sealant, with total film thickness of 72 um and layer thickness of 14/7/5/17/ 12/5/10 um. This multilayer was coextruded on Kuhne triple bubble line.

Another coextruded multilayer film is produced on a Reifenhauser multilayer cast film line. As an example, a typical cast film structure is PET/tie/PP/Vistamaxx+PB1 (90:10)/PA2012+Selar3426(50:50)/tie/Surlyn or LLDPE sealant; or PET/tie/PP/Vistamaxx+PB1 (90:10)/PA2012+ Selar3426(50:50)/tie/EVOH/tie/Surlyn or LLDPE sealant.

Example 4

Films as set forth in the able below were made on a blown film production line and all the layers, including the outer layer, bonding layer, the release layer, and the heat seal layer, were produced from single step coextrusion. The film was post adhesive laminated to standard PET film. The film was die cut into shape for peel initiation and reclose.

TABLE 6

| Sample ID | Outer Layer (14 um) | Tacky Layer thickness (12 um) | Release Layer (3 um) | Sealant Layer (21 um) | Total Thickness (um) | Initial open Force to trigger delamination (lbf/in) | Initial peel force after delamination started (lbf/in) | Reclose peel strength (lbf/in) |
|---|---|---|---|---|---|---|---|---|
| 21 (Inventive) | Lyondell Basell Profax HP 403G | 90% Vistamaxx 6102FL/10% RC3000 | 50% PA2012 + 50% PA666 | tie/PP/coPP sealant | 50 | 5.43 | 0.88 | 0.47 |
| 22 (Inventive) | Lyondell Basell Profax HP 403G | 90% Vistamaxx 6102FL/10% RC3000 | 50% PA2012 + 50% PA666 | tie/HDPE/PE sealant | 50 | 6.9 | 0.94 | 0.51 |

The backbone stiffness of the film, as listed in Table 6, PP vs. HDPE actually had certain influence on the peel force, when all the other layers were kept unchanged.

Additional package embodiments having an embedded coextruded bonding layer or tacky layer that is coextensive with adjacent layers of the multilayer film is shown in FIGS. 27-30. These packages may incorporate some of the layers and materials discussed above. In addition to having layers be coextension or substantially coextensive, one or more of the materials or layers of the multilayer film may not be coextensive with the remaining layers. For example, the embedded coextruded bonding layer may only extend in the area having the resealable opening.

The film package 500 can be constructed using a standard flow package process that includes forming forward (or leading) and rearward (or trailing) end or side seals 514, 516 and a longitudinal seal therebetween, such as a fin or lap seal. In one illustrative approach, the package 500 generally has a top wall 522 above an optional tray and a resealable opening 528 in the top wall 522. While the package 500 has an opening 528 disposed opposite the longitudinal seal, in another configuration, such as that described below in FIG. 32, the opening may be in the film on the side or wall of the package having a longitudinal seal. Further, the package 500 may have a package opening feature 520 that permits the user or consumer to open and repeatedly reseal the package 500 during use. The resealable opening feature 520 may include a gripping tab 532 and an access panel 524.

Figure 27:
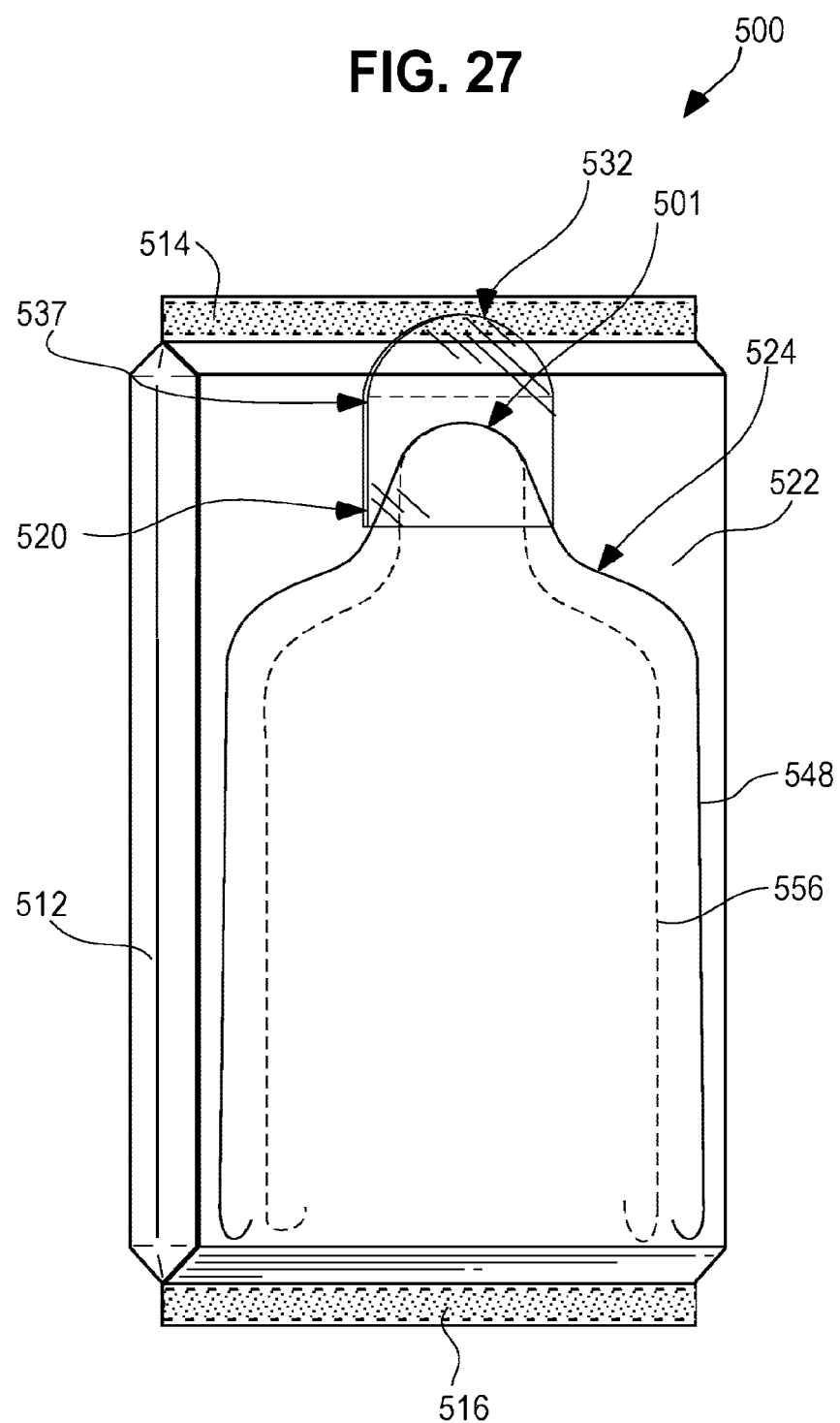
FIG. 27 is a top perspective view of another package.

The film package 500, illustrated in FIG. 27, includes a multilayer film 512 with a first film layer 542 and a second film layer 546 disposed around an embedded coextruded bonding layer 544. By one approach, the second film layer 546 includes at least a release and reclose layer 545 for resealability (the release and reclose layer is similar to the release layer discussed above). In addition, the package 500 includes a top die cut 548 formed in one of the first or second film layers 542, 546 and a bottom die cut 556 formed in the other of the first or second film layers. As shown, the top and bottom die cuts 548, 556 are generally offset from one another to form a reseal margin 547, 549 except at a leading portion 501 of an access panel 524 where the top and bottom die cuts 548, 556 coincide with one another such that the leading portion lacks the reseal margin 547, 549 at that location. Further, the package 500 may include a top reseal layer 537 disposed over the leading portion 501 of the access panel 524 and adhered to one of the first film layer 542 or the second film layer 546 around any throughcuts or tears in the film 512. In one embodiment, the top reseal layer 537 has an adhesive-free portion or pull tab 532 configured to be grasped for opening.

As illustrated, the top reseal layer 537 may be a discrete label, sticker, or the like, which permits a consumer to reseal the package in conjunction with the reseal margin in between the top and bottom die cuts. As illustrated in FIG. 27 the inner and outer cuts 548, 556 taper toward one another at the leading portion 501 of the access panel 524. In this manner, the reseal margins 547, 549 are rendered smaller and smaller until they are not found at the leading portion 501. The reseal margins 547, 549, which form, in part, the resalable opening 528, are partly defined by the top die cut 548 and the bottom die cut 556. The reseal margin 547 being the portion thereof that is lifted from a remainder of the package 500 and the reseal margin 549 being the portion thereof that remains. The access panel 524 includes the reseal margin 547 thereon. The reseal opening 528 also is resealed by the adhesive on the top reseal layer 537, in addition to the embedded coextruded bonding layer 544 that is exposed on the reseal margin 547.

In operation, a bond strength between the top reseal layer and the first or second film layer to which the top reseal layer is adhered is stronger than an integral bond strength between the first and second film layers. Accordingly, a first bond strength between the top reseal layer and the first or second film layer to which the top reseal layer is adhered is stronger than a second bond strength between the release and reclose layer and the embedded coextruded bonding layer. In this manner, opening of the package is facilitated by pulling on the pull tab 532 of the top reseal layer 537 to lift the access panel 524 along the top and bottom die cuts.

The leading edge 501 of the access panel 524 may be formed in a number of manners. By one approach, the leading portion 501 of the access panel 524 is formed by having at least one of the top die cut 548 and/or bottom die cut 556 extend into or through the embedded coextruded bonding layer. In this manner, the leading portion 501 of the access panel 524 is completely cut through the multilayer film thereby forming a throughcut section 513 of the multilayer film 512 at the leading portion 501 of the access panel 524. The throughcut section 513 of the leading portion is typically located where the top die cut 548 and the bottom die cut 556 coincide or overlap with one another.

By another approach, the leading portion 501 of the access panel 524 may be defined by a top die cut 548 and a bottom die cut 556 that extend at least to the embedded coextruded bonding layer, but do not extend completely through the multilayer film 512 such that the leading portion 501 is not completely cut through the multilayer film. In such a configuration, the opening of the package 500 is facilitated by having a bond strength between the adhesive of the top reseal layer 537 and the first or second film layer 548, 556 that is stronger than the integral bond strength between the first and second film layer via the embedded bonding layer 544.

In yet another configuration, the leading portion 501 may be perforated at portions along the leading portion 501. In this manner, though discrete, small portions of the leading portion 501 are throughcut 513 through the film 512, the perforations are small enough not to create irregularities in the film such that the film layers remain in their relative planes after formation of the perforations and before application of the top reseal layer 537.

Figure 31:
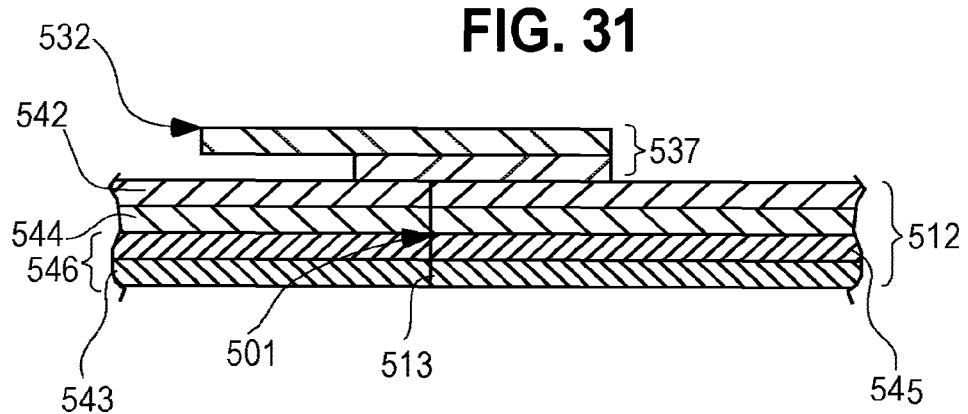

Further, while FIG. 31 illustrates the throughcut section 513 prior to package opening 500. If the top die cut 548 and the bottom die cut 556, together, do not form a throughcut section 513 prior to opening a complete cut or tear through the entirety of the multilayer film 512 will be formed upon initial opening such that the film layers appear to have a throughcut section similar to that illustrated in FIG. 31. Also, whether or not the leading portion 501 has a throughcut section 513 prior to opening, a bond strength between the adhesive of the top reseal layer 537 and the first or second film layers 548, 556 to which the top reseal layer 537 is adhered is stronger than an integral bond strength between the first and second film layers via the embedded bonding layer 544.

Figure 28:
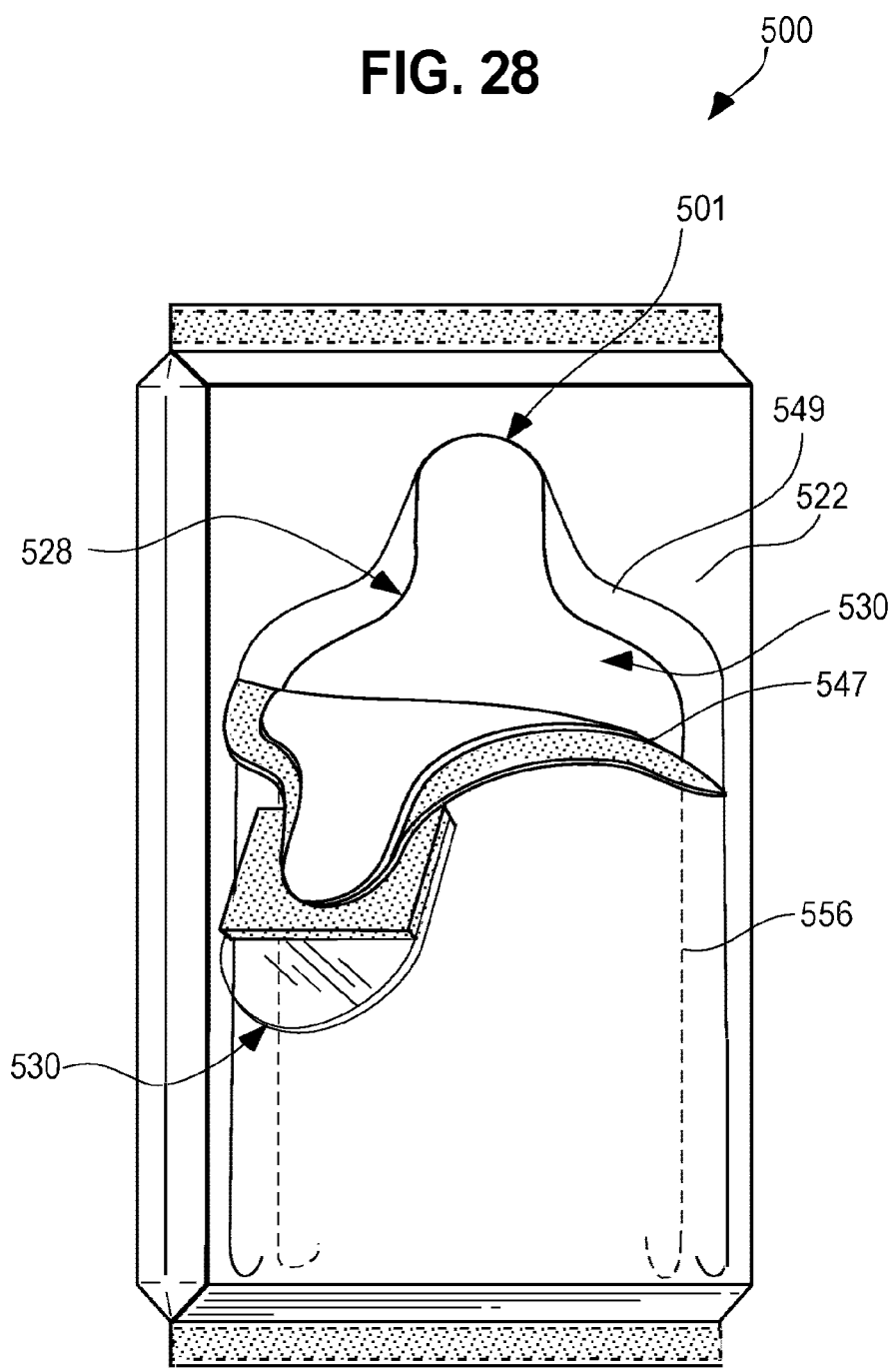
FIG. 28 illustrates the package of FIG. 27 in an open configuration.
Figure 29:
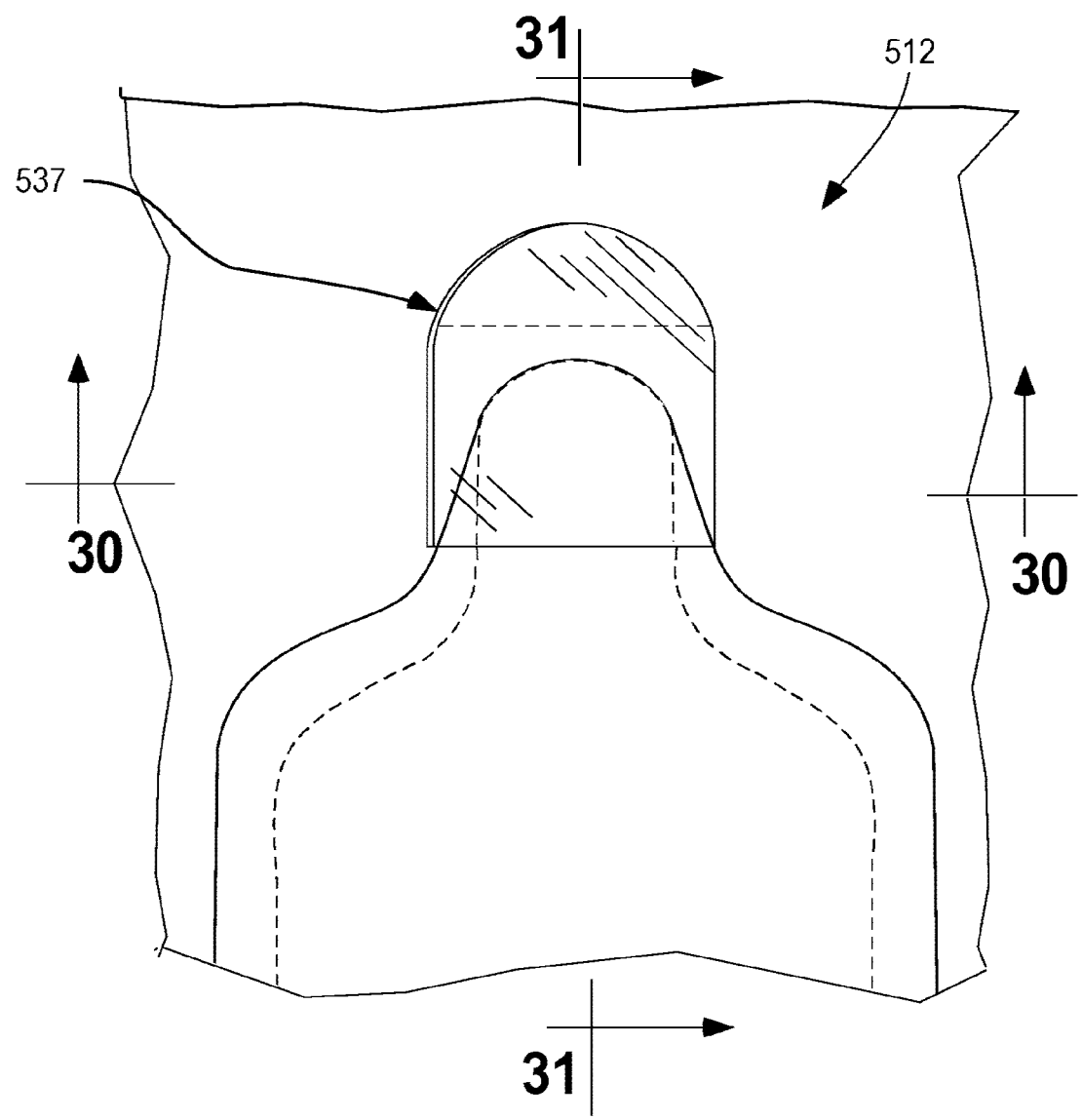
FIG. 29 illustrates a portion of the film of FIG. 27.
Figure 30:
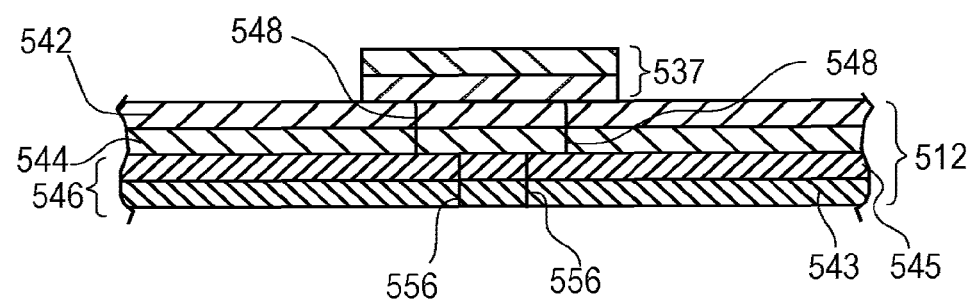
FIGS. 30 and 31 are cross section views of a portion of FIG. 29.

As shown in FIGS. 27 and 28, the package 500 may include a plurality of seals 514, 516 forming an interior cavity 530 and the adhesive-free portion of the top reseal layer 537 forming the pull tab 532 may be proximate one of the plurality of seals. In another configuration, the package may have a plurality of seals but the adhesive-free portion or pull tab 532 of the top reseal layer 537 is disposed on the multilayer film 537 toward the top 522 of the package, inward from the plurality of seals.

A number of optional films and materials have been described for use in the multilayer film 512. In one illustrative embodiment, the multilayer film 512 includes a first film layer 548 with a top film layer that includes at least one of polypropylene, polyethylene, a copolymer or a polyester film layer and a second film layer 556 that includes a release and reclose layer 545 and a heat seal layer 543. Accordingly, the top die cut 548 may be an outer die cut formed in the top film layer and the bottom die cut 556 may be an inner die cut formed in the reclose layer 545 and the heat seal layer 543.

In one approach, the package 500 may be formed by applying the top reseal layer 537 in-line or at a converter. The cuts formed into the film 512 may be die cut or laser cut. Further, the cuts, scores, perforations and/or throughcuts may be die cut in-line or at a converter. In addition to the elements depicted herein, a number of additional package integrity features may be incorporated into the packages, if desired.

By having the resealable opening 528 and a package opening feature on a top of the package 500, the initial open force to trigger delamination and open the package is reduced as compared to some packages having an opening at an end seal such as those requiring 4-7 lbf/in. to open. This may be particularly desirable to consumers who want an easily opened package.

Figure 32:
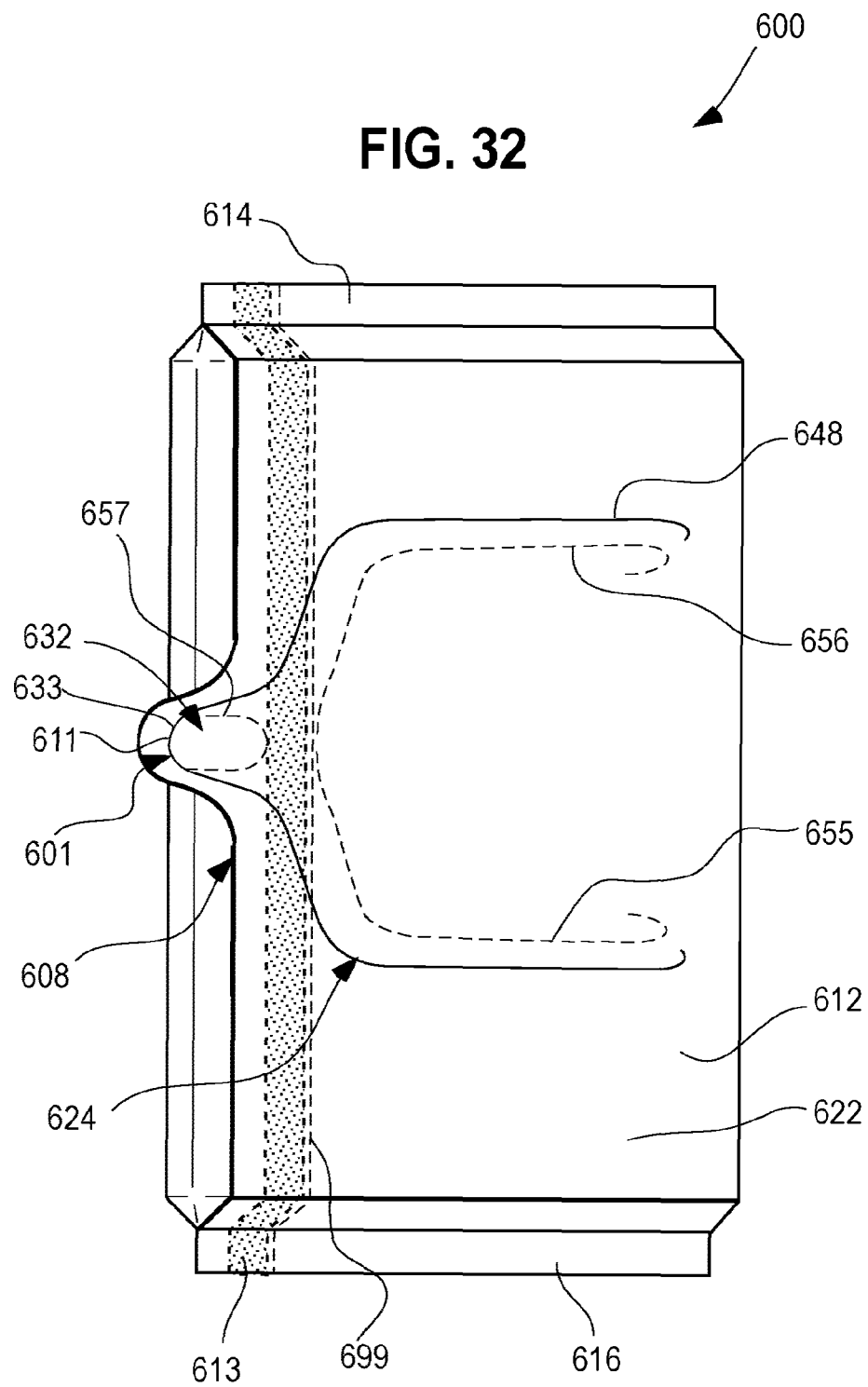
FIG. 32 is a top perspective view of another package.
Figure 33:
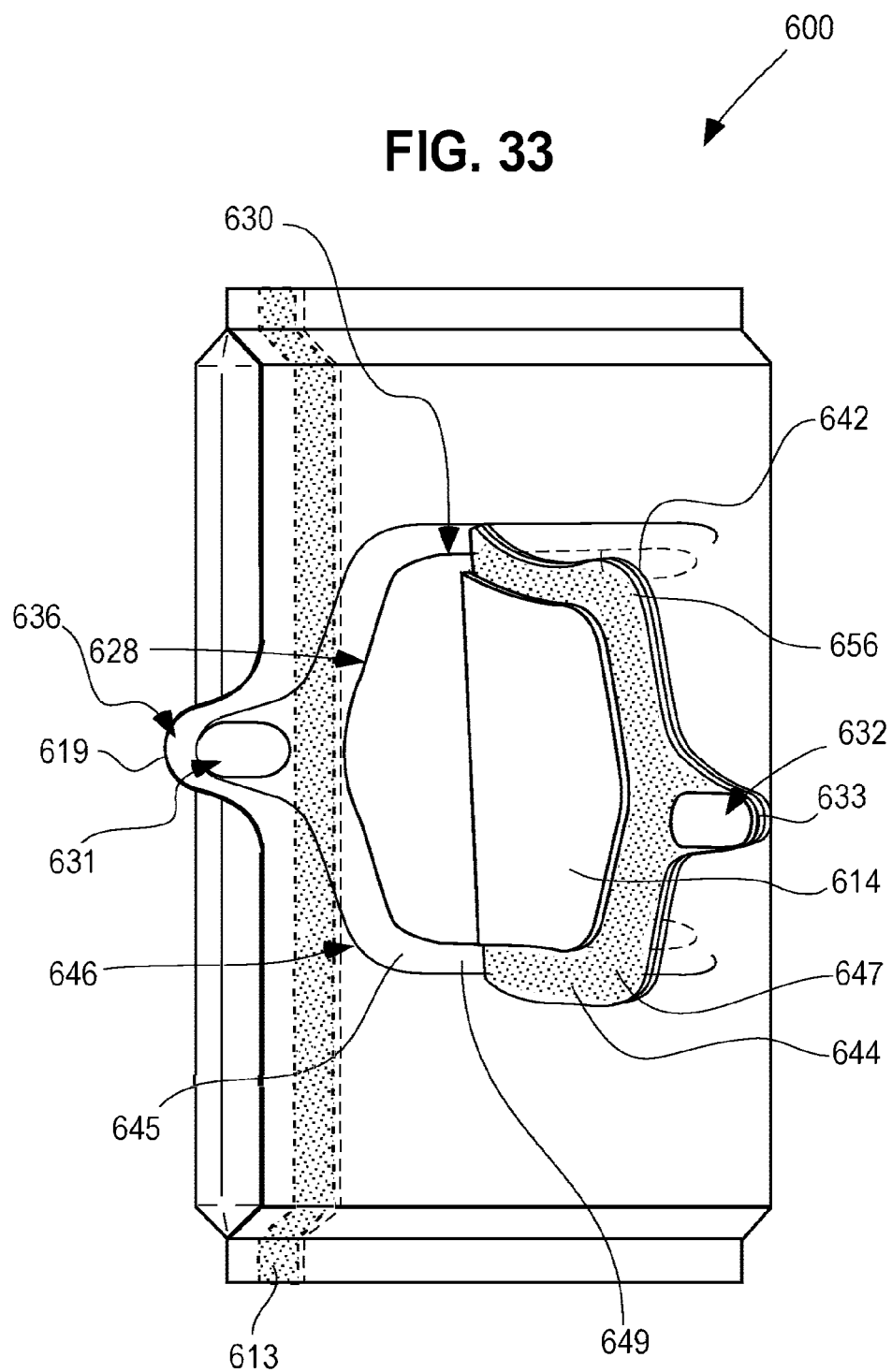
FIG. 33 illustrates the package of FIG. 32 in an open configuration.

Turning now to FIG. 32, a package 600 is illustrated with a resealable opening 628 disposed therein. Similar to some of the other packages described herein, the package 600 includes a multilayer film 612 with a first film layer 642 and a second film layer 646 disposed around an embedded coextruded bonding layer 644 and the second film layer 646 includes a release and reclose layer 645 for resealability, the multilayer film 612 having at least one package seal 613 forming a contents cavity. As shown in the figures, the pull tab or package opening feature can be located on or near a fin seal, end seal, lap seal, or interior to the seals forming the package.

By one approach, the multilayer film 612 has a top die cut 648 formed in one of the first or second film layers 642, 646 and a bottom die cut 656 formed in the other of the first or second film layers 642, 646. In one configuration, the bottom die cut 656 includes a tab portion 657 that subsequently forms a rear edge of a pull tab 632 and an opening portion 655. Further, the top die cut 648 and the opening portion 655 of the bottom die cut 656 form, in part, an access opening 628. In addition, the top die cut 648 may form an access panel 624 and the opening portion 655 of the bottom die cut 656 may form a film flap 614. As illustrated in FIG. 32, the top die cut 648 and the opening portion 655 of the bottom die cuts 656 are offset from one another to form a reseal margin 647, 649. Further, the access panel 624 is formed by the top die cut 648 having a leading edge 601 defined, in part, by a throughcut 611 in the multilayer film 612 formed from one or both of the top die cut 648 or the tab portion 657 of the bottom die cut 656. As shown in FIG. 32, the tab portion 657 of the bottom die cut 656 that forms the pull tab 632 is disposed in the multilayer film 612 outside of the package seal 613 from the contents cavity 630 and the opening portion 655 of the bottom die cut 656 is disposed within the package seal 613. As shown in FIG. 32, the pull tab 632 is disposed at the leading portion of the access panel 624. Though the leading edge and throughcut 611 are illustrated as arcuate, these could also have another configuration, such as a v-shape.

As noted above, the top die cut 648 and the opening cut 655 of the bottom die cut 656 form, in part, the reseal margins 647, 649. The reseal margin 647 being the portion thereof that is lifted from a remainder of the package 600, and the reseal margin 649 being the portion thereof that remains. The reseal feature 620 also includes an access panel 624 that is resealable and defined in part by the top die cut 648 and the opening cut 655. The opening cut 655 also forms a film flap 314 that is lifted along with the access panel 624 to expose the package opening 628.

As shown, the pull tab 632 has a gripping edge 633 disposed a distance from a free edge 619 from the package. In this manner, a user or consumer can easily grip the two portions and pull them apart to open the package.

FIG. 32 illustrates that the package seal 613 may include a lap seal. In such a configuration, the multilayer film 612 may have an extended flange of film that extends beyond the lap seal 613 to form the pull tab 632, which can be grasped to open the package. FIG. 32 illustrates an interior edge of the film 699 below the film 642 forming the top of the package 622. In yet another configuration, the package seal may be a fin seal that has offset edges of two layers of the multilayer film that forms the package seal. In this manner, an outermost edge of the two layers may be offset and one of those layers includes the pull tab, which can be grasped to open the package.

A number of optional films and materials have been described for use in the multilayer film 612. In one illustrative embodiment, the first film layer 642 of the multilayer film 612 is a top film layer that includes at least one of polypropylene, polyethylene, a copolymer or a polyester film layer and the second film layer 646 includes a heat seal layer in addition to the release and reclose layer 645. Accordingly, the top die cut 648 may be an outer die cut formed in the polypropylene film layer and the bottom die cut 655 may be an inner die cut formed in the release and reclose layer 645 and the heat seal layer. By one approach, the first film layer 642 and the second film layer 646 are coextensive with one another and the embedded coextruded bonding layer 644.

As shown in FIG. 32, the tab portion 657 and the opening portion 655 of the bottom die cut 656 are disposed a distance from one another such that the reseal margin 647, 649 is disposed therebetween to permit the access opening 628 to be resealed. FIG. 32 also illustrates that the seal 613 is therebetween, but the seal is disposed between the film layers that forms the seal, whereas the opening feature 620 may be disposed in the topmost layer of the film 612.

Figure 35:
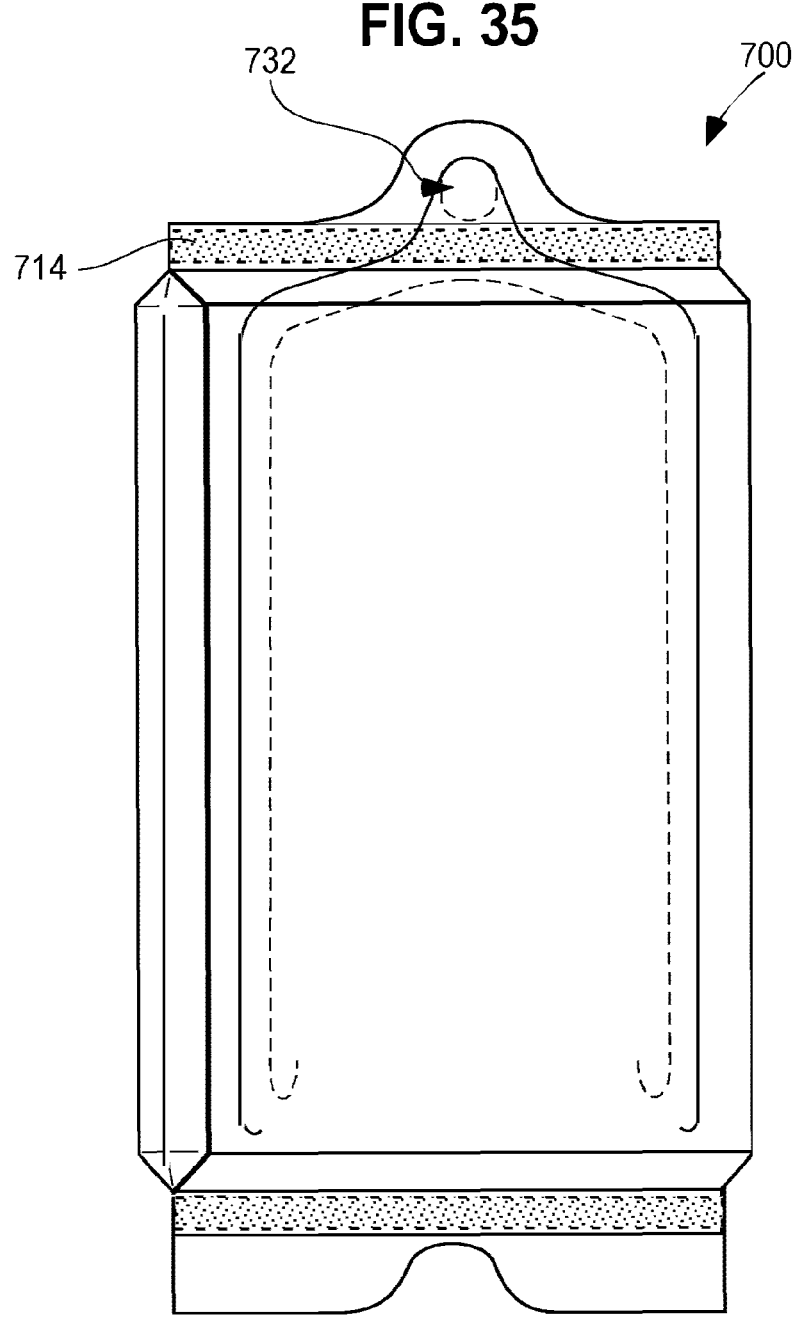
FIG. 35 is a top perspective view of another package.

In an illustrative approach, the bond strength of the embedded coextruded bonding layer 644 is less than the peel strength of the end seal 613. Further, as illustrated in FIGS. 32 and 35, an end, side, or longitudinal seal 613, 714 may traverses the reseal margin and the bond strength of the seals must be stronger than the bond strength of the bonding layer to retain the package integrity after initial package opening. In this manner, the primary seals maintain their integrity and the intended delamination of the bonding layers occurs at the boundary of the bonding layer.

In another configuration, the package 600 may include a top reseal layer (similar to that discussed above in regard to package 500) disposed over the leading portion of the access panel 624 and adhered to one of the first film layer or the second film layer.

Figure 34:
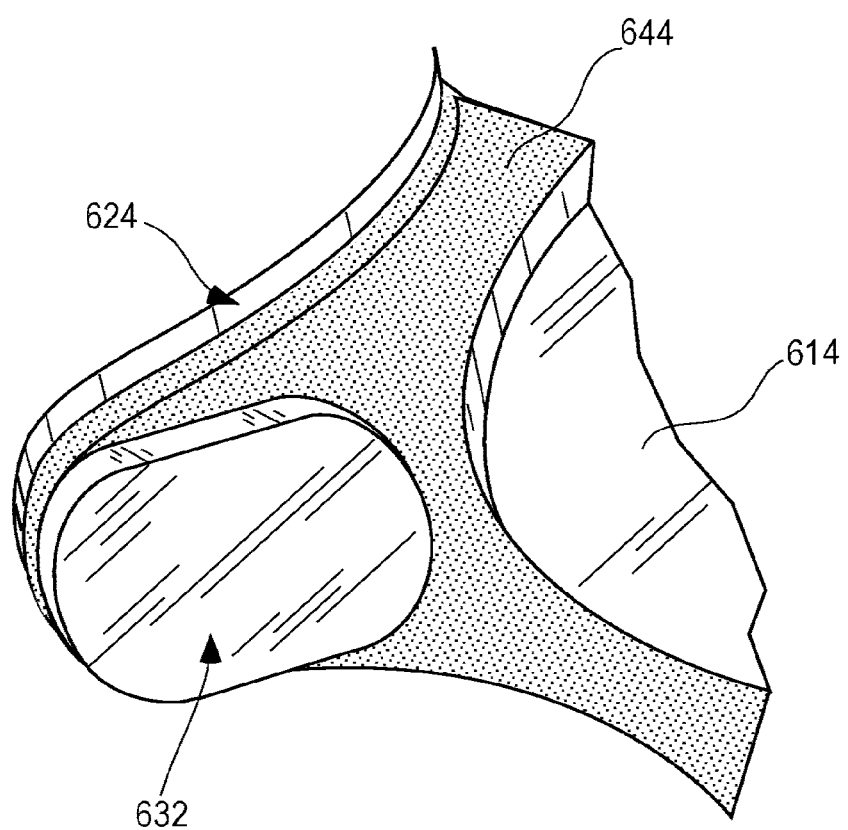
FIG. 34 is a bottom perspective view of a portion of FIG. 32 in an open configuration.

FIG. 34 illustrates the leading edge of the access panel 624 and the grasping or pull tab 632 from below as the package is opened. The exposed coextruded bonding layer 644 between the pull tab 632 and the film flap 614 permits the package to be resealed.

When the pull tab 632 has been lifted from the remainder of the second (inner) film layer 646, a hole or opening 631 remains in the remainder of the film 612. The free edge 619 and an adjacent gripping area 636 can be grasped by a user and the pull tab 632 grasped and pulled away from the gripping area 636 to expose the package opening 628.

FIG. 35 illustrates a package 700 that is similar to package 600 discussed above. Whereas the package 600 has a pull tab 632 disposed at a longitudinal seal 613, the pull tab 732 in package 700 is disposed adjacent an end seal 714. More particularly, the pull tab 732 is disposed outward of the seal 714 as compared to the contents cavity.

Figure 36:
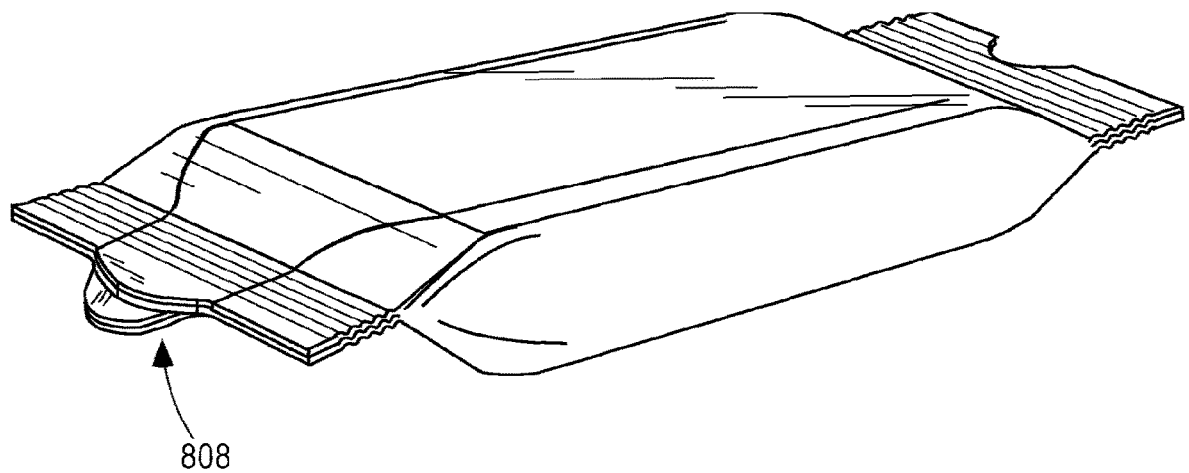
FIG. 36 is a top perspective view of another package.

Another package embodiment having an embedded coextruded bonding layer or tacky layer that is coextensive (or substantially coextensive) with adjacent layers of the multilayer film is shown in FIG. 36. The package 800 includes a multilayer film 812 with a first film layer 842 and a second film layer 846 disposed around an embedded coextruded bonding layer 844. By one approach, the second film layer 846 includes at least a release and reclose layer 845 for resealability. The package 800 also includes a resealable opening 828 formed in the multilayer film 812 and, the resealable opening 828 is formed with a reseal margin 847, 849 that is partly defined by an outer cut 846 and an inner cut 848. By one approach, the outer cut 846 is disposed through one of the first or second film layers 842, 846 and at least to the embedded coextruded bonding layer 844 and the inner cut 848 is disposed through the other of the first or second film layers 842, 846 and at least to the embedded coextruded bonding layer 844. Further, the inner cut 848 also defines the package opening 828 (and may include several discontinuous cuts if certain tamper evident features are incorporated therein), and the outer cut 846 typically includes two discrete cuts extending from adjacent a trailing edge of the package opening to a leading edge of the package.

Figure 37:
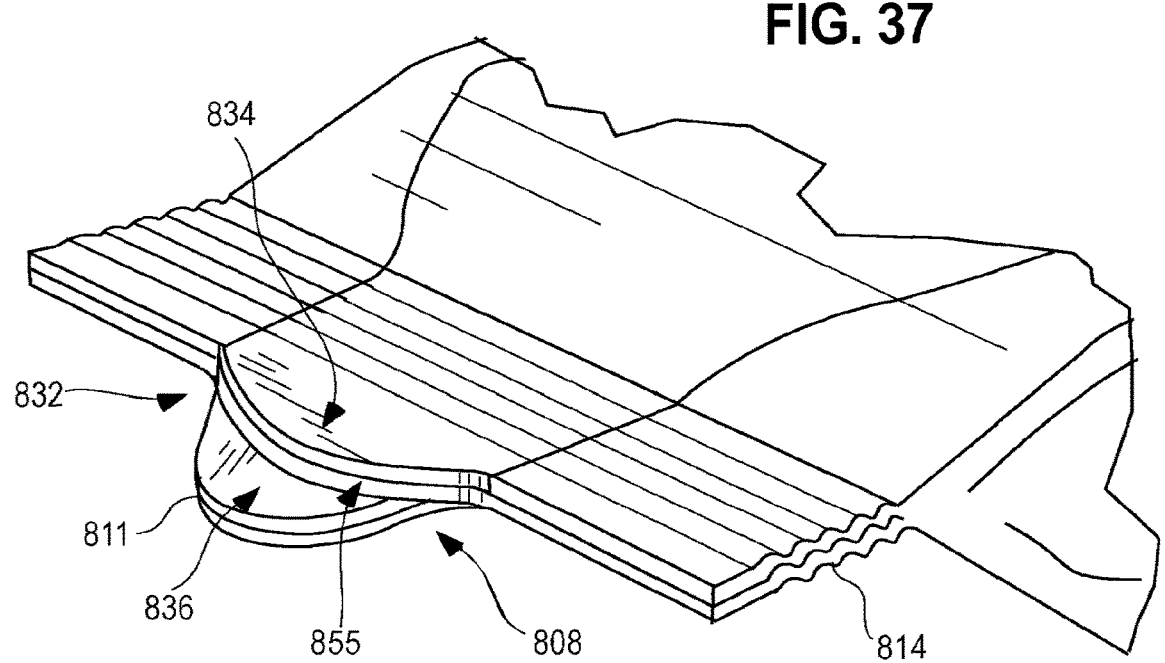
FIG. 37 is a top perspective of a portion of FIG. 36.
Figure 38:
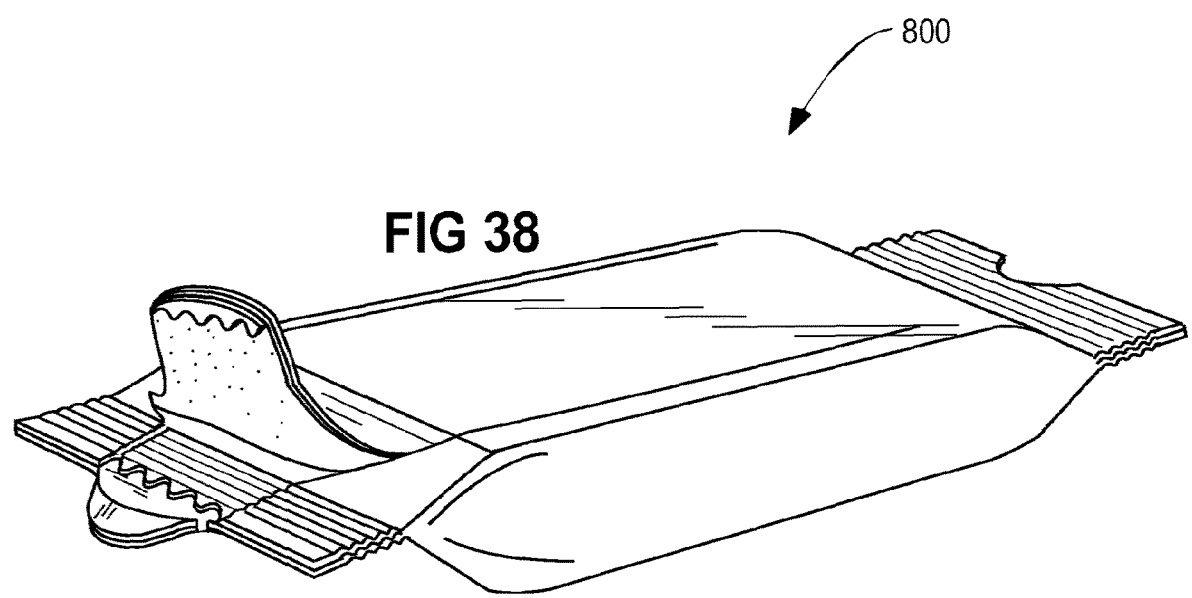
FIG. 38 is a top perspective view of the package of FIG. 36 in an open configuration.
Figure 39:
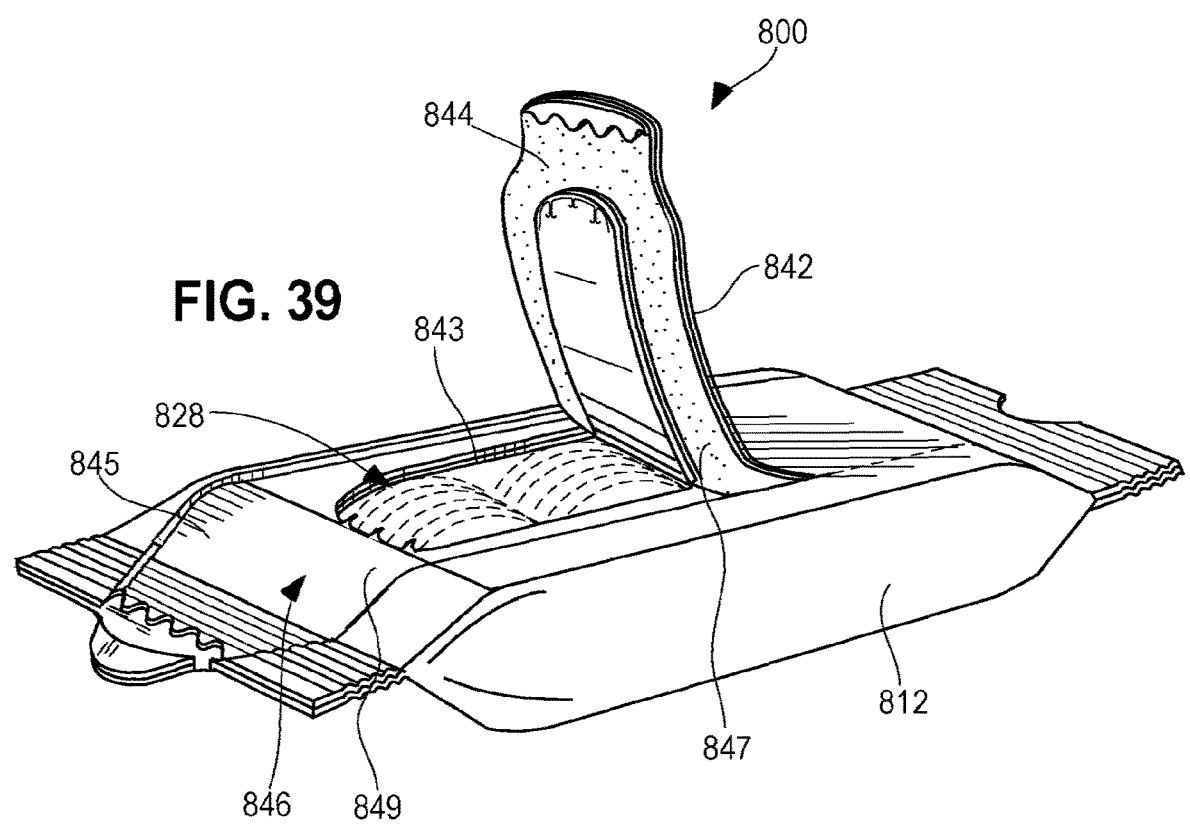
FIG. 39 is a top perspective view of the package of FIG. 38 in a further open configuration.

In addition, the package 800 includes a package opening feature 808 formed in the multilayer film 812. By one approach, the package opening feature 808 is disposed adjacent a package seal 814 and the package opening feature 808 includes a gripping tab 836 defined, in part, by a leading edge of the package 800 and a pull tab 834 that is grasped and lifted away from the gripping tab 836 to open the package. In one approach, the pull tab 834 is defined, in part, by a full depth cut 855 through an entire thickness of the multilayer film 812. Further, the full depth cut 855 extends across a width of the package opening feature 808. As illustrated in FIGS. 36 and 37, the leading edge 811 of the package 800 and the full depth cut 855 are offset from one another. This embodiment is similar to the packages disclosed in co-pending application U.S. application Ser. No. 14/773,016, which is incorporated herein in its entirety.

Figure 40:
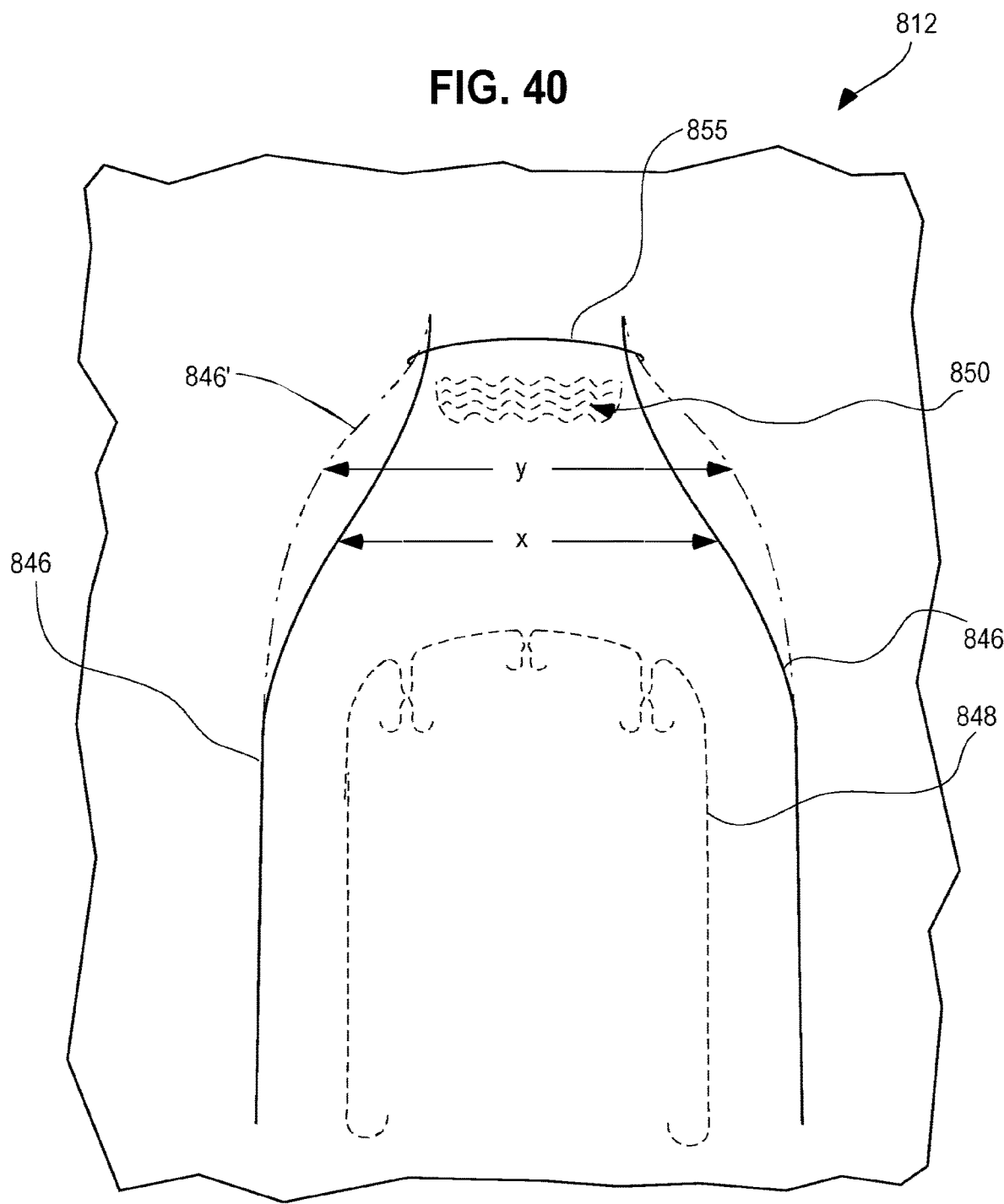
FIG. 40 is a portion of a film web formable into a package with a resealable opening.

FIG. 40 illustrates a portion of film 812 that has the inner and outer cuts 846, 848, the full depth or throughcut 855, and tab cuts 850 disposed therein. The tab cuts 850 may subsequently form a trailing edge of the pulling tab 832 and the full depth cut 855 may form a leading edge thereof. The configuration or shape of the outer and inner cuts not only defines the offset edges of the reseal margin 547, 549, but also influences the initial peel force required to open the package by delaminating the bonding layer 544 from the release and reclose layer 545. The initial peel open force is defined by many factors, including but not limiting to, the adhesion between the bonding layer 544 and the release and reclose layer 545, the stiffness and/or tear resistance of the multilayer film 512, the bonding layer 544 location in the multilayer film structure, the degree of orientation of these multilayer film, and the die or laser cut pattern design. In other configurations, the outer cut 846' (see, e.g., FIG. 40) has a thicker or wider opening area or margin near the pull tab such that the access panel has a much wider shoulder configuration near the pull tab, making the access panel wider at this location (illustrated with a width, y). In this manner, depending upon the initial delamination force required to open the package, the opening of the package may occasionally result in a film tear along the machine direction, rather than the peeling open of the package opening feature. The improved outer cut design, illustrated in FIG. 40 by reference numeral 846, has a much narrower shoulder portion (illustrated with a width, x), which allows the film to peel open following the pattern of the cut more easily and reliably because the comparatively gradual increase in width or distance between the cuts prevents tearing of the film. In this manner, the outer cut 846 may benefit from having portions that slowly widen or separate from one another as the distance from the pull tab increases. In one illustrative example, the sides of the outer cut 846 are less than about 2-inches apart for the first inch of the pull tab and access panel, as illustrated.

Further, the outer cut 846 does not have a tight or sharp corner at the shoulder of the opening adjacent the pull tab. Accordingly, the top or outer cut may have first and second sides that are configured to have curved portions with relatively narrow or sloping shoulders (as illustrated by cut 846 in FIG. 40) where the distance between the first and second sides of the top or outer cut do not rapidly separate from one another as the package is opened and the pull tab 832 is pulled upward. In one illustrative approach, the outer cut 846 adjacent the pull tab has a slight arcuate configuration with a radius of curvature of not less than approximately 0.75-in. Similarly, the angle of the line tangent to the cuts at the shoulder, near the pull tab typically does not exceed 35° relative thereto. By one approach, the cuts adjacent the pull tab have a radius of curvature that is greater than 0.75-in. and the angle of the tangent to these cuts is less than 35°.

Figure 41:
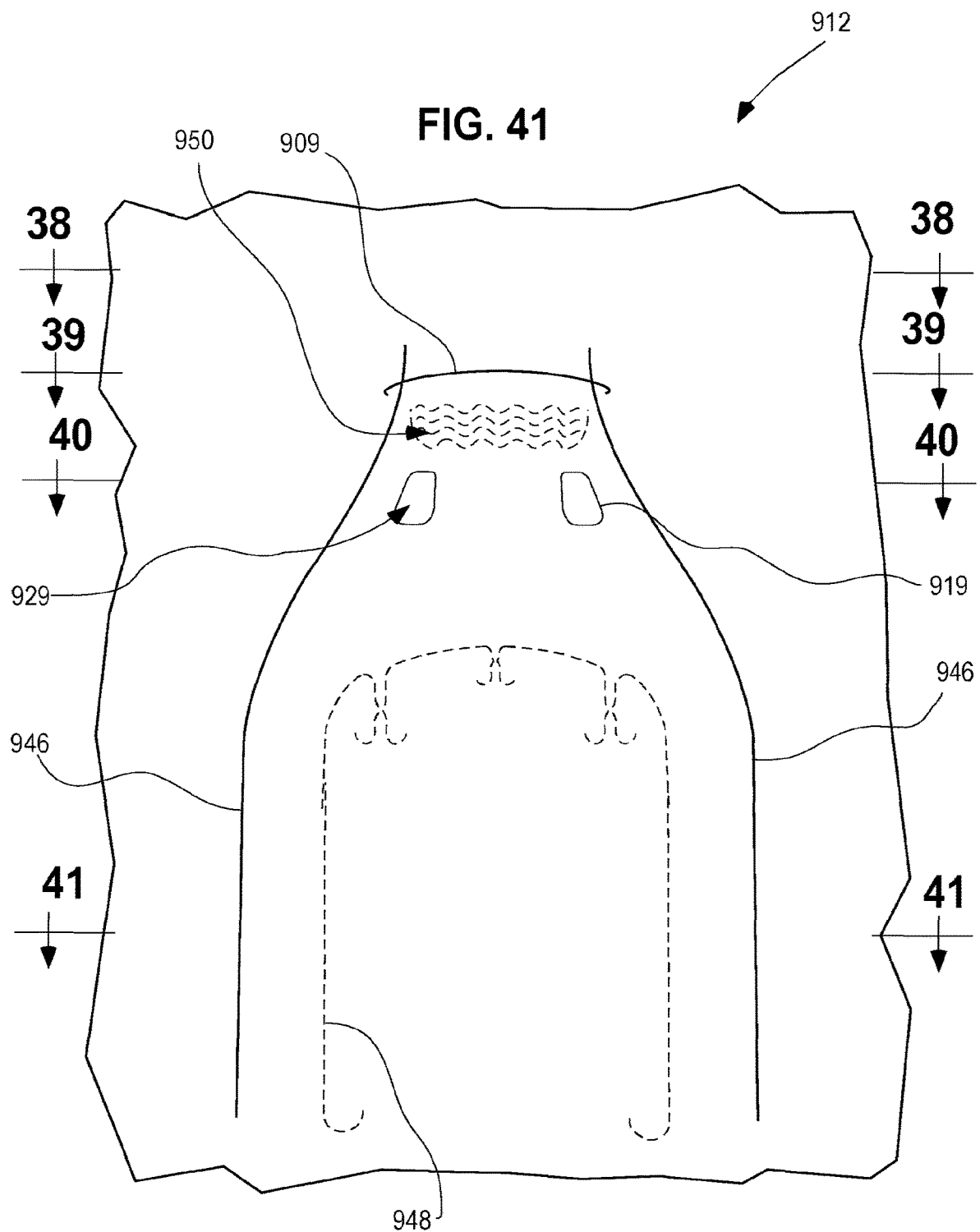
FIG. 41 is a portion of another configuration of a film web formable into a package with a resealable opening.
Figure 42:
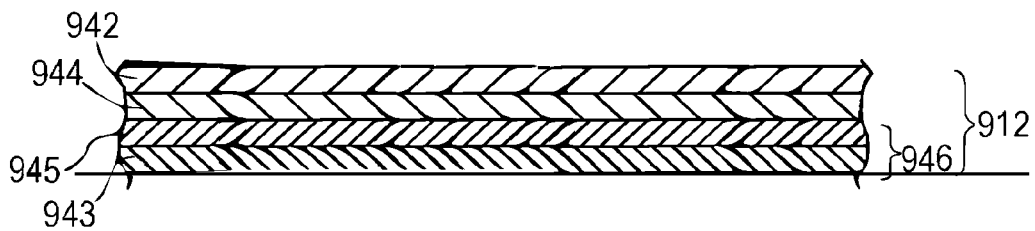
FIGS. 42-45 are cross section views of portions of FIG. 37
Figure 43:
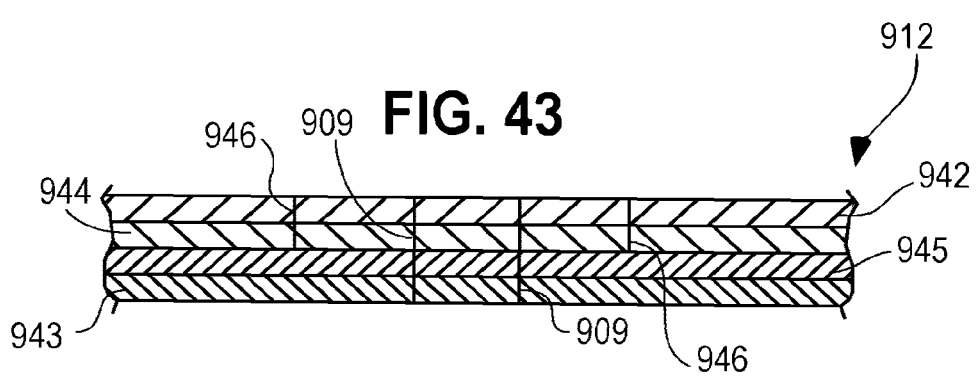
Figure 44:
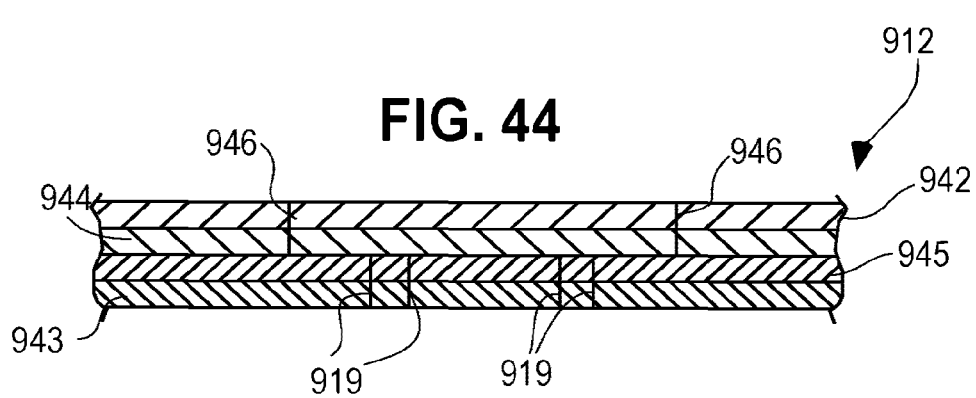
Figure 45:
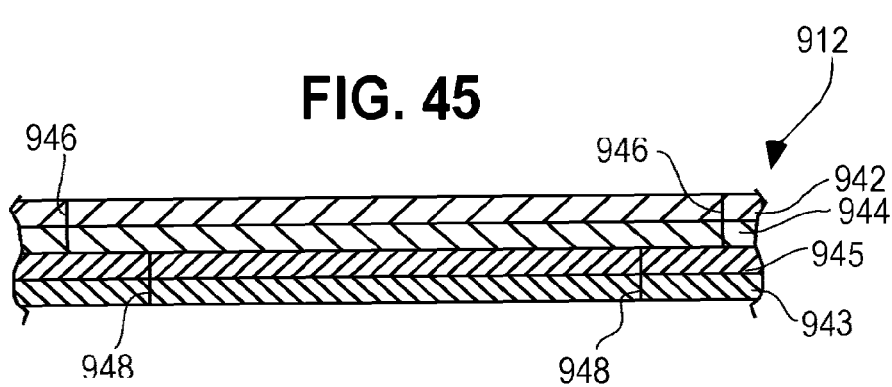

Another configuration is illustrated in FIG. 41 and further incudes inner film segments, islands, or tabs 929 formed by an inner die cut 919. The tabs 929 provide interruption points during the initial opening operation, and therefore, the tabs 929 reduce the initial delamination force or the peel force required to open the package. Further, these islands, segments, or tabs 929 generally have an irregular or non-uniform shape that make them difficult for customers to realign after initial opening, thereby providing a package integrity feature. The inner die cut 919 forming the segments 929 are formed by an inner loop cut disposed in the first or second film layer that also has the inner cut disposed therein. FIGS. 44 and 45 illustrate various cross sections of the film 912 of FIG. 41 and the locations of the inner die cut 948, 919 and the outer die cut 946.

Figure 46:
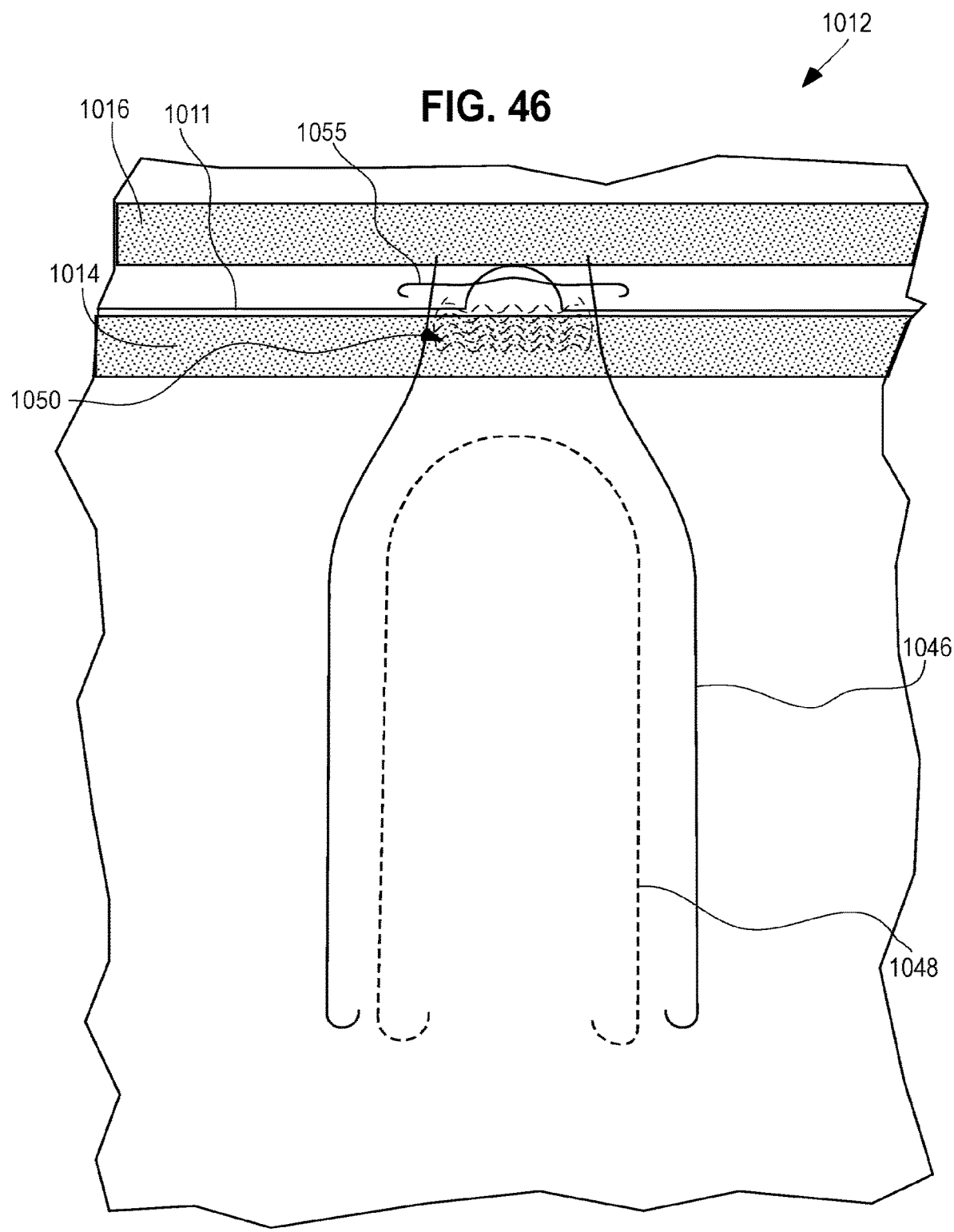
FIG. 46 is a portion of another configuration of a film web formable into a package with a resealable opening illustrating the location of the seal jaws for illustrative purposes.

FIG. 46 further illustrates a film web 1012 with inner and outer cuts 1048, 1046 and also illustrates where the throughcut 1055 and the tab cuts 1055 (in the inner film layer) will be disposed relative to the separation cut 1001 that forms the leading and trailing edges of the packages and the seal bars or jaws 1014, 1016.

Figure 47:
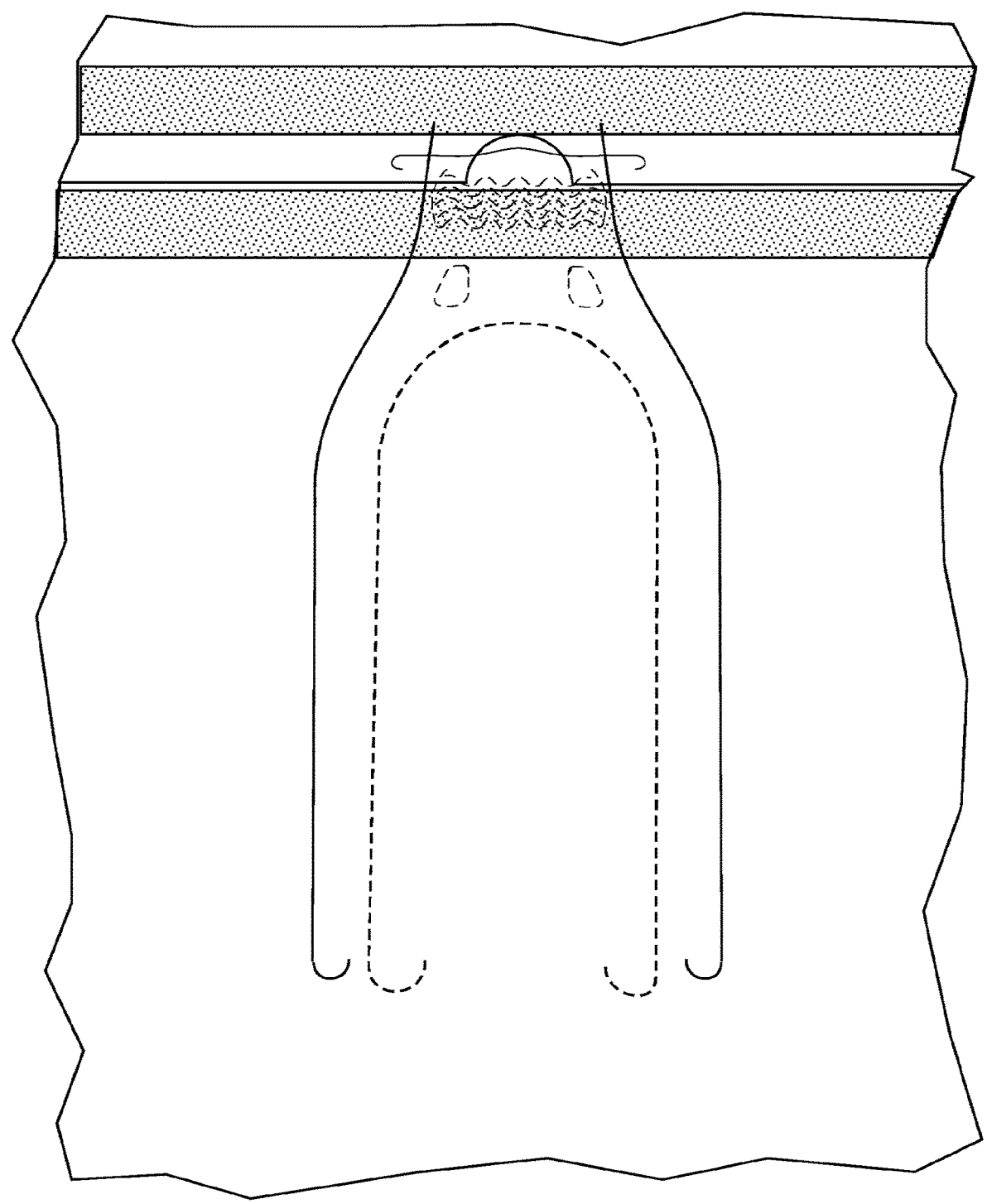
FIG. 47 is a portion of another configuration of a film web formable into a package with a resealable opening illustrating the location of the seal jaws for illustrative purposes.
Figure 48:
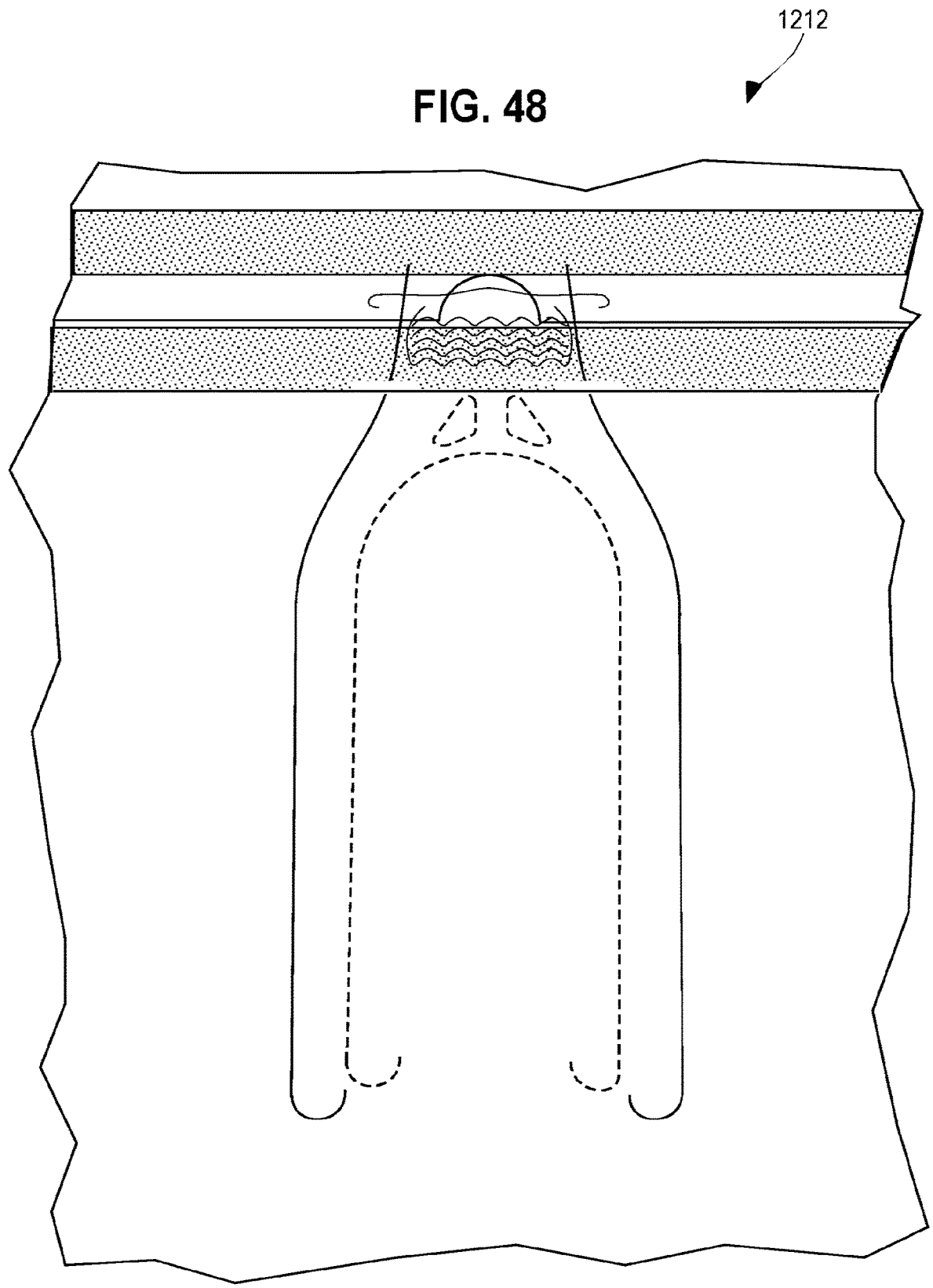
FIG. 48 is a portion of another configuration of a film web formable into a package with a resealable opening illustrating the location of the seal jaws for illustrative purposes.
Figure 49:
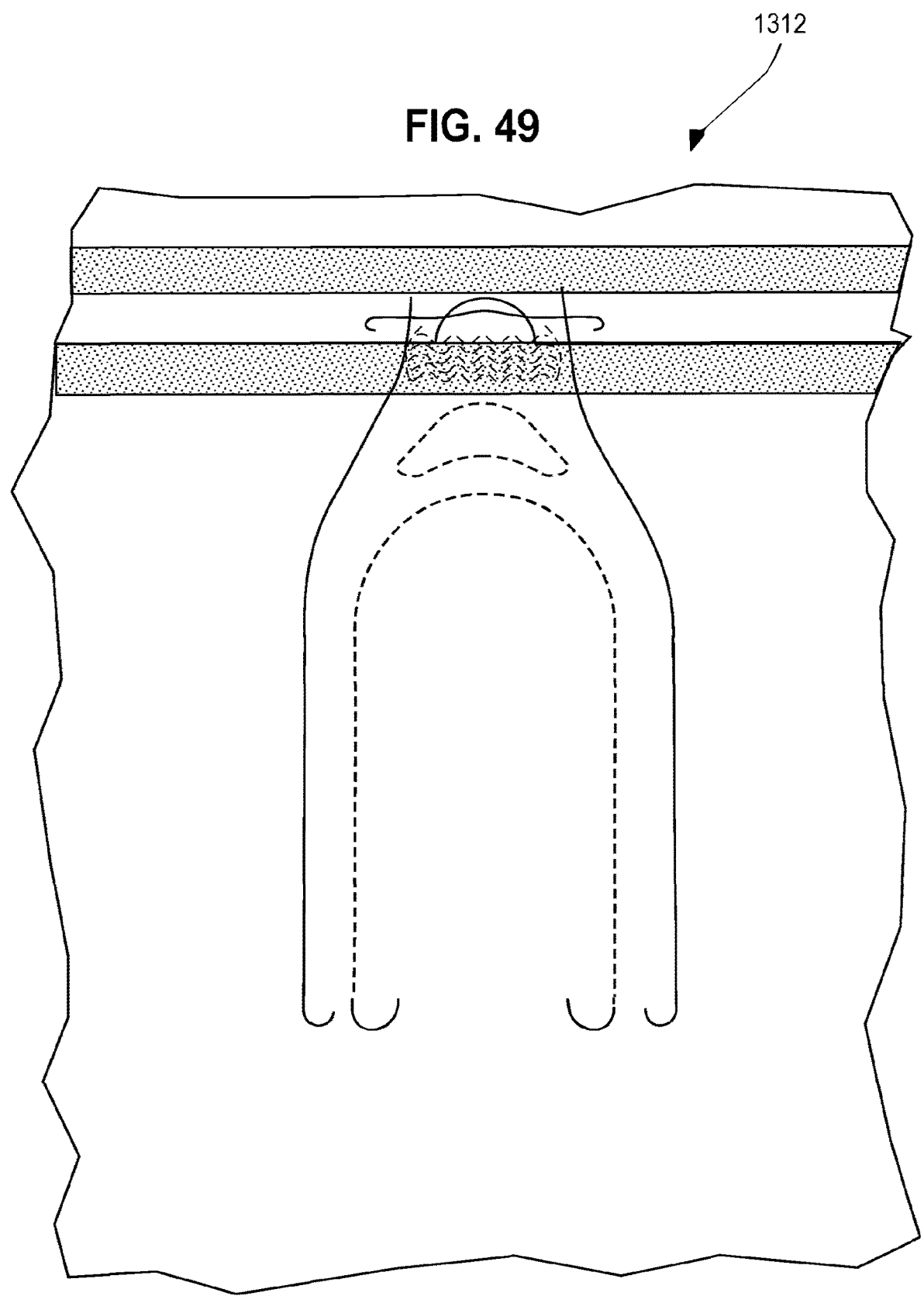
FIG. 49 is a portion of another configuration of a film web formable into a package with a resealable opening illustrating the location of the seal jaws for illustrative purposes.

FIGS. 47-49 illustrate similar film webs 1112, 1212, 1312 showing different configurations of film webs that can be formed into packages having a package opening feature similar to that described for the package 800.

By one approach, illustrated in FIG. 46, the full depth cut 1055 in the multilayer film 1012 may be disposed in between end seals 1014, 1016 of adjacent packages and the separation cut 1011 forming the leading edge of the package intersects portions of the full depth cut 1055. The full depth cut 1055 is not coextensive with the leading edge 1011, but instead is disposed a distance from a forwardmost portion of the leading edge 1011. As shown, the separation cut 1011 forming a leading edge of the package has a bulbous center that forms, in part, the package opening feature. In this manner, the subsequently formed gripping tab and the pull tab are offset from one another such that edges of the gripping tab and the pull tab are not coincident with one another.

As illustrated in FIGS. 41 and 47-49, the film web may have a tab cut (or a set thereof) in the inner film layer in addition to the inner cut in the inner film layer forming the package opening. The tab cuts may form a trailing edge of the pull tab that is partially disposed in the package seal adjacent the package opening feature.

Additional cuts suitable for inclusion in the films and materials discussed herein are disclosed in co-pending application U.S. application Ser. No. 13/300,317, which is incorporated herein in its entirety.

Figure 50:
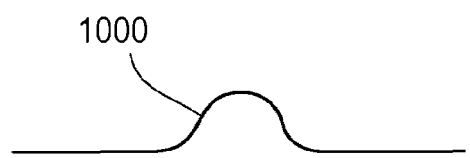
FIG. 50 illustrates a configuration of a separation knife.
Figure 51:
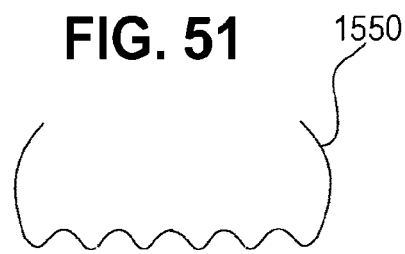
FIGS. 51-54 illustrate different tab and perimeter score configurations.
Figure 52:
Figure 53:
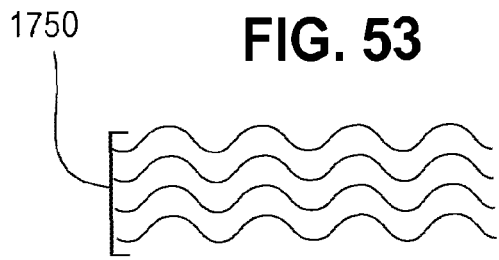
Figure 54:
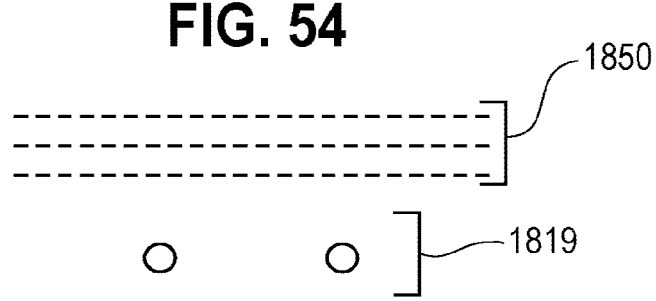

A few additional cuts will be discussed herein and shown in the figures as illustrative options. FIG. 50 illustrates a portion of a knife configuration that forms a leading edge of a package by separating adjacent packages. The separation cut configuration 1000 illustrated in FIG. 50 is shown in a simplified manner to illustrate only the portion of the knife or die that will form the separation cut thereby forming the leading edge and the trailing edge of adjacent packages. FIGS. 51-54 illustrate a plurality of tab scores 1550, 1650, 1750, and 1850 that may form a rear edge of a pull tab. FIGS. 53 and 54 have a plurality of repeating tear cuts that allow for a bit of variation in the registration of the film. In addition, FIG. 54 also includes die cuts 1819 that will subsequently form segments that can provide a tamper evident indicator upon package opening.

Figure 55:
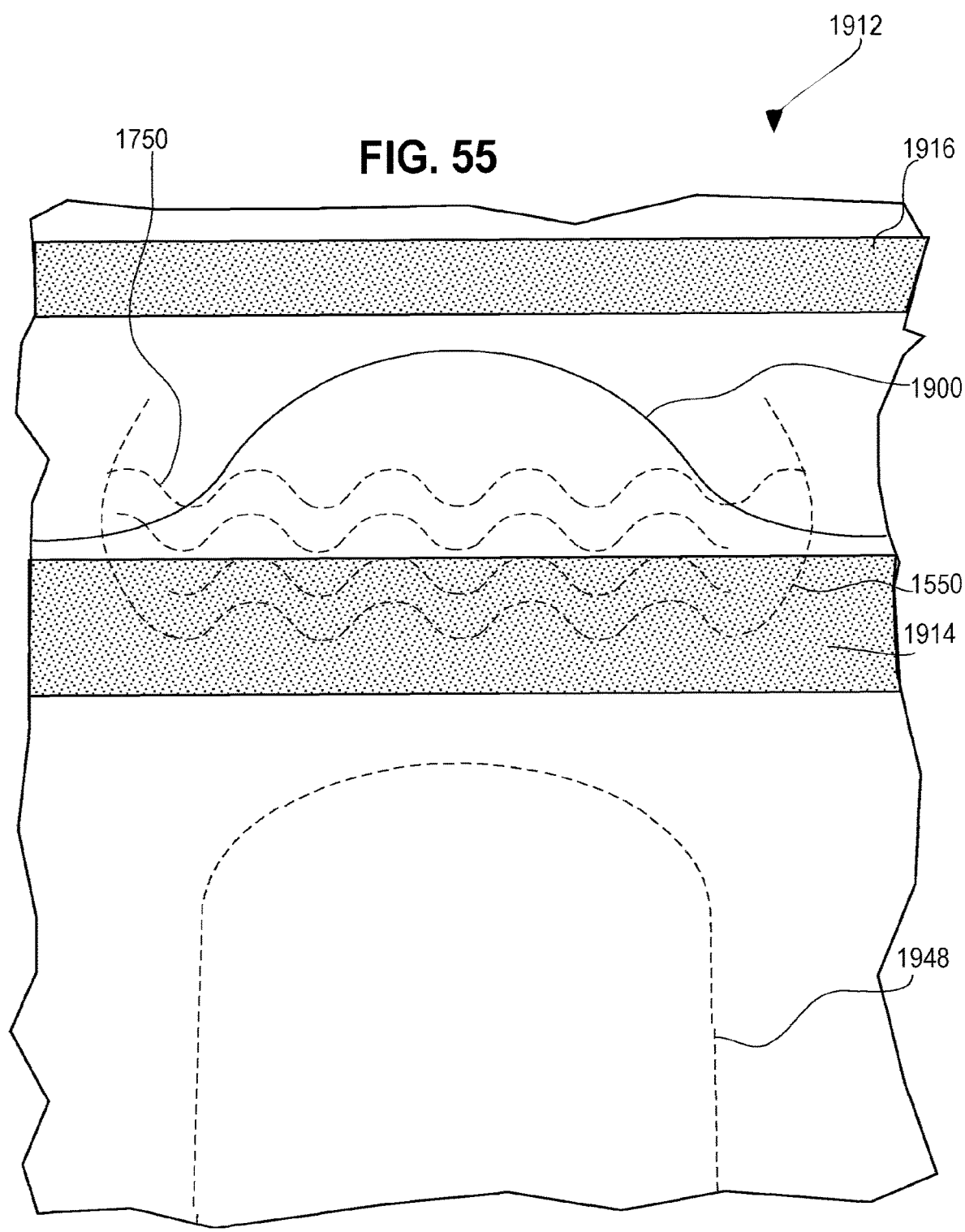
FIGS. 55-58 are portions of film webs showing configurations of different package opening features.

FIG. 55 illustrates a portion of a film 1912 that may be formed into a package with a resealable opening feature and various elements that will help form the package. The partial view of the film 1912 is focused on a few elements to illustrate the relative arrangement of the features. As shown in the figure, the leading edge knife cut 1900 is disposed between a trailing end seal 1916 and a leading end seal 1916. The film 1912 also includes a plurality of tab scores 1750 that will subsequently form a rear edge of a pull tab and a perimeter score 1500 disposed at least partially around some of the tab scores 1750. The perimeter score 1500 assists with management of tear propagation within the film 1912 and may provide a consumer an easier package opening experience. In addition to the tab scores 1750 and the perimeter score 1550, the film 1912 also includes an inner score 1948 in an inner layer of the film 1912 that subsequently defines, in part, a package opening.

Figure 56:
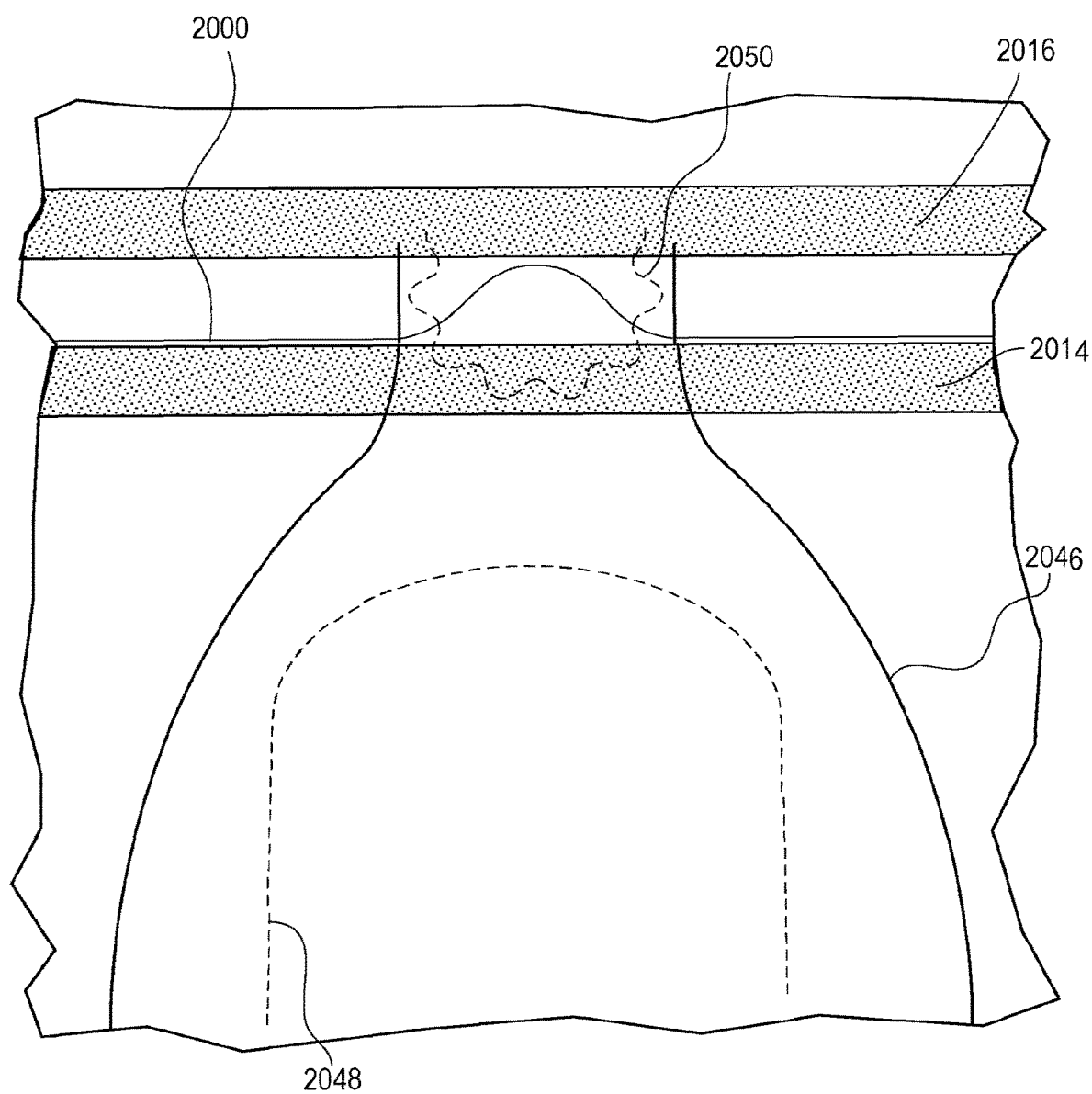

In another film portion 2012, shown in FIG. 56, the separation cut 2000 is disposed between the end seals 2014, 2016 and the perimeter cut 2050 extends from one portion of the separation cut 2000 to another portion thereof, but does not have tab scores disposed therein. In addition to the perimeter cut 2050, the inner film layer has an opening score 2048 formed therein. FIG. 56 also illustrates the outer cut 2046 disposed through portions of the film 2012 that subsequently form a resealable panel that is lifted from a remainder of the package to expose the opening further defined by inner cut 2048.

Figure 57:
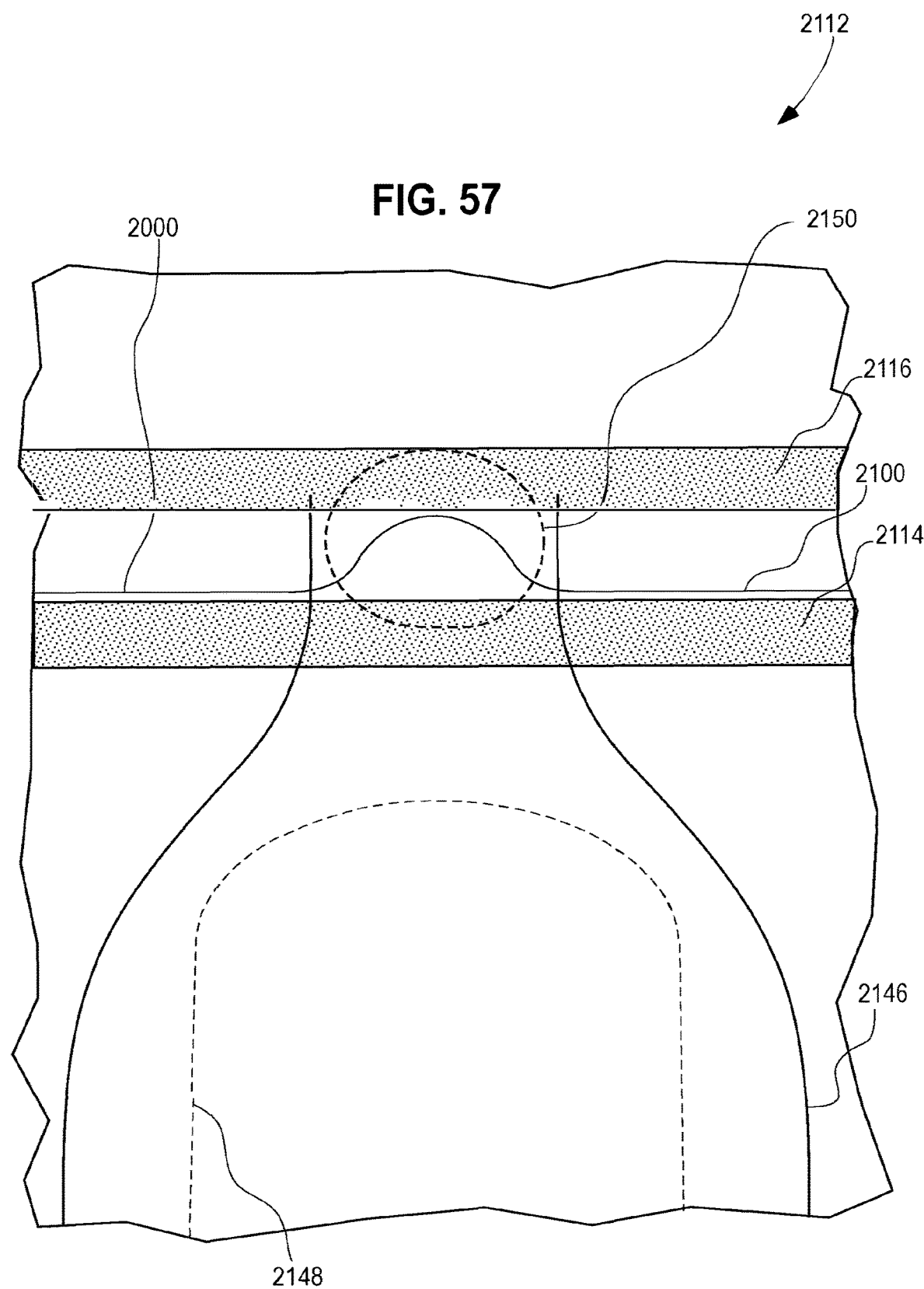

FIG. 57 also shows a portion of film 2112 illustrating where a separation cut 2100 will be formed in between end seals 2114, 2116. Further, the perimeter score 2150 is configured to define a rear edge of a subsequently formed pull tab. Further, similar to embodiments discussed above, the film 2112 includes the inner and outer film layers having respective inner and outer cuts 2146, 2148 therein. By having the bonding layer and the release and reclose layer adjacent thereto, a resealable opening is formed in the film 2112 with the inner and outer cuts 2146, 2148.

Figure 58:
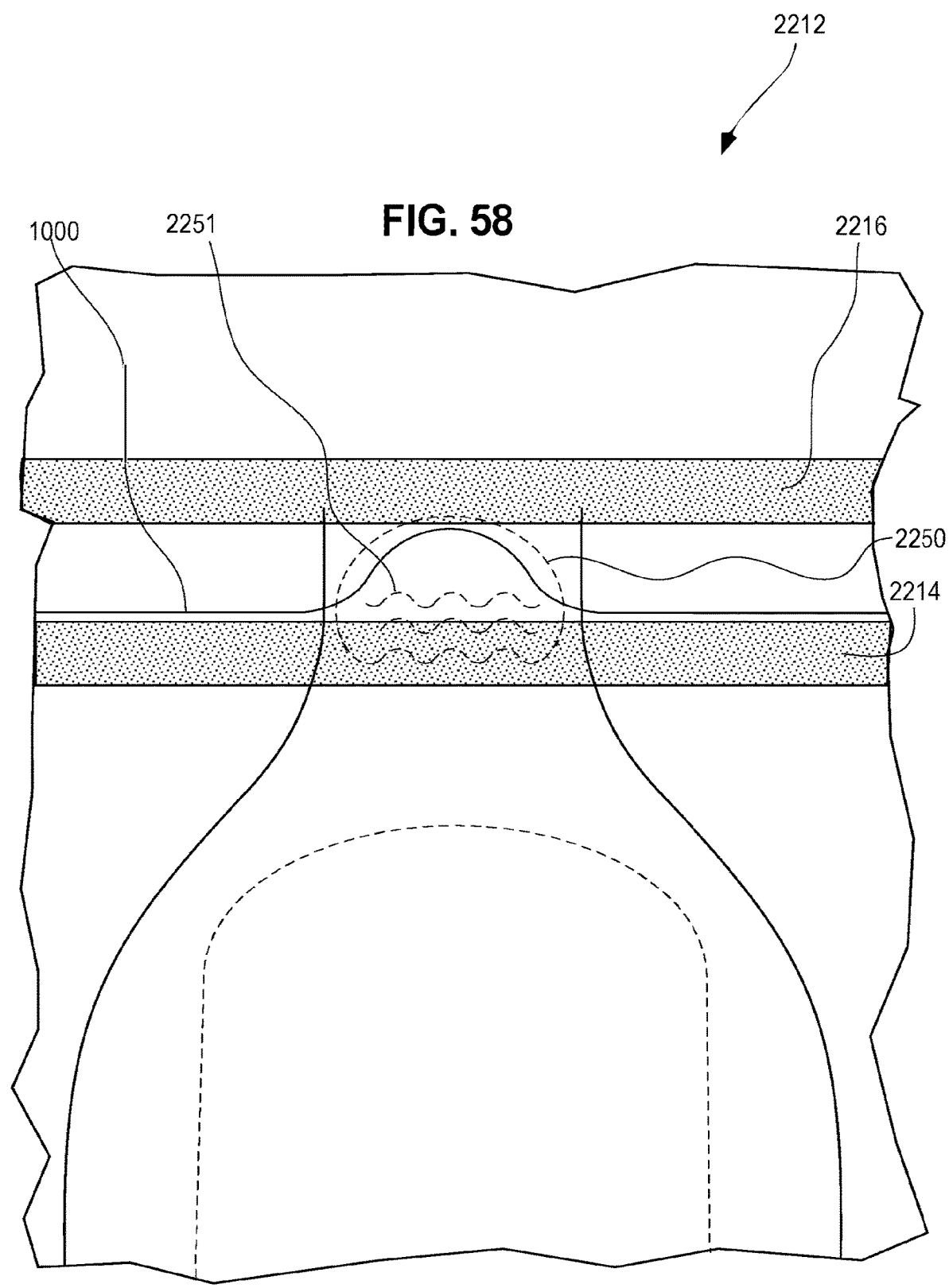
Figure 59:
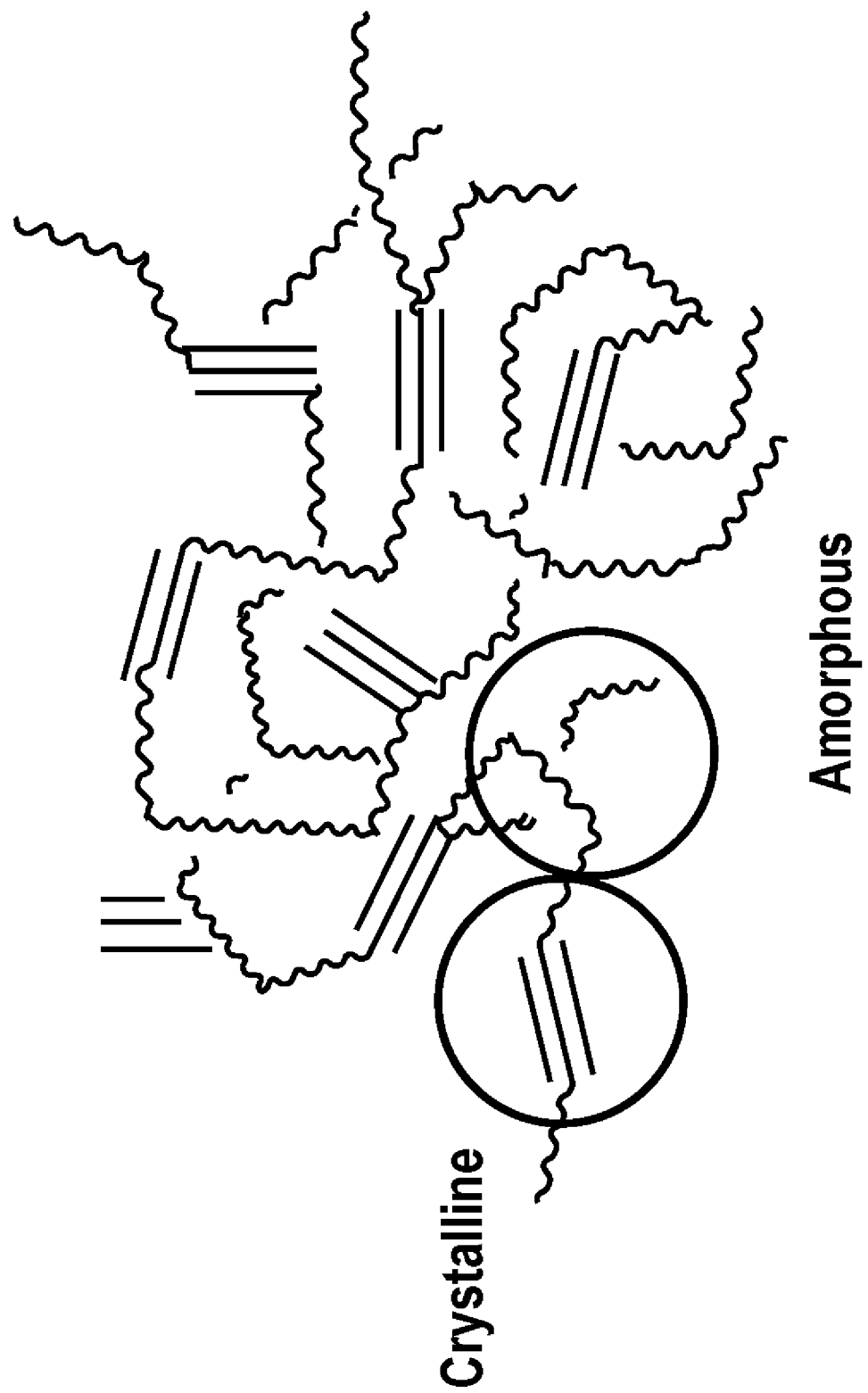
FIG. 59 is a representation of a copolymer structure having a crystallinity distribution with an amorphous fraction.

In yet another configuration, illustrated in FIG. 58, the film 2212 tab scores 2251 anda perimeter score 2250. In addition, the relative location of the cuts (including the separation cut 1000) is illustrated in relation to the end seals 2214, 2216.

Those skilled in the art will recognize that a wide variety of modifications, alterations, and combinations can be made with respect to the above described embodiments, and that such modifications, alterations, and combinations are to be viewed as being within the ambit of the inventive concept. For example, the configurations and concepts described herein can be applied to the construction of bags, pouches, and flow packs, More generally, the configurations and concepts described herein can be utilized on any flexible closure or package. Additionally, although some film and opening configurations as disclosed herein as described using a laminate film, skilled artisans will appreciate that these configurations can be applied to non-laminate films as appropriate. Further, although some films are described herein as being suited for heat sealing, it will be understood that any of the films described herein can also be coated with a cold seal for food package applications. Additionally, skilled artisans will appreciate that elements in the figures are illustrated for simplicity and clarity and have not necessarily been drawn to scale. For example, the dimensions and/or relative positioning of some of the elements in the figures, such as the cross section views, may be exaggerated relative to other elements to help to improve understanding of various embodiments of the present invention.

The invention claimed is:

1. A package comprising:
a multilayer film with a first film layer and a second film layer disposed around an embedded coextruded bonding layer and the second film layer includes at least a release and reclose layer for resealability;
a top cut formed in one of the first or second film layers and a bottom cut formed in the other of the first or second film layers, the top and bottom cuts being offset from one another to form a reseal margin except at a leading portion of an access panel, where the top and bottom cuts coincide with one another such that there the leading portion lacks the reseal margin; and
a top reseal layer disposed over the leading portion of the access panel and adhered to one of the first film layer or the second film layer, the top reseal layer having an adhesive-free portion configured to be grasped for opening.

2. The package of claim 1 the top reseal layer is a discrete label.

3. The package of claim 1 wherein the reseal margin tapers toward the leading portion of the access panel.

4. The package of claim 1 wherein at the leading portion at least one of the top and bottom cuts extends into or through the embedded coextruded bonding layer.

5. The package of claim 4 wherein the leading portion of the access panel is completely cut through the multilayer film thereby forming a throughcut section of the multilayer film at the leading portion of the access panel.

6. The package of claim 5 wherein the throughcut section of the leading portion is located wherein the top cut and the bottom cut coincide.

7. The package of claim 1 wherein the leading portion of the access panel is defined by the top cut that extends at least to the embedded coextruded bonding layer and does not extend completely through the multilayer film and the bottom cut does not extend completely through the multilayer film such that the leading portion is not completely cut through the multilayer film.

8. The package of claim 1 further comprising a plurality of seals forming an interior cavity and wherein the adhesive-free portion of the top reseal layer is proximate one of the plurality of seals.

9. The package of claim 1 further comprising a plurality of seals forming an interior cavity and wherein the adhesive-free portion of the top reseal layer is disposed on the multilayer film inward from plurality of seals.

10. The package of claim 1 wherein a first bond strength between the top reseal layer and the first or second film layer to which the top reseal layer is adhered is stronger than a second bond strength between the release and reclose layer and the embedded coextruded bonding layer.

11. The package of claim 1 wherein the first film layer comprises a top film layer that includes at least one of polypropylene, polyethylene, a copolymer or a polyester film layer and the second film layer may include at least one of polypropylene, polyethylene, a copolymer, an ethylene vinyl alcohol layer, a polyamide film layer, a polyester film layer and a heat seal layer.

12. The package of claim 11 wherein the top cut is an outer cut formed in the top film layer and the bottom cut is an inner cut formed in the reclose layer and the heat seal layer.

13. A package comprising:
a multilayer film with a first film layer and a second film layer disposed around an embedded coextruded bonding layer and the second film layer includes a release and reclose layer for resealability, the multilayer film having at least one package seal forming a contents cavity; and
a top cut formed in one of the first or second film layers and a bottom cut formed in the other of the first or second film layers, the bottom cut including a tab portion that subsequently forms a trailing edge of a pull tab and an opening portion, the top cut and the opening portion of the bottom cut forming, in part, an access opening, the top cut forming an access panel and the opening portion of the bottom cut forming a film flap; and
wherein the top cut and the opening portion of the bottom cuts have portions offset from one another to form a reseal margin;
the access panel formed by the top cut having a leading edge defined, in part, by a throughcut in the multilayer film formed from one or both of the top cut or the tab portion of the bottom cut; and
the tab portion of the bottom cut forming the trailing edge of the pull tab is disposed in the multilayer film outside of the package seal from the contents cavity and the opening portion of the bottom cut is disposed within the package seal.

14. The package of claim 13 wherein the pull tab is disposed at the leading portion of the access panel and the top cut forms, in part, the pull tab.

15. The package of claim 13 wherein the pull tab has a gripping edge disposed a distance from a free edge of the package.

16. The package of claim 13 wherein the at least one package seal comprises a lap seal and the package further includes an extended flange of the multilayer film that extends beyond the lap seal to form the pull tab, which can be grasped to open the package.

17. The package of claim 13 wherein the at least one package seal comprises a fin seal that has offset edges of two layers of the multilayer film that forms the package seal and an outermost edge of the two layers includes the pull tab, which can be grasped to open the package.

18. The package of claim 13 wherein the first film layer and the second film layer are coextensive with one another.

19. The package of claim 13 wherein the top cut is an outer cut formed into the top film layer, such as polypropylene film layer, and/or polyester layer, into the bonding layer; and the bottom cut is an inner cut formed in the release and reclose layer and the heat seal layer.

20. The package of claim 13 further comprising a top reseal layer disposed over the leading portion of the access panel and adhered to one of the first film layer or the second film layer, the top reseal layer having an adhesive-free portion configured to be grasped for opening.

21. The package of claim 13 wherein the tab portion and the opening portion of the bottom cut are disposed a distance from one another such that the reseal margin is disposed therebetween.

22. The package of claim 13 wherein the first film layer comprises a top film layer that includes at least one polypropylene, polyethylene, a copolymer or a polyester film layer and the second film layer may include at least one of polypropylene, polyethylene, a copolymer, an ethylene vinyl alcohol layer, a polyamide film layer, a polyester film layer and a heat seal layer.

23. The package of claim 13 wherein the top cut is configured to consistently permit delamination of the embedded coextruded bonding layer with the release and reclose layer by having first and second sides of the top cut configured with a curved configuration and a sloping shoulder having a radius of curvature of not less than approximately ¾-in.

* * * * *